(12) United States Patent
Neff et al.

(10) Patent No.: US 10,503,835 B2
(45) Date of Patent: Dec. 10, 2019

(54) WEB-BASED TOOL FOR COLLABORATIVE, SOCIAL LEARNING

(71) Applicant: Pearson Education, Inc., New York, NY (US)

(72) Inventors: Sam Neff, Novato, CA (US); Raymond Galang, San Jose, CA (US); Sundararajan Parasuraman, TamilNadu (IN)

(73) Assignee: PEARSON EDUCATION, INC., Bloomington, MN (US)

( * ) Notice: Subject to any disclaimer, the term of this patent is extended or adjusted under 35 U.S.C. 154(b) by 304 days.

(21) Appl. No.: 15/454,519

(22) Filed: Mar. 9, 2017

(65) Prior Publication Data

US 2017/0185589 A1    Jun. 29, 2017

Related U.S. Application Data

(63) Continuation of application No. 12/390,450, filed on Feb. 21, 2009, now abandoned.

(60) Provisional application No. 61/030,431, filed on Feb. 21, 2008.

(51) Int. Cl.
| | | |
|---|---|---|
| G06F 17/24 | (2006.01) | |
| G06F 17/28 | (2006.01) | |
| G06F 16/9535 | (2019.01) | |
| G06Q 10/10 | (2012.01) | |
| G06F 3/0482 | (2013.01) | |
| G06F 3/0484 | (2013.01) | |
| G06F 3/16 | (2006.01) | |

(52) U.S. Cl.
CPC ........ *G06F 17/2854* (2013.01); *G06F 3/0482* (2013.01); *G06F 3/04845* (2013.01); *G06F 3/167* (2013.01); *G06F 16/9535* (2019.01); *G06F 17/241* (2013.01); *G06Q 10/10* (2013.01)

(58) Field of Classification Search
CPC combination set(s) only.
See application file for complete search history.

(56) References Cited

U.S. PATENT DOCUMENTS

| | | | | |
|---|---|---|---|---|
| 5,850,629 A * | 12/1998 | Holm | ........................ | G06F 3/16 704/260 |
| 6,072,474 A * | 6/2000 | Morimura | ............. | G06F 3/0488 345/173 |
| 6,243,722 B1 * | 6/2001 | Day | ...................... | G06F 16/957 715/205 |
| 6,324,511 B1 * | 11/2001 | Kiraly | .................. | G09B 21/006 704/260 |
| 7,028,259 B1 * | 4/2006 | Jacobson | .............. | G06F 17/274 715/236 |
| 7,752,034 B2 * | 7/2010 | Brockett | ............. | G06F 17/2765 704/2 |
| 7,770,135 B2 * | 8/2010 | Fitzmaurice | .......... | G06F 3/0488 715/856 |

(Continued)

*Primary Examiner* — Hien L Duong
(74) *Attorney, Agent, or Firm* — Quarles & Brady LLP

(57) ABSTRACT

A computerized-social network provides a community of users with features and tools facilitating an immersive, collaborative environment where users can learn a language or help others learn a language. One user (user A) can view another user's (user B) Web page or document and make suggestions or comments for selected content on that Web page. These suggestions are linked specifically to the selected content. User B can review the suggestions, and accept or reject the suggestions by user A and others.

15 Claims, 68 Drawing Sheets

(56) References Cited

U.S. PATENT DOCUMENTS

| | | | |
|---|---|---|---|
| 8,612,469 B2* | 12/2013 | Neff | G06F 17/241 707/767 |
| 2002/0129057 A1 | 9/2002 | Spielberg | |
| 2004/0122843 A1* | 6/2004 | Terris | G06F 17/218 |
| 2004/0135824 A1* | 7/2004 | Fitzmaurice | G06F 3/0488 715/856 |
| 2005/0288943 A1* | 12/2005 | Wei | G06F 17/289 358/1.15 |
| 2006/0111902 A1* | 5/2006 | Julia | G09B 5/06 704/236 |
| 2006/0265652 A1* | 11/2006 | Seitz | G06F 16/95 715/703 |
| 2006/0277482 A1* | 12/2006 | Hoffman | G06F 3/0481 715/764 |
| 2006/0294094 A1* | 12/2006 | King | H04N 1/00244 |
| 2007/0055926 A1* | 3/2007 | Christiansen | G06F 17/241 715/210 |
| 2007/0118598 A1* | 5/2007 | Bedi | G06Q 10/107 709/204 |
| 2007/0124142 A1* | 5/2007 | Mukherjee | G10L 13/10 704/235 |
| 2007/0156785 A1* | 7/2007 | Hines, III | G06F 17/21 |
| 2007/0233692 A1* | 10/2007 | Lisa | G06F 3/04817 |
| 2007/0271503 A1* | 11/2007 | Harmon | G06F 17/241 715/230 |
| 2008/0005101 A1* | 1/2008 | Chandra | G06F 16/951 |
| 2008/0005664 A1* | 1/2008 | Chandra | G06F 16/986 715/234 |
| 2008/0016164 A1* | 1/2008 | Chandra | G06Q 10/10 709/206 |
| 2008/0046845 A1* | 2/2008 | Chandra | G06F 16/9577 715/856 |
| 2008/0082317 A1* | 4/2008 | Rosart | G06F 17/211 704/8 |
| 2008/0155039 A1* | 6/2008 | Fernandes | G06Q 10/06 709/206 |
| 2008/0270406 A1* | 10/2008 | Flavin | G06F 16/38 |
| 2009/0070128 A1* | 3/2009 | McCauley | G06F 21/604 705/300 |
| 2009/0150761 A1* | 6/2009 | Sawicki | G06F 17/24 715/216 |

* cited by examiner

FIG. 24A englishcafe.com

SEARCH

ABOUT ENGLISHCAFE | CONTACT US | TERMS | PRIVACY | HELP

WELCOME LMLAU LOG OUT VIEW RECENT ACTIVITY*
MY PROFILE USERS CHAT CAFE GROUPS ASK & ANSWER ENGLISH LIBRARY ONLINE COURSES

LMLAU'S PROFILE | BLOG | LIBRARY | GROUPS | DISCUSSIONS | SUGGESTIONS | MESSAGE CENTER   BEGINNER
EDIT THIS BLOG ENTRY | CREATE NEW BLOG ENTRY

I'M STILL HERE...REALLY!
POSTED ON: 17/02/2009

MANY OF YOU MAY BE WONDERING JUST WHERE I'VE GONE OFF TO...DIDN'T I SAY I HAD
RETURNED FROM VACATION AND WAS PROMISING ALL SORTS OF LOVELY TRAVELOGUES AND
PRETTY PICTURES AND EVEN A RECIPE OR TWO? — 2450

WELL, READERS, YOU'VE BEEN MARVELOUSLY PATIENT AND SUPPORTIVE AND NOW IT'S TIME FOR
ME TO COME CLEAN. I'M CURRENTLY NECK-DEEP (PERHAPS A TAD HIGHER) IN THE END STAGES OF
MY SECOND BOOK, AND IT HAS TAKEN OVER MY LIFE.

OH, BY THE WAY, HAVE I TOLD YOU WHAT THE SECOND BOOK IS ABOUT? — 2452

THE SECOND BOOK IS ABOUT CANDY!

I WAS VERY EXCITED AND FLATTERED, TO SAY THE LEAST, AND PERHAPS SLIGHTLY APPREHENSIVE
ABOUT HOW MUCH CANDYMAKING WOULD TAKE OVER MY LIFE IN THE NEXT FEW MONTHS.

SUFFICE TO SAY THAT AT THIS POINT I AM PRETTY THINKING ABOUT CANDY ALL THE TIME. WHEN
I AM NOT TWEAKING RECIPES IN THE KITCHEN, GETTING EVERYTHING COVERED IN CARAMEL AND
CHOCOLATE, I AM WRITING ON THE COMPUTER OR THINKING OF MORE CANDIES. I HAVE VISITED
JUST ABOUT EVERY CANDY STORE IN SAN FRANCISCO. MY BOYFRIEND DOES NOT BLINK NOW
WHEN I SAY FOR THE 3RD TIME IN A WEEK "WE NEED TO GO GET MORE SUGAR." I THINK I'VE
EVEN DREAMED ABOUT CANDY (WHICH, ACTUALLY, FOR A DESSERT LOVER LIKE ME, SHOULD BE
LIKE THE GOLD RING OF DREAMS.)

IT'S BEEN A FUN AND AMAZING AND INTENSE EXPERIENCE. AND NOW AS I'M APPROACHING THE
PHOTOSHOOT FOR THE BOOK, THE INTENSITY IS PUSHING PAST 11 ON THE METER. IN A FEW
WEEKS, THERE WILL HOPEFULLY BE LOVELY SHOTS OF CANDIES TO ENTICE AND BEGUILE THE
CANDY-CURIOUS. UNTIL THEN, I'LL BE IN THE KITCHEN, WHIPPING UP SWEETS WILLY-WONKA
STYLE.

LMLAU'S BLOG ARCHIVE
▼2009(3)
 ▼FEBRUARY(3)
  ▲GOING HOME
  ▲VISITING FAMILY*
  ▲I'M STILL HERE...REALLY!

ec toolbox™
⊞ CURRENT SUGGESTION
⊞ SUGGESTION HISTORY — 2454

SUGGESTIONS GIVEN | SUGGESTIONS RECEIVED

SUGGESTIONS GIVEN
TOTAL SENT: 3
TOTAL APPROVED: NIL
APPROVAL RATE: 0

2460

| TO | TITLE | VIEW BY DATE | STATUS |
|---|---|---|---|
| LMLAU | THE MACARON CRAZE IS NOT CONFINED TO PARIS | 35 MINS 53 SECONDS AGO | DISCARDED |
| LMLAU | THE MACARON CRAZE IS NOT CONFINED TO PARIS | 4 HOURS 39 MINS 57 SECONDS AGO | DISCARDED |
| LMLAU | I'M SURE YOU ARE ALL WONDERING | 5 HOURS 25 MINS 39 SECONDS AGO | APPROVAL PENDING |

SHOWING RESULTS 1 TO 3 OF 3

FROM FIG. 32A

RATE
ENGLISH ↑ 0 | CULTURE ☺ 0 | WORK ☺ 0 | PLAY ☺ 0

RESPOND
SHARE
ADD COMMENT> | ADD TO FAVORITES> | FLAG AS INAPPROPRIATE> | SHARE>
RSS

<INSERT CONTENT> YOU MAY INSERT A PHOTO, AUDIO, OR VIDEO WITHIN THE TEXT YOU TYPE BELOW.
∞ U B / INCLUDING QUOTE

[QUOTE]
PEKING DUCK
[QUOTE]

THAT IS MY FAVORITE DISH!

POST COMMENT    CANCEL

GOMATHI

SUBMITTED BY GOMATHI ON TUE, 19/02/2009 - 04:20
HI, IT IS ALWAYS A PLEASURE TO TRAVEL AND BE WITH CLOSE RELATIVES FOR A WHILE.)

AND, WHAT IS A MACARON? IS IT THE SAME AS MACARONI, WHICH IS WHITE IN COLOUR, CONICAL SHAPED, CRISPY AND SOFT, MADE OF CASHEWS?

EDIT   DELETE   REPLY TO COMMENT>

ABOUT ENGLISHCAFE | CONTACT US | TERMS | PRIVACY | HELP englishcafe.com

FROM FIG. 41B-1

| | |
|---|---|
| JONES'S PERSONALITY | |
| FAVORITE SPORTS: | BEACH VOLLEYBALL, SWIMMING, BASKETBALL, GYMNASTICS, TENNIS |
| HOBBIES: | VEGAN/ORGANIC CUISINE, HEALTH/FITNESS, ART/DESIGN/PHOTOGRAPHY, READING, LEARNING NEW THINGS, TRAVELING AND EXPLORING |
| PROFESSION: | WEB EXPERIENCE AND INTERFACE DESIGN |
| MUSIC: (BANDS) | WORLD MUSIC AND CLASSICAL, KD LANG, ERASURE, ENYA, SALSA CELTICA |
| FAVORITE FOOD: | MEDITERRANEAN, ETHIOPIAN, THAI, INDIAN |
| JONES'S KEYWORDS | |
| VEGAN VEGETARIAN VEGNEWS SEVEN VEGETABLE COUSCOUS VEGAN RECIPE ST.JOHN TROPICAL RAINBOW WHITE SAND BEACH BY 'DRAWING ARMAND' 'PINK FLOWER' 'VEGETARIAN COUSCOUS' 'STANFORD THEATRE' STANFORD THEATRE PALO ALTO OLD-FASHIONED MOVIES AUDREY HEPBURN BREAKFAST AT TIFFANY'S ROMAN HOLIDAY PROUST QUESTIONNAIRE PHOTOS TRAVEL \ DOOR\ RESTAURANT ETHIOPIAN CHICAGO PIZZA\ FUSION\ NATIVE FOODS CALIFORNIA VEGAN THE VEGGIE GRILL OLIVO MARCHE SARI THE GETTY MUSEUM GRAND CAYMAN YOSEMITE ATLANTA, GEORGIA MARTIN LUTHER KING JR. MAUI HOLLYWOOD BEACH KEY LARGO FORT LAUDERDALE RESTAURANTS MAR AND TIERRA KEY WEST THE LIVING DESERT LIVING DESERT ZOO SANTA CRUZ SAN FRANCISCO PLAYA DEL SECRETO MONTEREY BAY AQUARIUM SOCIAL MEDIA STRATEGIES GLOBALENGLISH 2008 ALL-COMPANY MEETING\ DESIGN CODING POETIC PROPHET THE SEO RAPPER SAM NEFF FOR PRESIDENT BISTRO\ CARTOON OF JONES AND HER ANIMAL FRIEND CLAY ILLUSTRATION BY IRMA GRUENHOLZ DRAWING BY ARMAND ECONOMICS WOMEN BUSINESS ILLUSTRATION\ GRUENHOLZ\ DOCUMENT AUDIO PICTURE | |

SHOWING RESULTS 1 TO 79 OF 79

| | |
|---|---|
| | HI JONES HOW R U? IM NEW TO THIS BY: PYPR |
| | HI, JONES, NICE TO MEET YOU :) BY: PBOYD |
| | HELLO JONES! I'M GLAD TO RECEIVE EMAIL HERE FROM YOU. I'M HERE TO IMPROVE MY ENGLISH. I WOULD LIKE TO TALK MANY WITH YOU ON SKYPE. THANKS! :) BY: JULIE616 |
| | HI JONES! HAPPY NEW YEAR! I'M HERE TO IMPROVE MY ENGLISH AND MAKE FRIENDS. VERY GLAD TO RECEIVE FIRST EMAIL HERE FROM YOU. THANKS! BY: JESSIE |

SHOWING RESULTS 1 TO 4 OF 210
PAGE ◁ ☐ ▷ OF 53

ABOUT ENGLISHCAFE | CONTACT US | TERMS | PRIVACY | HELP

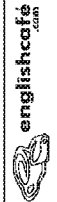

WEB-BASED TOOL FOR COLLABORATIVE, SOCIAL LEARNING

CROSS-REFERENCE TO RELATED APPLICATION

This application claims the benefit of U.S. patent application Ser. No. 12/390,450 titled "Web-Based Tool for Collaborative, Social Learning," filed Feb. 21, 2009, which claims the benefit of U.S. provisional patent application 61/030,431, filed, Feb. 21, 2008, both of which are incorporated by reference along with all other references cited in this application.

BACKGROUND OF THE INVENTION

This invention relates to the field of information networks, and more specifically to techniques of developing, providing, and sharing content in a social networking community, especially one which provides an immersive, collaborative environment for learning.

The Internet and the World Wide Web (WWW) and have brought about significant changes in how information is exchanged. The Internet has been referred to as the "information superhighway" and has facilitated rapid dissemination of information to large numbers of people in United States and around the world. Through the Web, users can more easily "publish" or otherwise make available to others many different kinds of information and content, such as through hyperlinked pages. This information includes, naming a few examples, newspaper articles, scientific papers, literary texts, business articles, social commentaries, political commentaries, and entertainment columns.

The Internet continues to evolve and advance. The Web facilitates more than just people retrieving information from institutional sources. Information is being democratized through new sources and ways of presenting information such as weblogs or blogs, wikis, podcasts, forums, and on-line social communities. The result is a more socially connected community where people are able to publish, add, and edit content.

Through the Internet, people want to find and connect with others who share similar interests and activities. They want to learn what others know. They want to teach what they know. Therefore, there is a need for new and improved techniques for developing, providing, and sharing content, especially to support a vibrant social networking community.

BRIEF SUMMARY OF THE INVENTION

A computerized-social network provides a community of users with features and tools to facilitate an immersive, collaborative environment where users can learn a language or help others learn a language. One user (user A) can view another user's (user B) Web page or document and make suggestions or comments for selected content on that Web page. The suggestions are linked specifically to the selected content. User B can review the suggestions, and accept or reject the suggestions by user A and others.

Further, multiple users may make suggestions for the same page at the same time. The suggestions can be stored in a database or other storage location, separate from the page or document itself. When reviewing suggestions by others, other options that are available to user B may include translating the suggestion and hearing it in a different language or accent. Further, the social network allows users rate each other based on the quality of their suggestions. Suggestions can be filtered based a user's rating.

In an implementation, the invention provides a system and technique for collaborative suggestion and content development on a shared document on a social network. The suggestions are made by other users and are specific to content (i.e., a location) in the document. In a specific embodiment, the system is implemented on a computerized-social network. A social network is any group of users who have common interests or activities. Thus, a social network may relate, for example, to entertainment, cultural, business, academic, educational, or research purposes.

With the system, a user can share a document (such as by way of a hypertext-linked document, HTML, or XML page) with other users on the social network. The document may be shared with any number of users. It may be shared with just one user, hundreds of users, thousands of users, millions of users, or more. The document may contain any number of pages. The document may just be a few lines of text; or the document may contain tens, hundreds, thousands, tens of thousands, or more pages.

A feature of invention includes a toolbox. The toolbox includes an ability to select text in a body of text, an ability to give suggestion on that text, an ability to see who has given suggestion (e.g., social element), an ability to view explanation on that suggestion, an ability to get translation on text, an ability to hear text, and an ability to adopt a suggestion (e.g., have suggested text replace original text). Including an explanation with a suggestion may be optional.

The document may be about any subject. For example, the document may concern current events (e.g., political, financial, business, world news, local news, or sports), scientific and engineering research, legal research, history, art, or medical studies. The document may be a work of fiction such as a short story, poem, essay, or book. The document may be business or work related such as an e-mail, memo, report, letter, or presentation. The document may be in the form of an on-line journal such as a blog or a discussion thread in an on-line forum.

The system presents the document (e.g., a Web page) to users and allows users to make suggestions at a specific location in the document. In an embodiment, a suggestion is a proposed change to some specific content in the document. In other embodiments, a suggestion may simply be commentary. Users may select any amount of content to offer a suggestion. For example, the selected content may be a single character, number, punctuation, symbol, or letter, a single word, a single sentence, a single paragraph, multiple paragraphs, or multiple pages. The selected content may include text, tables, images, pictures, video, or graphic elements.

Users may also include with the suggestion an explanation for the suggestion. The number of users making suggestions and explanations may range from just one user to tens, hundreds, thousands, or millions of users or more. Each of these tens, hundreds, thousands, or millions of users or more may each at the same time make a suggestion and explanation to the same document. That is, suggestions and explanations do not have to proceed in a serial progression—they can be made simultaneously and concurrently with other users. Multiple copies of the document for each user are not required. There may be multiple suggestions for a specific content in the document given by a single user or multiple users. The system tracks which user made the suggestion and the location in the document that the suggestion was made.

In an implementation, any changes, edits, suggestions, comments, or explanations are stored separate from the Web page or document itself. For example, these changes, edits, suggestions, comments, or explanations may be stored in a database or separate file.

Other users may view the document and suggestions. The system identifies the content in the document for which suggestions were made. While viewing the original document, users can cycle through each suggestion and explanation. When the author of the document finds a suggestion that they like, the system replaces that specific portion of the document with the suggestion. Thus, the system facilitates collaborative content development. The result is a document that reflects the collective knowledge, skills, and experiences of other users on the social network.

In one embodiment, the system may be implemented on a private network. The private network may be owned, for example, by an individual, organization, association, company, or other entity. The document may be an annual report. Managers in each of the company's business units may then review and comment on the annual report using the system.

In another embodiment, the system is part of a social network for electronic learning where the users—not institutions, governments, or companies—are the information sources. The system may connect people from different cities, states, countries, time zones, and backgrounds who share an interest in teaching and learning. Users benefit from interacting and learning new things from a like-minded community.

In an even more specific embodiment, the system is part of a social network for learning languages such as English. Because users may come from different ethnic backgrounds and speak different languages, the system provides text and audio based translation features.

The system provides a form of peer review where users can rate each other's suggestion. Users who consistently give thoughtful and helpful suggestions to other users will likely receive high ratings from other users. This rating mechanism helps to foster trust on the system and encourages cooperative behavior. The system rewards those users who have established good reputations in the community.

The system provides a variety of filters that can be applied to documents, suggestions, and users. Filters may be based on a user name, a user's rating, a user's network, a user's group, or other criteria such as that contained in a user's profile (e.g., geographic location or native language).

Users can choose to share documents with every user in the system and receive suggestions from every user in the system or block certain users. The user can also create private groups to share documents with and receive suggestions from. Users can create groups based on a variety of criteria including, for example, user names, user ratings, or other user profile information.

In an implementation, a method includes permitting a first user to select a portion of a Web page using a pointer (e.g., using a mouse to highlight words or sentences on the page), displaying to the first user a dialog box in which the first user can enter a suggestion to be associated with the selected portion of the Web page, and storing information on the suggestion at location separate from the Web page. The information includes the suggestion, Web page identifier (e.g., Web site URL), and portion of the Web page selected by the user (e.g., relative character positions on a page). The method may further include displaying to a second user the suggestion and portion of the Web page selected by the user, an accept button for the second user to specify an acceptance of the suggestion, and a rejection button for the second user to specify a rejection the suggestion.

In various specific implementations, the user is permitted to select and make suggestions for text content only, not graphics content. The user is permitted to select and make suggestions for text, graphics content, or both on a page. If the user selects graphics content on a page, the system will perform optical character recognition (OCR) to convert the graphics to text content, for which the user can comment on.

In a specific implementation, a method includes permitting a first user to select a portion of a first Web page using a pointer, displaying to the first user a dialog box in which the first user can enter a first suggestion to be associated with the selected portion of the first Web page, and storing first information on the first suggestion at a first location. The first location is separate from the first Web page. The first information includes the first suggestion, a first Web page identifier, and the portion of the first Web page selected by the first user.

The method may further include displaying to a second user the first suggestion and portion of the first Web page selected by the user, an accept button, and a rejection button. The accept button is for the second user to specify an acceptance of the first suggestion. The rejection button is for the second user to specify a rejection of the first suggestion.

In an implementation, a method includes permitting the first user to select a portion of a second Web page using the pointer, displaying to the first user a dialog box in which the first user can enter a second suggestion to be associated with the selected portion of the second Web page, and storing second information on the second suggestion at a second location separate from the second Web page. The second information includes the second suggestion, a second Web page identifier, and the portion of the second Web page selected by the first user.

The method may further include displaying to the first user a suggestions given summary screen. The suggestions given summary screen includes a first entry for the first suggestion and a second entry for the second suggestion. The first entry includes a status of whether the second user has accepted or rejected the first suggestion.

A position of where the dialog box is displayed on a screen can depend on a position of the selected portion of the first Web page. The dialog box may be positioned to overlay the first Web page.

In an implementation a method includes displaying to a third user the first suggestion and portion of the first Web page selected by the first user.

Code for the permitting a first user to select a portion of a first Web page using a pointer may be stored as part of the Web page. Code for the displaying to the first user a dialog box in which the first user can enter a first suggestion to be associated with the selected portion of the first Web page may be stored as part of the Web page.

The method may further include after the displaying the dialog box, permitting the first user to select the dialog box and move the dialog box to a different position on a screen.

The dialog box may include an option to translate the selected portion of the first Web page from a first language to a second language. The first language may be English and the second language may be Japanese.

The dialog box can include an option to produce an audio representation of the selected portion of the first Web page. The first user can specify the audio representation to be provided at a first audio speed or at a second audio speed, different from the first audio speed. At the first audio speed, a first length of time for a first audio representation is X seconds and a second length of time for a second audio representation is Y seconds. Y can be longer than X.

In a specific implementation, a method includes permitting a first user to select a first portion of a Web page using a pointer, displaying to the first user a dialog box in which the first user can enter a first suggestion to be associated with the first selected portion of the Web page, storing first information on the first suggestion at a first location separate from the Web page, where the first information includes the first suggestion, a Web page identifier, and the first portion of the Web page selected by the first user.

The method further includes permitting a second user to select a second portion of the Web page using a pointer, displaying to the second user the dialog box in which the second user can enter a second suggestion to be associated with the second selected portion of the Web page, storing second information on the second suggestion at a second location separate from the Web page, where the second information includes the second suggestion, Web page identifier, and second portion of the Web page selected by the second user, and displaying to a third user a suggestions received summary screen. The suggestions received summary screen includes a first entry for the first suggestion and a second entry for the second suggestion.

The third user may be an author of the Web page. The method may further include displaying to the third user the first suggestion and portion of the Web page selected by the first user, an accept button for the third user to specify an acceptance of the first suggestion, and a rejection button for the third user to specify a rejection the first suggestion. Upon the third user selecting the accept button and before the permitting a second user to select a second portion of the Web page using a pointer, the method includes modifying the Web page using the first suggestion and displaying the modified Web page to the second user.

The first portion of the Web page selected by the first user can include a video.

The suggestions received summary screen can be displayed in the dialog box overlaying the Web page. In an implementation, the displaying to the first user a dialog box in which the first user can enter a first suggestion to be associated with the first selected portion of the Web page is performed via a Web browser application.

Other objects, features, and advantages of the present invention will become apparent upon consideration of the following detailed description and the accompanying drawings, in which like reference designations represent like features throughout the figures.

BRIEF DESCRIPTION OF THE DRAWINGS

FIG. 7B shows an example of the content on the Web page.

FIG. 8 shows an example of a user selecting a portion of the content in a Web page and a specific implementation of a toolbox.

FIG. 10 shows an example of a suggestion and explanation inputted into the expanded header section of the toolbox.

FIG. 11 shows an example of a prompt or dialog box for confirming the suggestion.

FIG. 12 shows an example of a confirmation dialog box that the suggestion has been added.

FIG. 13 shows an example of a toolbox with a current suggestion tool.

FIG. 14 shows an example of viewing a first current suggestion using the toolbox.

FIG. 15 shows an example of viewing a second current suggestion using the toolbox.

FIG. 16 shows an example of editing the first current suggestion using the toolbox.

FIG. 18 shows an example of using a feature of the toolbox to approve or discard a first suggestion.

FIG. 21 shows an example of a prompt or dialog box to confirm acceptance of a suggestion.

FIG. 22 shows an example of the selected content of the Web page being replaced by the suggestion.

FIG. 23 shows an example of using a feature of the toolbox to view a past suggestion that was discarded.

FIG. 24A shows an example of using a feature of the toolbox to view a past suggestion that was accepted.

FIG. 24B-1 shows an example of a toolbox including a current suggestion tool and a suggestion history tool.

FIG. 24B-2 shows an example of a toolbox including a current suggestion tool and a suggestion history tool.

FIG. 24C shows an example of a summary page of suggestions given.

FIG. 25 shows an example of selecting a portion of the content on a Web page for translation.

FIG. 26 shows an example of a feature of the toolbox that translates the selected content.

FIG. 27 shows an example of a translation of the selected content displayed in the toolbox.

FIG. 28 shows an example of a feature of the toolbox that vocalizes the selected content.

FIG. 29 shows an example of selecting a portion of the content on a Web page for copying to a clipboard.

FIG. 30 shows an example of a prompt or dialog box confirming the copy.

FIG. 31 shows an example of selecting a portion of the content on a Web page for commenting.

FIG. 32A shows an example of a comment input box on the Web page.

FIG. 32B shows an example of a comment input box on the Web page.

FIG. 33A shows an example of the comment appended to a bottom of the Web page.

FIG. 33B shows an example of the comment appended to a bottom of the Web page.

FIG. 34A shows a specific implementation of a toolbox having a suggestion rating tool or feature.

FIG. 34B shows a specific implementation of a toolbox having a suggestion rating tool or feature.

FIG. 41B-1 shows an example of a user profile page.

FIG. 41B-2 shows an example of a user profile page.

Figure 43:
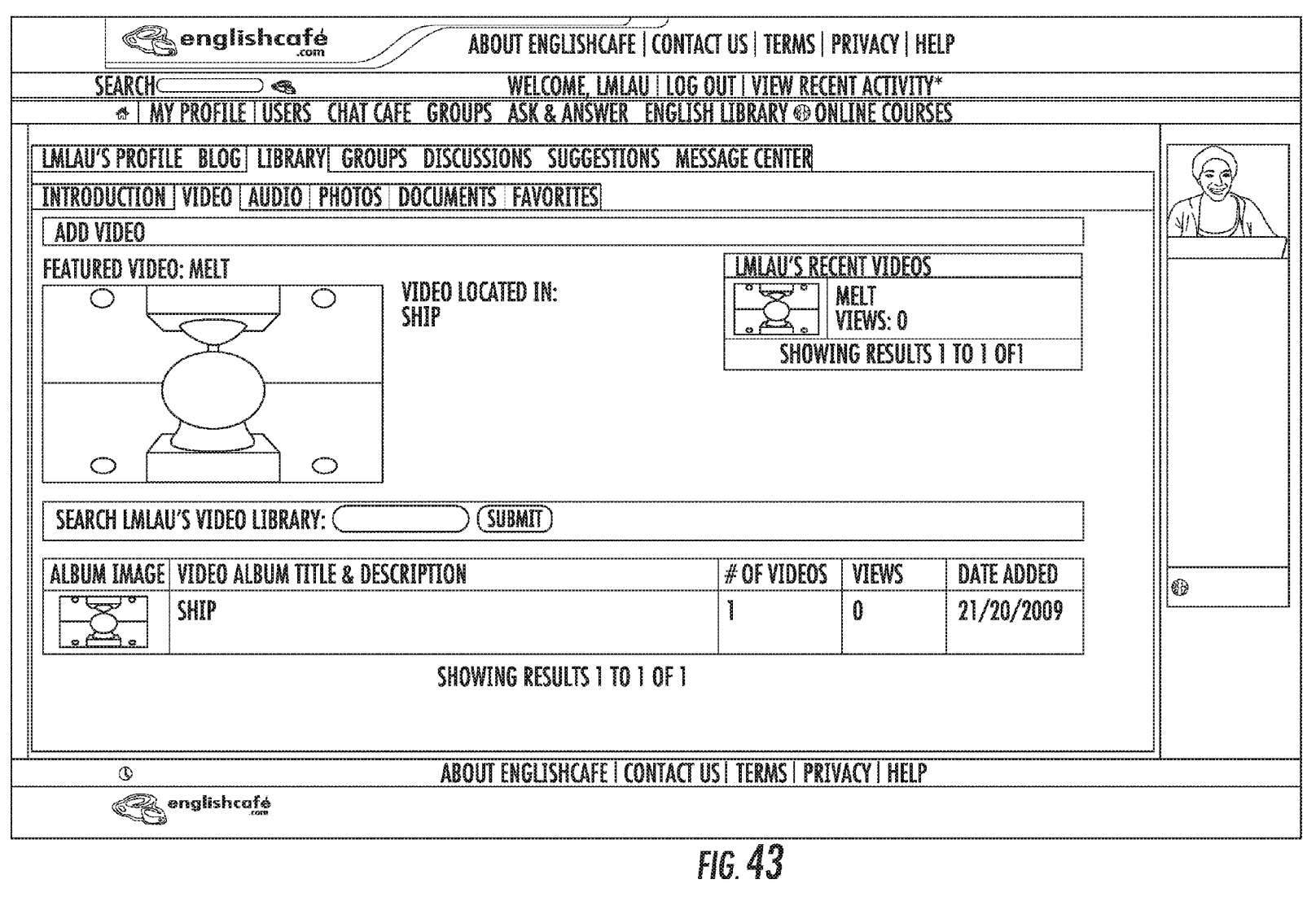

FIG. 43 shows an example of a user's video library page.

Figure 44:
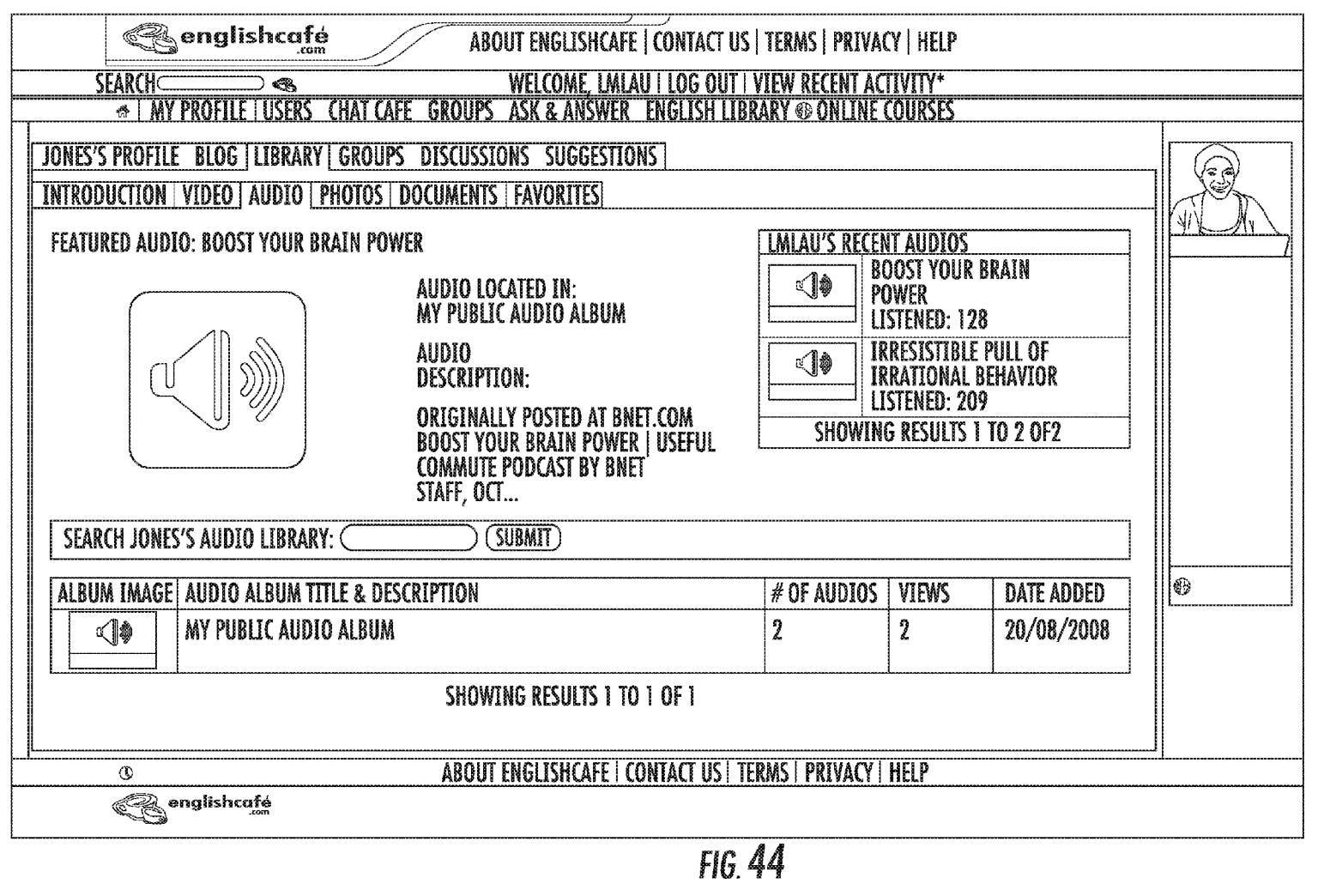

FIG. 44 shows an example of a user's audio library page.

Figure 45:
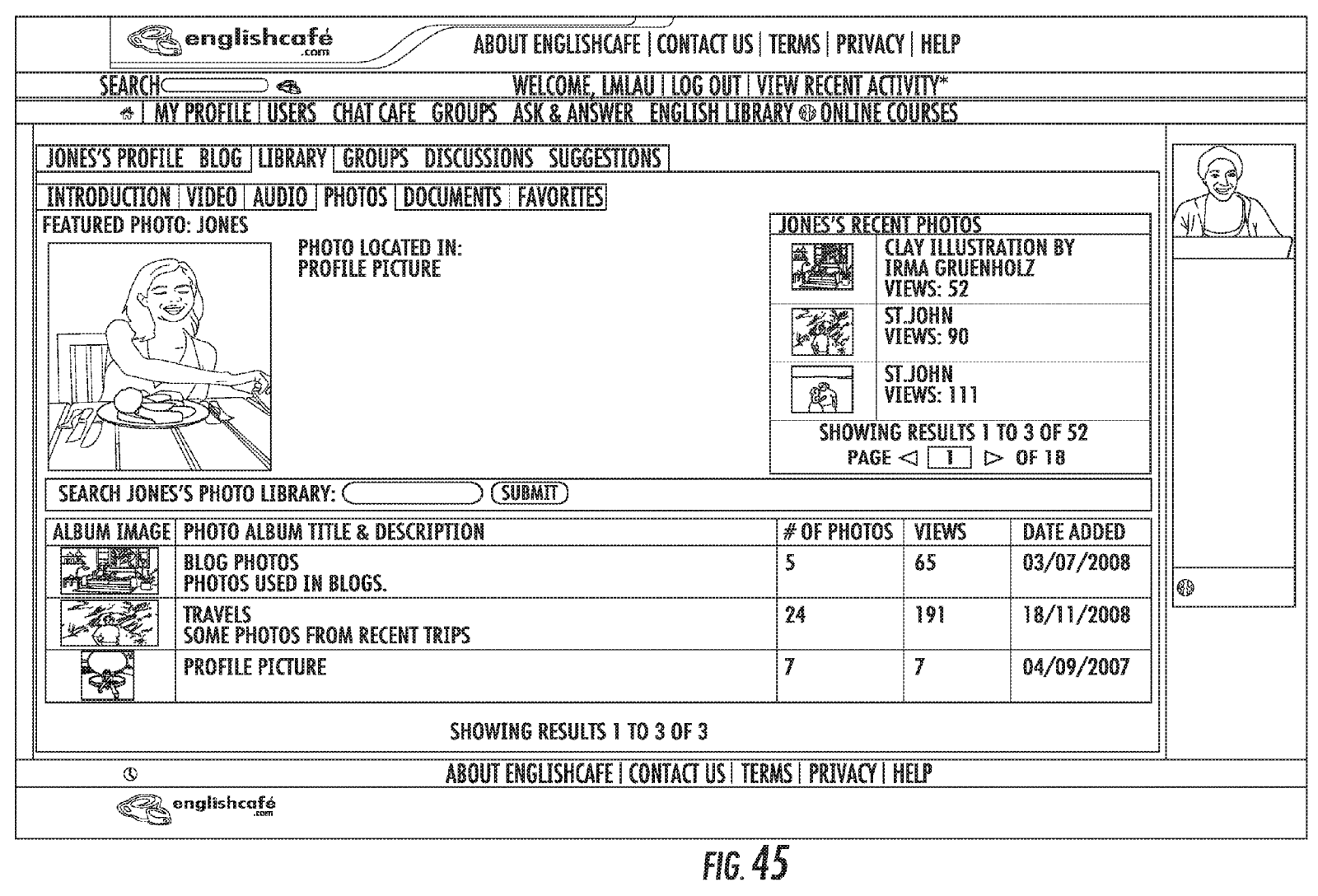

FIG. 45 shows an example of a user's photo library page.

Figure 46:
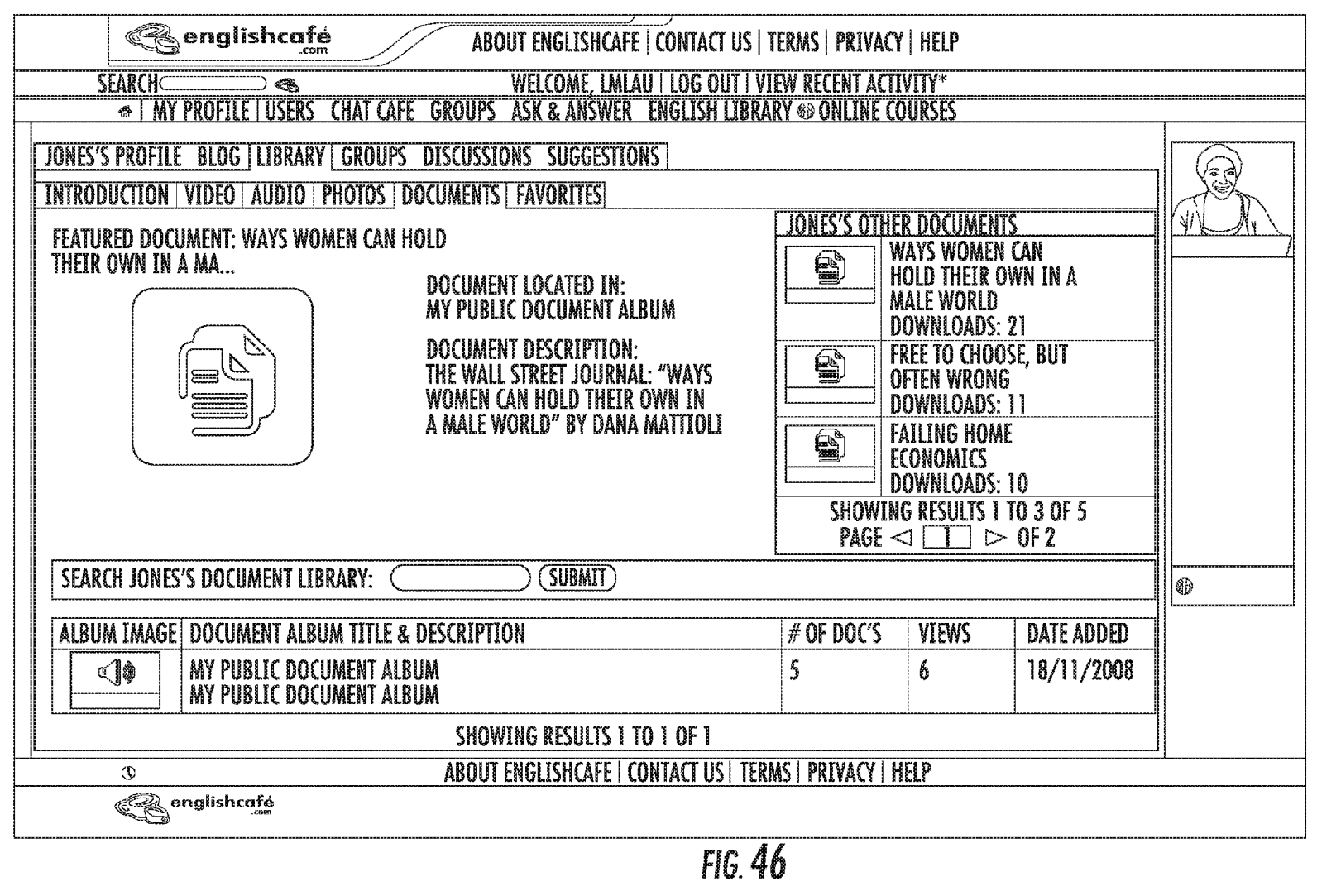

FIG. 46 shows an example of a user's document library page.

FIG. 47 shows an example of a user's favorites library page.

FIG. 50A shows an example of a chat cafe page.

FIG. 50B shows an example of a chat cafe discussion forums page.

FIG. 50C shows an example of a chat cafe rules page.

FIG. 51 shows an example of a browse groups page.

FIG. 52 shows an example of a create groups page.

FIG. 56 shows an example of a latest library additions page.

FIG. 58 shows an example of an on-line courses page.

DETAILED DESCRIPTION OF THE INVENTION

Figure 1:
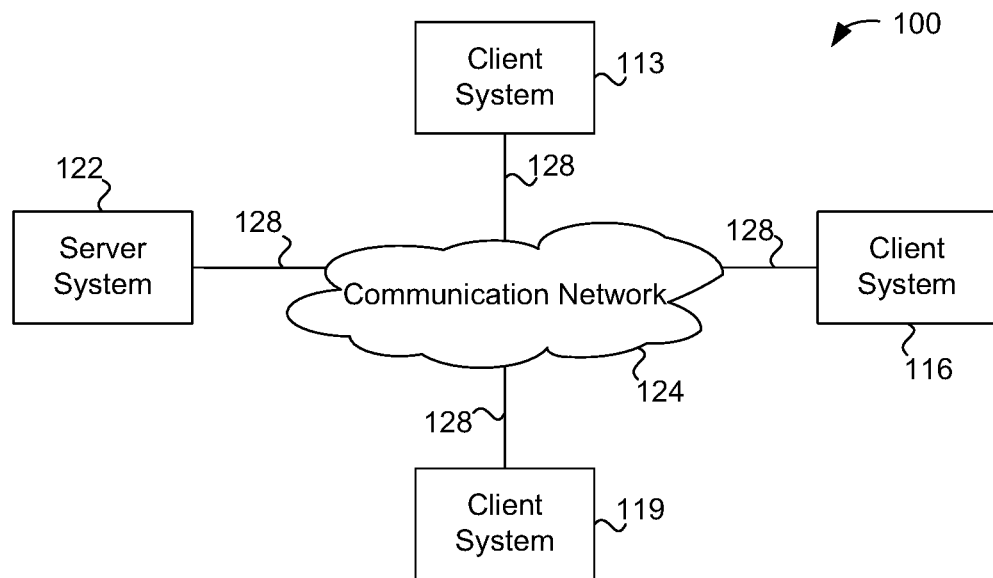
FIG. 1 shows a simplified block diagram of a client-server system and network in which an embodiment of the invention may be implemented.

FIG. 1 is a simplified block diagram of a distributed computer network 100 incorporating an embodiment of the present invention. Computer network 100 includes a number of client systems 113, 116, and 119, and a server system 122 coupled to a communication network 124 via a plurality of communication links 128. Communication network 124 provides a mechanism for allowing the various components of distributed network 100 to communicate and exchange information with each other.

Communication network 124 may itself be comprised of many interconnected computer systems and communication links. Communication links 128 may be hardwire links, optical links, satellite or other wireless communications links, wave propagation links, or any other mechanisms for communication of information. Various communication protocols may be used to facilitate communication between the various systems shown in FIG. 1. These communication protocols may include TCP/IP, HTTP protocols, wireless application protocol (WAP), vendor-specific protocols, customized protocols, and others. While in one embodiment, communication network 124 is the Internet, in other embodiments, communication network 124 may be any suitable communication network including a local area network (LAN), a wide area network (WAN), a wireless network, a intranet, a private network, a public network, a switched network, and combinations of these, and the like.

Distributed computer network 100 in FIG. 1 is merely illustrative of an embodiment incorporating the present invention and does not limit the scope of the invention as recited in the claims. One of ordinary skill in the art would recognize other variations, modifications, and alternatives. For example, more than one server system 122 may be connected to communication network 124. As another example, a number of client systems 113, 116, and 119 may be coupled to communication network 124 via an access provider (not shown) or via some other server system.

Client systems 113, 116, and 119 typically request information from a server system which provides the information. For this reason, server systems typically have more computing and storage capacity than client systems. However, a particular computer system may act as both a client or a server depending on whether the computer system is requesting or providing information. Additionally, although aspects of the invention has been described using a client-server environment, it should be apparent that the invention may also be embodied in a stand-alone computer system.

Server 122 is responsible for receiving information requests from client systems 113, 116, and 119, performing processing required to satisfy the requests, and for forwarding the results corresponding to the requests back to the requesting client system. The processing required to satisfy the request may be performed by server system 122 or may alternatively be delegated to other servers connected to communication network 124.

According to the teachings of the present invention, client systems 113, 116, and 119 enable users to access and query information stored by server system 122. In a specific embodiment, a "web browser" application executing on a client system enables users to select, access, retrieve, or query information stored by server system 122. Examples of web browsers include the Internet Explorer browser program provided by Microsoft Corporation, and the Firefox browser provided by Mozilla, and others.

Figure 2:
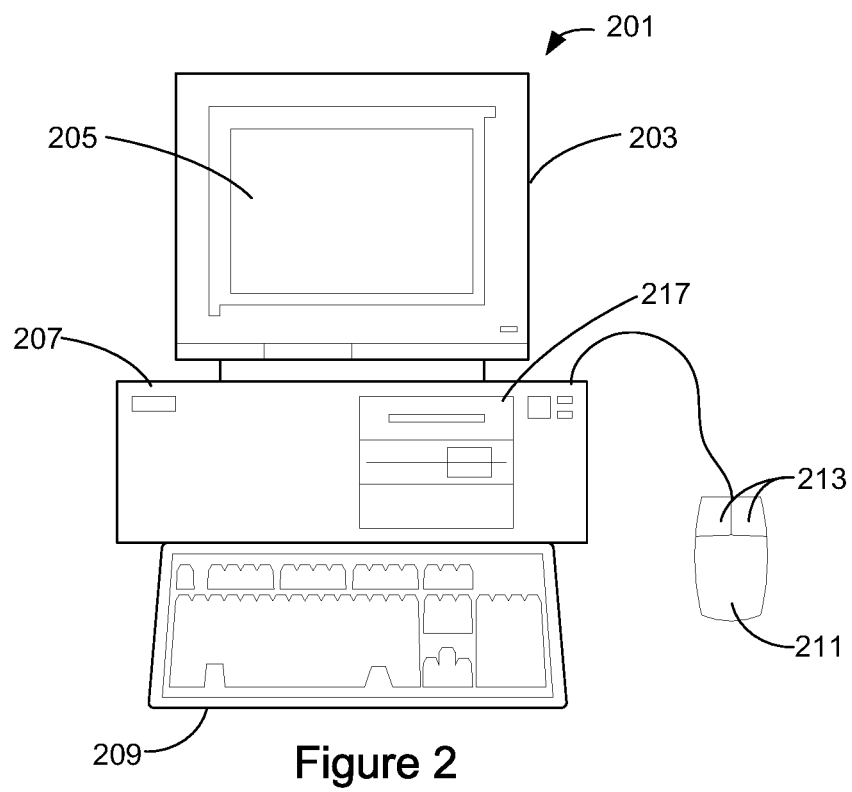
FIG. 2 shows a more detailed diagram of an exemplary client or computer which may be used in an implementation of the invention.

FIG. 2 shows an exemplary client system (or server system) of the present invention. In an embodiment, a user interfaces with the system through a computer workstation system, such as shown in FIG. 2. FIG. 2 shows a computer system 201 that includes a monitor 203, screen 205, cabinet 207, keyboard 209, and mouse 211. Mouse 211 may have one or more buttons such as mouse buttons 213. Cabinet 207 houses familiar computer components, some of which are not shown, such as a processor, memory, mass storage devices 217, and the like.

Mass storage devices 217 may include mass disk drives, floppy disks, magnetic disks, optical disks, magneto-optical disks, fixed disks, hard disks, CD-ROMs, recordable CDs, DVDs, recordable DVDs (e.g., DVD-R, DVD+R, DVD-RW, DVD+RW, HD-DVD, or Blu-ray Disc), flash and other nonvolatile solid-state storage (e.g., USB flash drive), battery-backed-up volatile memory, tape storage, reader, and other similar media, and combinations of these.

A computer-implemented or computer-executable version of the invention may be embodied using, stored on, or associated with computer-readable medium. A computer-readable medium may include any medium that participates in providing instructions to one or more processors for execution. Such a medium may take many forms including, but not limited to, nonvolatile, volatile, and transmission media. Nonvolatile media includes, for example, flash memory, or optical or magnetic disks. Volatile media includes static or dynamic memory, such as cache memory or RAM. Transmission media includes coaxial cables, copper wire, fiber optic lines, and wires arranged in a bus. Transmission media can also take the form of electromagnetic, radio frequency, acoustic, or light waves, such as those generated during radio wave and infrared data communications.

For example, a binary, machine-executable version, of the software of the present invention may be stored or reside in RAM or cache memory, or on mass storage device 217. The source code of the software of the present invention may also be stored or reside on mass storage device 217 (e.g., hard disk, magnetic disk, tape, or CD-ROM). As a further example, code of the invention may be transmitted via wires, radio waves, or through a network such as the Internet.

Figure 3:
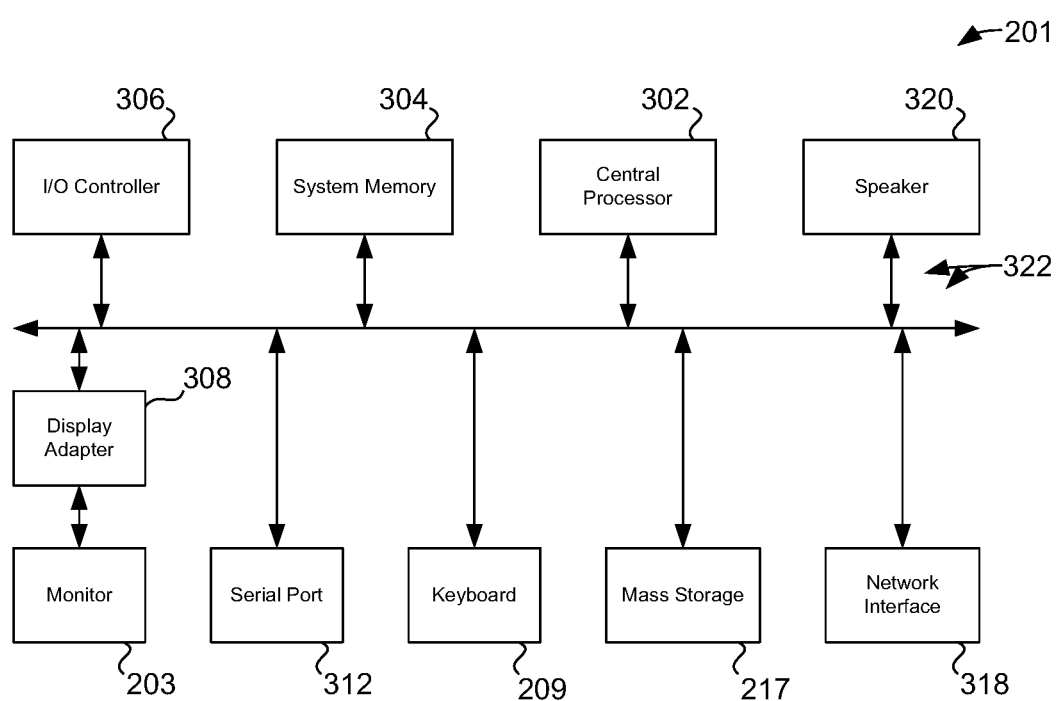
FIG. 3 shows a system block diagram of a client computer system used to execute application programs such as a web browser.

FIG. 3 shows a system block diagram of computer system 201 used to execute the software of the present invention. As in FIG. 2, computer system 201 includes monitor 203, keyboard 209, and mass storage devices 217. Computer system 501 further includes subsystems such as central processor 302, system memory 304, input/output (I/O) controller 306, display adapter 308, serial or universal serial bus (USB) port 312, network interface 318, and speaker 320. The invention may also be used with computer systems with additional or fewer subsystems. For example, a computer system could include more than one processor 302 (i.e., a multiprocessor system) or a system may include a cache memory.

Arrows such as 322 represent the system bus architecture of computer system 201. However, these arrows are illustrative of any interconnection scheme serving to link the subsystems. For example, speaker 320 could be connected to the other subsystems through a port or have an internal direct connection to central processor 302. The processor may include multiple processors or a multicore processor, which may permit parallel processing of information. Computer system 201 shown in FIG. 2 is but an example of a computer system suitable for use with the present invention. Other configurations of subsystems suitable for use with the present invention will be readily apparent to one of ordinary skill in the art.

Computer software products may be written in any of various suitable programming languages, such as C, C++, C#, Pascal, Fortran, Perl, Matlab (from MathWorks, www-.mathworks.com), SAS, SPSS, JavaScript, AJAX, and Java. The computer software product may be an independent application with data input and data display modules. Alternatively, the computer software products may be classes that may be instantiated as distributed objects. The computer software products may also be component software such as Java Beans (from Sun Microsystems) or Enterprise Java Beans (EJB from Sun Microsystems).

An operating system for the system may be one of the Microsoft Windows® family of operating systems (e.g., Windows 95, 98, Me, Windows NT, Windows 2000, Windows XP, Windows XP x64 Edition, Windows Vista, Windows 7, Windows CE, Windows Mobile), Linux, HP-UX, UNIX, Sun OS, Solaris, Mac OS X, Alpha OS, AIX, IRIX32, or IRIX64. Other operating systems may be used. Microsoft Windows is a trademark of Microsoft Corporation.

Furthermore, the computer may be connected to a network and may interface to other computers using this network. The network may be an intranet, internet, or the Internet, among others. The network may be a wired network (e.g., using copper), telephone network, packet network, an optical network (e.g., using optical fiber), or a wireless network, or any combination of these. For example, data and other information may be passed between the computer and components (or steps) of a system of the invention using a wireless network using a protocol such as Wi-Fi (IEEE standards 802.11, 802.11a, 802.11b, 802.11e, 802.11g, 802.11i, and 802.11n, just to name a few examples). For example, signals from a computer may be transferred, at least in part, wirelessly to components or other computers.

In an embodiment, with a web browser executing on a computer workstation system, a user accesses a system on the World Wide Web (WWW) through a network such as the Internet. The web browser is used to download Web pages or other content in various formats including HTML, XML, text, PDF, and postscript, and may be used to upload information to other parts of the system. The web browser may use uniform resource identifiers (URLs) to identify resources on the web and hypertext transfer protocol (HTTP) in transferring files on the web.

A specific implementation of this invention is a social network for teaching and learning the English language. One of skill in the art would understand that the principles of the invention apply to teaching and learning other subjects, including languages other than English. The principles of the invention could apply to teaching and learning languages such as French, German, Portuguese, Korean, Russian, Turkish, Spanish, Italian, Chinese, Japanese, Arabic, and other languages. The system provides users with a virtual immersion in different languages, cultures, and customs because users can have rich, interactive experiences with other users from across the world.

Aspects of the invention may also be used to implemented other types of Web sites and applications including social networking sites having various, different purposes (matchmaking, marketing, music, video, and not necessarily collaborative or e-learning), educational sites (e.g., Wiki, encyclopedia—analogous to Wikipedia), collaborative and e-learning sites, collaborative content development, collaborative review, desktop or on-line word processing applications, and others.

One of skill in the art would also understand that the principles of the invention may apply to commenting on any block of data, such as Web pages or other documents, videos, pictures, files written in HTML, or other formats (text, XML, PDF, and PostScript) and rating such comments.

Figure 4:
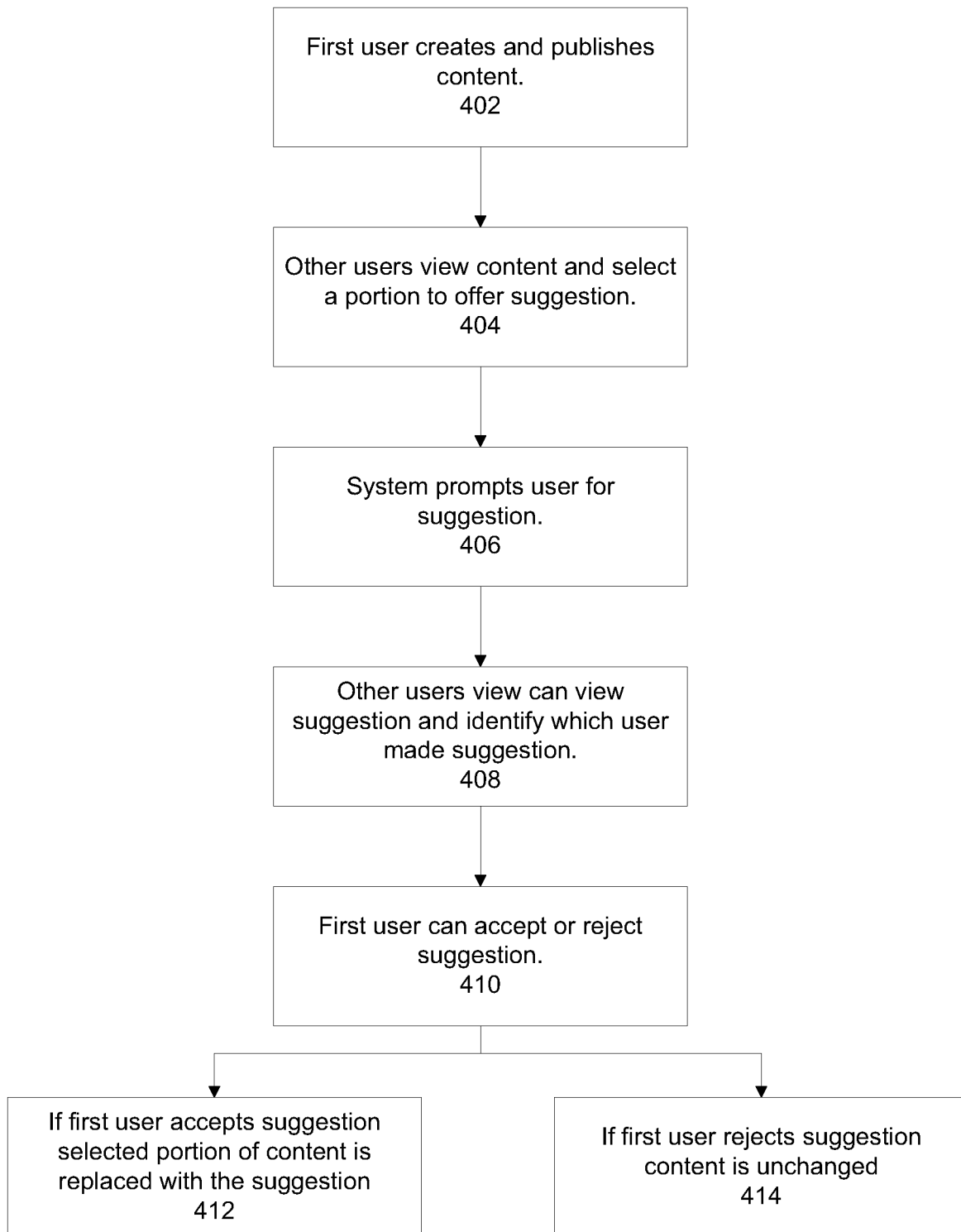
FIG. 4 shows a flow diagram for making suggestions to content on a Web page.

FIG. 4 shows a specific flow diagram for making suggestions to content on a Web page. In a step 402 a first user or author creates and publishes content. Creating content can include uploading content or cutting and pasting content from different sources. The content can cover any topic or matter and can be in any format or medium. The content can include text, video, audio, images, graphics, pictures, animation, or combinations of these.

Some examples of text include ASCII text, EBCDIC text, alphanumeric characters, written work, written language, letters, words, symbols, and characters, and combinations of these. Some examples of video include movie clips, television clips, music videos, video blogs, podcasts, Adobe® Flash®, Microsoft® Silverlight™, MPEG, AVI, MKV, Apple® QuickTime, MP4, DivX, Xvid, and H.264, and combinations of these. Some examples of audio include MP3, WAV, OGG, and FLAC. Some examples of graphics and pictures include TIFFs, JPEGs and GIFs.

In a specific implementation, the first user creates a Web page or other document type. In this specific implementation, the Web page is created directly on the system (i.e., without the use of a separate application program). The system provides the user with a text entry box into which the first user using, for example, a keyboard can type and create content. The user may include pictures, videos, or both with the content. For example, the user can upload pictures from the client to the server so that the pictures are associated with the content. Similarly, the user can upload video from the client to the server so that the videos are associated with the content.

The system may provide the user with a text entry boxes into which the first user can input a title of the content, keywords to associate with the content, and a menu of skill levels to associate with the content (e.g., beginner, intermediate, and advanced).

In another implementation, the Web page is created using separate application that may or may not connect to the server. For example, the Web page or document may be created using a word processor or text editor application, saved on the client, and then uploaded to the server.

The first user can publish the content. That is, the first user may make visible or share the content with any number of users. For example, after the first user inputs the content the first user can click a button (e.g., publish button) to publish the content. Then, other users will be able to see the content. The system allows the first user to save a draft of the content. The draft may be saved at the server, at the client, or both. Thus, if the user is not yet ready to share (e.g., publish) the content, the user can save a draft and resume editing the draft at a later time.

Once published, the content may be visible to any member of the public, only registered users of the system (e.g., only community members), or only a subset or group of registered users. The first user may edit the content after the content has been published.

In an implementation, the first user can create any number of subsets of users to share the content with. As an example, the first user can create first and second subsets that include the first user's family members and friends, respectively. The system provides a text entry box into which the first user can enter the e-mail addresses of people to include in the subsets. Then, the system sends an e-mail to each of the persons to notify them that they have been invited to view the content created by the first user. These persons can then log on the system and view the content. Other users who have not been invited will not be able to see the content.

In another implementation, the system allows the first user to create one or more filters to limit which users can access the content. For example, the first user may wish to make the content visible only to users who speak a particular language, live in a particular country, have a specific language proficiency (e.g., beginner, intermediate, advanced, fluent, or expert), or combinations of these. The system allows the user to create any number of filters having any number of criteria.

In a step 404, one or more other users can view the content created by the first user. The one or more users can select a portion of the content or Web page to offer a suggestion (e.g., comment, annotation, or remark). For example, a second user wishing to make a suggestion regarding a specific portion of the content can identify and select the portion of the content.

It should be appreciated that there can be any number of users concurrently and simultaneously viewing the content and selecting portions of the content to offer suggestions and explanations. The number of users may range from just one user to tens, hundreds, thousands, or millions of users. Two or more users may offer suggestions and explanations to the same content in the Web page or document or to different content in the same Web page or document.

In a specific implementation, only registered users are able to make suggestions. When an unregistered user attempts to make a suggestion the system will respond by prompting the user for a user name and password or will invite the user to register. A user may register by completing a registration form. The registration data may include: name (e.g., first and last), e-mail, password (e.g., entered twice to confirm), native or preferred language (e.g., English or Spanish), and an agreement to terms and conditions (e.g., a check box). In an implementation, confirmation e-mails are written in HTML with text underlay for broadest client compliance.

After receiving a reply to a confirmation e-mail, the system guides the new user through a process of setting up a user profile (e.g., uploading a user profile picture, inputting hobbies and interests, and favorite foods).

In a specific implementation where the content includes text, the specific portion of the content may include a character, symbol, word, sentence, or paragraph. In another implementation where the content includes a picture the specific portion of the content may be a specific image, location, or region in the picture.

In another implementation where the content includes a video, the specific portion of the content may include a specific frame of the video, a specific time in the video, or a specific image in the frame of the video. The specific portion may include a specific time range in the video.

The user may use a pointing device such as a mouse to highlight the portion of the content. For example, if the content includes a body of text, the user may click and drag their cursor over a portion of the text to highlight and select the portion. Any technique may be used to visually distinguish the selected text from the body of text. In a specific implementation, a background color of the selected text is different from a background color of the body of text (or nonselected text). For example, if the background color of the nonselected text is white the background color of selected text can be blue, red, yellow, or combinations of these.

If the content includes a picture the user can place the cursor on the picture and drag the cursor to form a box around a portion of the picture. The box then indicates the selected portion of the picture. As another example, if the content includes a video the user can place the cursor over the video and click a frame of the video to select the frame.

In an implementation, code permitting the second user to select the portion of the content is stored as part of the Web page.

In a step 406, the system detects the selected or highlighted portion and prompts the second user for the suggestion (e.g., comment, annotation, or remark). In a specific implementation, a dialog box pops-up on a screen of the client. The dialog box includes an input box for the user to input the suggestion. Code for displaying the dialog box may be stored as part of the Web page.

Any input device may be used to input the suggestion. Some examples of input devices include a keyboard, pointing device (e.g., mouse), microphone, camera, video camera, and the like.

In a specific implementation, the input device is a keyboard and the system presents the second user with an input box (e.g., in a separate screen or window) so that the user can enter or type the suggestion. For example, the suggestion may be a revision to a sentence to make the sentence read more clearly. Thus, the revision may be to correct a spelling mistake, a passive voice occurrence, a grammar mistake, a plural word occurrence, a verb tense, a stylistic or punctuation mistake, or any other grammar rule, to correct a factual mistake, and so forth.

Similar to the content, the suggestion can include text (e.g., ASCII text, EBCDIC text, alphanumeric characters), video (e.g., Adobe® Flash®), audio (e.g., MP3), images, graphics, pictures (e.g., TIFFs, JPEGs), animation, or combinations of these.

In an implementation, the system provides another input box so that the second user can enter an explanation or reason for the suggestion. For example, table A below shows an example of a suggestion and explanation that the second user may make to a selected or highlighted portion of the content.

TABLE A

| | |
|---|---|
| Highlighted Content | The man was bitten by the dog. |
| Suggestion | The dog bit the man. |
| Explanation | In the passive voice the subject receives the action. In the active voice the subject of the sentence does the action. |

Entering an explanation can be optional. That is, the second user may not need to input an explanation for the suggestion.

In another specific implementation, the input device is a microphone. The user can input the suggestion, explanation, or both by speaking into a microphone at the client. This audio information may then be saved at the client, server, or both. The user may instead or additionally upload a file including audio information (e.g., suggestion and explanation) from the client to the server.

A voice-to-text translation feature of the system can convert and translate the suggestion, explanation, or both into text that is displayed on the screen of the client.

The user can input the suggestion, explanation, or both using any language. The system can convert the input into another language, different from the input language, and display the suggestion, explanation, or both in the other language. For example, a user can input a suggestion in English. The system can translate the suggestion into French and display the translated suggestion to another user.

In a specific implementation, the system provides one or more tools such as a spell checker, a grammar checker, a dictionary, a thesaurus, or combinations of these. This allows, for example, the user to check the suggestion for any spelling mistakes before submitting the suggestion.

The system receives the suggestion, explanation, or both at the server. The system can associate the suggestion with the selected content, the explanation with the suggestion, and the user with the suggestion and explanation. In a specific implementation, the user's suggestion, explanation or both are stored in a database for such suggestions and explanations which is separate from the Web page (e.g., content of the Web page) or document itself. The suggestion, explanation or both may be stored in a file that is separate from the Web page or document itself.

In this specific implementation, the system stores information on the suggestion at a location separate from the Web page. The information includes the suggestion, a Web page identifier, and the selected portion of the Web page.

The Web page identifier may be used to relate the suggestion, the selected portion of the Web page, or both to the Web page. The Web page identifier may be a unique series of numbers, characters, letters, or combinations of these (e.g., alphanumeric). The Web identifier may be a uniform resource identifier (URI), uniform resource locator (URL), address, pointer, link, or other reference to the Web page.

The information stored may further include information identifying the author of the suggestion, the selected content's location or position within the Web page, an explanation of the suggestion, the date and time that the suggestion was made, rating information of the suggestion given by other users, or combinations of these.

Any number of users may make comments or suggestions about the content of a particular Web page or document.

In a step 408 other users can view the suggestions and can identify which user made the suggestion. For example, the first user is able to see the suggestion from or submitted by the second user (e.g., second user's suggestion) and its associated content (e.g., the original sentence without revision). Since there can be any number of users offering suggestions, the system allows the first user to scroll through and view each of the suggestions and identify the user (e.g., user name) who made the suggestion.

Generally, any user viewing the content is also able to see which portion of the content received the suggestion, to see the suggestion, and to see or identify which user made the suggestion. In other words, other users who have not made any suggestions may be able to scroll through and view the suggestions. However, in other implementations, only specific users (e.g., content author) are able to see which portion of the content has received the suggestion and the suggestion.

In a specific implementation, the system marks the portion of the content for which there is a suggestion. That is, the system displays a visual cue or indicator adjacent to the portion of the content that received a suggestion. This allows users to quickly identify which portions of the content have associated suggestions.

Any technique may be used for visually indicating or highlighting the portion of the content that has a suggestion. In various implementations, a type of visual indicator can be a box, cloud, circle, or oval surrounding or encircling the portion of the content (e.g., a box surrounding an image in a picture). A type of visual indicator can include underlining of the portion of the content for which there is a suggestion. For example, there may be a line drawn beneath the portion of the content (e.g., text) for which there is a suggestion.

The type of visual indictor may instead or additionally indicate other information related to the suggestion. The type of visual indicator can be specific to a user who made the suggestion. Thus, a first portion of the content displayed with a first type of visual indicator may indicate a suggestion from user A. A second portion of the content displayed with a second type of visual indicator, different from the first type, may indicate a suggestion from user B. The first type of visual indicator may include a red underline. The second type of visual indicator may include a blue underline.

The type of visual indicator can be specific to a rating of a user who made the suggestion. Thus, a first portion of the content displayed with a first type of visual indicator may indicate a suggestion from a user who has a high rating. A second portion of the content displayed with a second type of visual indicator, different from the first type, may indicate a suggestion from user who has a low rating. The visual indicators may include displaying the selected content in a specific on font size. For example, displaying the first selected content in a font size greater than the second selected content may indicate the user making the suggestion for the first selected content has a higher rating than the user making the suggestion for the second selected content.

In a specific implementation, the users can rate the suggestion. Any type of rating system may be used. For example, a suggestion may be rated on a scale of poor to excellent. The scale may include numbers, symbols (e.g., stars), letter grades (e.g., A, B, C, D, F), and so forth. For example, a user may rate a suggestion with one star to indicate that the suggestion is a poor one. The user may rate the suggestion with five stars to indicate that the suggestion is an excellent one.

In a step 410 the first user decides whether or not to adopt the suggestion. In a specific implementation, only the first user as the author of the content (or other users authorized by the first user) is able to adopt the suggestion. Adopting the suggestion includes, for example, accepting a suggested revision to a sentence; or accepting a suggested change to a video.

In a step 412 if the first user accepts the suggestion the portion of the content is replaced with the suggestion (e.g., the suggested sentence replaces the portion of the content on the Web page). In a step 414 if the first user rejects the suggestion the content remains (e.g., the sentence on the Web page will not change).

In a specific implementation, the system sends a notification (e.g., e-mail notification) to the second user or other users who made the suggestion. The notification can indicate whether the first user accepted or rejected the suggestion.

However, the notification is optional and in some implementations, the system will not send a notification. It should also be appreciated that the system may send notifications based on other events. For example, the system may send a notification to the first user after the second user makes a suggestion, send a notification to the second user when the first user reads the suggestion from the second user, and so forth.

Figure 5:
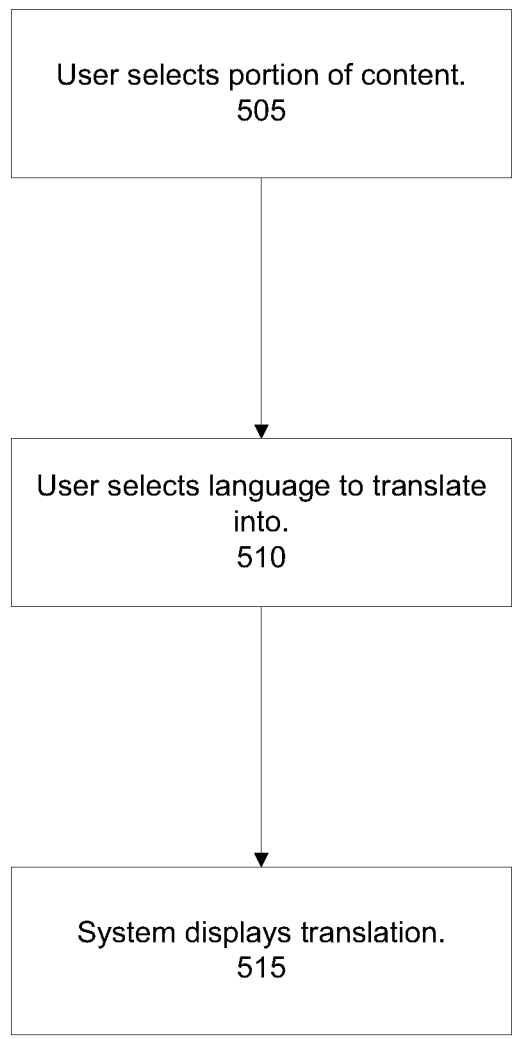
FIG. 5 shows a flow diagram for translating content on a Web page.

FIG. 5 shows a specific flow diagram for translating content on a Web page. In this specific implementation, the content to be translated includes text. In a step 505 the user selects a portion of the content. For example, the user may drag the mouse cursor over the portion of the text that the user would like translated.

In a step 510 the user selects the language to translate the portion of the text into. The user can select any language. Some examples of languages include German, Spanish (e.g., Latin American Spanish or Spain), Portuguese (Brazil), French, Italian, Japanese, Chinese (e.g., simplified or traditional), Korean, Russian, Polish, Latin, Hindi, Arabic, and so forth.

In a specific implementation, these language choices are displayed in a drop down list for the user to choose from. A default language choice in the drop down list may be based on a user profile stored at the server. For example, the user's profile may include information indicating that the user's native language is Korean. The system will consult the user's profile and include Korean as the default language choice in the drop down list. As another example, the user's profile may include information indicating that the user's preferred language for translations is Italian. Thus, Italian will be the default language choice in the drop down list.

The user may instead or additionally choose to see a phonetic translation of the selected text. For example, the user may choose see the selected text translated using the International Phonetic Alphabet (IPA).

In a step 515, once the user selects the translation language, the system displays the translation on a screen of the client system. In a specific implementation, the system displays at least one of two or more translations in a window or dialog box on the client. The at least one translation to display is based on information in a user profile. In this specific implementation, the user profile includes information relating to a level of the user to which to translate the selected content. For example, if the user is a college-level user, the system will provide an appropriate college-level translation or definition.

Figure 6:
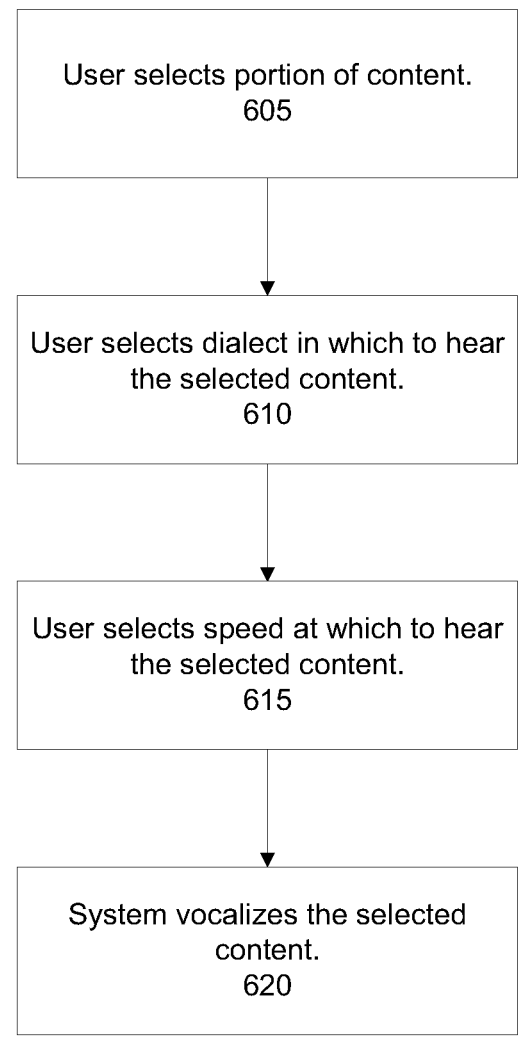
FIG. 6 shows a flow diagram for vocalizing content on a Web page.

FIG. 6 shows a specific flow diagram for vocalizing content on a Web page. In this specific implementation, the content to be vocalized includes text. In a step 605 the user selects a portion of the content or text. In a step 610 the user selects the voice, language, dialect, accent, or combinations of these in which to hear the selected text. Some examples of different dialects or accents include East Indian, American or United States, United Kingdom (UK) English, Southern American English, New York, Eastern New England, Cameroon English, Jamaican English, Mandarin Chinese, Cantonese, Sardinian, Ladin, and Friulian—just to name a few examples. Some examples of different voices include female, male, adult female, adult male, male child, and female child.

As an example, the user may choose to hear the selected text with a U.S. English accent as spoken by a male; a U.S. English accent as spoken by a female; a UK English accent as spoken by a male; a UK English accent as spoken by a female; an East Indian accent as spoken by a male; or an East Indian accent as spoken by a female.

In a step 615 the user chooses the speed or rate at which to hear the selected text. The user can choose any number of speeds or any range of speeds. In a specific implementation, a user can choose from at least two speeds in which to hear the selected text. There is a first speed and a second speed. The first speed is different from the second speed. For example, the first speed may be greater than the second speed. In an implementation, the first speed may be referred to as "normal" speed. The second speed may be referred to as "slow" speed.

Thus, the user can choose to hear an audio representation of the selected text at a first audio speed or a second audio speed. A first length of time for a first audio representation is X seconds. A second length of time for a second audio representation is Y seconds. Y is longer than X. Y may range from about 1 second to about 15 seconds longer than X. This includes, for example, 2, 3, 4, 5, 6, 7, 8, 9, 10, 11, 12, 13, 14, 14.9, or more than 15 seconds longer than X. Y may be less than 1 second longer than X.

Further, Y may range from about 1.01 to about 1.20 times longer than X. For example, a ratio of Y to X may be about 1.02, 1.03, 1.05, 1.07, 1.08, 1.10, 1.11, 1.12, 1.15, 1.16, or 1.18, or greater than 1.20.

The first speed may range from about 1.1 to about 3 times faster than the second speed. For example, the first speed may be about 1.2, 1.3, 1.4, 1.5, 1.6, 1.7, 1.8, 1.9, 2, 2.1, 2.2, 2.3, 2.4, 2.5, 2.6, 2.7, 2.8, 2.9, or more than 2.9 times faster than the second speed. The first speed may be less than 1.1 times faster than the second speed.

The user may instead or additionally choose the pitch, tone, intonation, or combinations of these in which to hear the selected text. For example, the user may choose either a low pitch or a high pitch in which to hear the selected text.

It can be challenging for a user seeking to learn a new language such as English by listening to words spoken at a normal rate. Allowing the user to choose the speed, pitch, tone, or combinations of these in which to hear the selected text can help the user comprehend the pronunciation and rhythm of a foreign language, accent, or dialect.

For example, the user can choose a speed which is slower than the normal speed. The normal speed may be defined as the speed at which a conversation takes place between two or more speakers who are speaking the same dialect and are fluent in the dialect or between a speaker and a listener where the speaker and the listener are fluent in the dialect. As an example, the user can choose a speed that is a fraction of the normal speed such as ⅞ speed, ¾ speed, ⅝ speed, ½ speed, ¼ speed, and other slower speeds. Slowing down the speed of the spoken words helps the user to hear the words so the user can more easily learn how to properly pronounce the words. The user can learn a word or phrase slowly and then learn how to say it and understand it at normal speed.

In a step 620 the system vocalizes the selected text. The selected text may be vocalized n the accent selected by the user (step 610). Furthermore, the selected text may be vocalized using the speed, pitch, tone, or combinations of these selected by the user (step 615).

Figure 7A:
FIG. 7A shows an example of inputting content for a Web page.

FIG. 7A shows an example of a page for inputting content for a Web page. There can be input boxes for inputting the content, the title of the content, keywords describing the content, and a menu (e.g., radio buttons) for specifying a skill level (e.g., English proficiency level) of the user. Buttons allow the content author to cancel the creation, save a draft of the content, or publish the content.

Figure 7B:
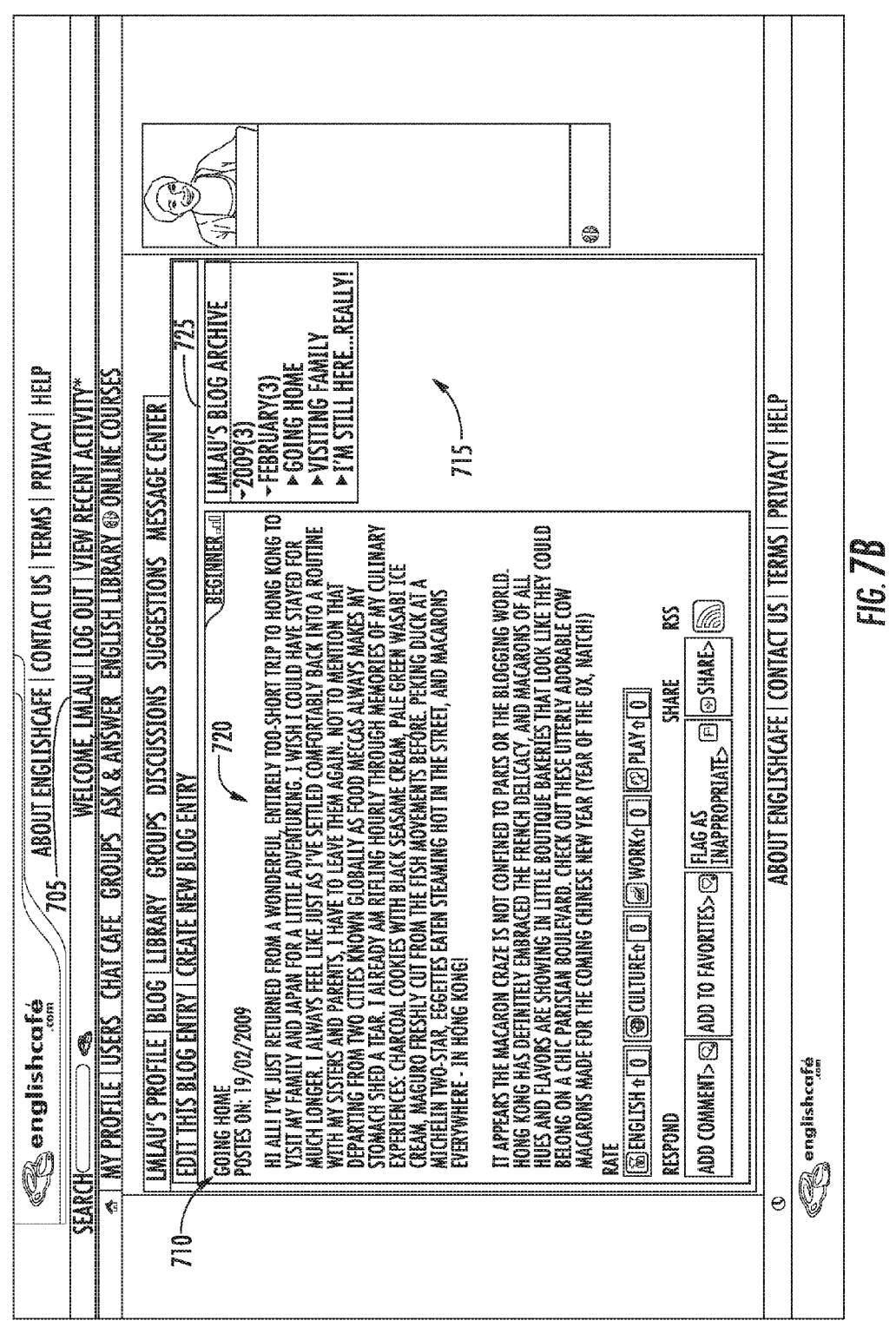

FIG. 7B shows an example of a page from a community-based social network of the invention. In this specific implementation, a system of the invention is implemented as a Web log or blog. A blog may be defined as a frequent, chronological publication of personal thoughts and Web links. Typically, the blog contains information about what is occurring in a person's life, in a certain area of specialty, such as food, travel, technology, finance, politics, sport, law, and medicine, or any combination of these. Blogs that contain information about what is occurring in a person's life may be referred to as a living journal or an online chronicle.

Specific aspects of the invention are implemented at a Web site known as EnglishCafe, which serves a community focused on English learning. EnglishCafe may be associated with an e-learning site (e.g., GlobalEnglish) that has on-line courses for teaching students English. Each student at the e-learning site may be given the opportunity to join the EnglishCafe community site, where each student can create their own pages for others to view. Community members need not necessarily be teachers or users associated with the e-learning site.

For more details, see U.S. patent application Ser. No. 11/160,098, filed Jun. 8, 2005; Ser. No. 11/164,726, filed Dec. 2, 2005, claiming the benefit of 60/596,037, filed Aug. 25, 2005; Ser. No. 09/617,169, filed Jul. 17, 2007, issued as U.S. Pat. No. 7,389,221 on Jun. 17, 2008; and Ser. No. 09/412,043, filed Oct. 4, 1999, issued as U.S. Pat. No. 6,453,290 on Sep. 17, 2002, which are all incorporated by reference. Aspects of e-learning discussed in these applications may be used or combined with aspects and features discussed in this application.

For example, the toolbox translate feature (see below) may include: a translation window that is created by a program associated with a primary web page and is opened in conjunction with a web page window containing a secondary web page, where the translation window and the web page window are automatically positioned and sized so that the translation window and the web page window fit on one screen without overlapping, where the translation window is not laid out as a frame prior to the translation window being positioned and sized; an input field for a user to provide information in a first language; a translator that is linked to a translation dictionary database; and an output field including information in a second language corresponding to a translation of the information in the first language. This toolbox also includes the suggestion feature described.

In other implementations, the toolbox translate feature may include: a translation window generated by a program associated with a primary web page, where the translation window is opened in conjunction with a web page window containing a secondary web page, and where the translation window and the web page window are automatically positioned and sized so that the translation window and the web page window fit on one user-viewable screen without overlapping, where the translation window is not laid out as a frame prior to the translation window being positioned and sized; an input field for a user to supply one word in a first language; a translator that is linked to a translation dictionary database accessible through the internet; and an output field including one or more definitions of the one word in a second language.

The toolbox translate feature may include: providing a translation window that is generated by a program associated with a primary web page; opening the translation window in conjunction with a web page window, the web page window having a secondary web page; automatically adjusting the size and position of the translation window so that the translation window and the web page window fit on one user-viewable screen without overlapping, where the translation window is not laid out as a frame prior to the translation window being positioned and sized; receiving input information in a first language; translating the input information from the first language to information in a second language; and outputting the information in the second language.

The toolbox translate feature may include: a translation window that is created by a program associated with a primary web page and is opened in conjunction with a web page window having a secondary web page, the translation window and the web page window being automatically positioned and sized so that the translation window and the web page window fit on one screen without overlapping, where the translation window is not laid out as a frame prior to the translation window being positioned and sized; an input field for a user to provide information in a first language; a translator that is linked to a translation dictionary database; and an output field including information in a second language corresponding to a translation of the information in the first language.

The toolbox translate feature may include: a translation window generated by a program associated with a primary web page, where the translation window is opened in conjunction with a web page window having a secondary web page, the translation window and the web page window being automatically positioned and sized so that the translation window and the web page window fit on one user-viewable screen without overlapping, where the translation window is not laid out as a frame prior to the translation window being positioned and sized; an input field for a user to supply one word in a first language; a translator that is linked to a translation dictionary database accessible through the internet; and an output field including one or more definitions of the one word in a second language.

The toolbox translate feature may include: providing a translation window that is generated by a program associated with a primary web page; opening the translation window in conjunction with a web page window, the web page window having a secondary web page, where the translation window is not opened from a frame layout; automatically adjusting the size and position of the translation window so that the translation window and the web page window fit on one user-viewable screen without overlapping; receiving input information in a first language; translating the input information from the first language to information in a second language; and outputting the information in the second language.

The toolbox translate feature may include: providing program code to launch a translation window associated with a primary window; providing a link to the program code, where when the primary window is displayed on a screen and the user selects the link, the program code causes the translation window to open on the screen; in the translation window, receiving input information in a first language; translating the input information from the first language to information in a second language; and in the translation window, outputting the information in the second language.

The toolbox translate feature may include: providing program code to launch a translation window associated with a primary window; providing a link to the program code, where when the primary window is displayed on a screen and the user selects the link, the program code causes the translation window to open on the screen, and the translation window will be positioned so that the translation window does not overlap the primary window; receiving input information in a first language in a text box of the translation window; translating the input information from the first language to information in a second language, where the information in the second language is received from a first source; and displaying the information in the second language in the translation window, where the translation window has a length longer than its width.

The toolbox translate feature may include: providing program code to launch a translation window associated with a primary window; providing a first link to the program code, where when the primary window is displayed on a screen and the user selects the first link, the program code causes the translation window to open on the screen beside the primary window, the translation window will be positioned so that the translation window does not overlap the primary window, the translation window has a length longer than its width, and a width of the translation window is less than a width of the primary window; providing a text box in the translation window to receive input information in a first language; providing a second link in the translation window, where when the user selects the second link, the program code causes translating of the input information from the first language to output information in a second language, and the output information is obtained through accessing the Internet; and providing for display of the output information in the second language in the translation window.

The toolbox "hear it" feature (see below) may include, for example, a speech recognition feature including: receiving a URL from a client remote from the server, the URL including a grammar context number; receiving one or more input packets of encoded audio speech data from the client; decoding each of the one or more input packets of encoded audio speech data into a portion of raw speech data upon receipt of the respective input packet; storing each portion of raw speech data into a buffer of a linked list of buffers; indicating a grammar associated with the grammar context number to a speech recognition engine; providing each buffer containing a portion of raw speech data to the speech recognition engine as the speech recognition engine is ready to accept it; and, receiving a response from the speech recognition engine, where the response is based on an evaluation of the raw speech data in relation to the grammar.

The toolbox "hear it" feature may include: receiving a first URL from a first client remote from the server, the first URL including a first grammar context; associating a first set of a plurality of buffers with the first client; generating a first instance of a speech recognition engine for the first client; indicating a first grammar associated with the first grammar context to the first instance of the speech recognition engine; receiving a second URL from a second client remote from the server, the second URL including a second grammar context; associating a second set of a plurality of buffers with the second client; generating a second instance of the speech recognition engine for the second client; indicating a second grammar associated with the second grammar context to the second instance of the speech recognition engine; receiving a packet of encoded audio speech data from the first client; decoding the packet of encoded audio speech data from the first client into a first client portion of raw data; storing the first client portion of raw data into a buffer of the first set of a plurality of buffers; providing the buffer containing the first client portion of raw data to the first instance of a speech recognition engine for processing with the first grammar; receiving a packet of encoded audio speech data from the second client; decoding the packet of encoded audio speech data from the second client into a second client portion of raw data; storing the second client portion of raw data into a buffer of the second set of a plurality of buffers; and, providing the buffer containing the second client portion of raw data to the second instance of the speech recognition engine for processing with the second grammar.

The toolbox "hear it" feature may include: receiving a stream of audio speech data; storing a portion of the stream of audio speech data into a buffer of a linked list of buffers as it is received; transmitting a URL including a grammar context number which is indicative of a speech recognition exercise that the stream of audio speech data is for; at a time t1, where t1 is prior to the time when the entirety of the stream of audio speech data is received, encoding a buffer of audio speech data into a smaller file representation; at a time t2, where t2 is prior to the time when the entirety of the stream of audio speech data is received, formatting a portion of the smaller file representation into a packet for transmitting over the internet; at a time t3, where t3 is prior to the time when the entirety of the stream of audio speech data is received, transmitting the packet over the internet; and establishing an internet connection prior to time t3.

The toolbox "hear it" feature may include: two or more clients, each client including the capability to receive audio speech from a user, store the audio speech in one or more buffers organized as a linked list, each buffer including a portion of the received audio speech, encode a buffer of the received audio speech before all of the audio speech is received, package the encoded buffer to receive audio speech into one or more packets to be transmitted over a network before all of the audio speech is received, and transmit a packet of encoded audio speech over the network before all of the audio speech is received; and a server, said server including the capability to receive packets of encoded audio speech from at least two clients, decode each of the packets of audio speech and store the resultant raw speech into one or more buffers for the respective client, and evaluate the resultant raw speech received from each of the at least two clients, where a linked list of buffers holds of a client about 0.1 seconds or less of uncompressed audio speech.

The toolbox "hear it" feature may include: two or more clients, each client including the capability to receive audio speech from a user, store the audio speech in one or more buffers organized as a linked list, each buffer including a portion of the received audio speech, encode a buffer of the received audio speech before all of the audio speech is received, package the encoded buffer to receive audio speech into one or more packets to be transmitted over a network before all of the audio speech is received, and transmit a packet of encoded audio speech over the network before all of the audio speech is received; and a server, said server including the capability to receive packets of encoded audio speech from at least two clients, decode each of the packets of audio speech and store the resultant raw speech into one or more buffers for the respective client, and evaluate the resultant raw speech received from each of the at least two clients, where the server comprises the capability of receiving from a client a grammar reference number, and the server will decode each of the packets of audio speech received from the client according to the grammar reference number.

The toolbox "hear it" feature may include: one or more clients, each client provides a user with a series of questions, the capability to receive audio speech from a user provided as answers to the series of questions, store the audio speech in one or more buffers organized as a linked list, each buffer including a portion of the received audio speech, encode a buffer of the received audio speech before all of the audio speech is received, package the encoded buffer to receive audio speech into one or more packets to be transmitted over a network before all of the audio speech is received, and transmit a packet of encoded audio speech over the network before all of the audio speech is received; and a server, said server including the capability to receive packets of encoded audio speech from the client, decode each of the packets of audio speech and store the resultant raw speech into one or more buffers for the client, and evaluate the resultant raw speech received from each of the clients in relation to the series of questions.

The toolbox "hear it" feature may include: two or more clients, each client including the capability to receive audio speech from a user, store the audio speech in one or more buffers organized as a linked list, each buffer including a portion of the received audio speech, encode a buffer of the received audio speech before all of the audio speech is received, package the encoded buffer to receive audio speech into one or more packets to be transmitted over a network before all of the audio speech is received, and transmit a packet of encoded audio speech over the network before all of the audio speech is received; and a server, said server including the capability to receive packets of encoded audio speech from at least two clients, decode each of the packets of audio speech and store the resultant raw speech into one or more buffers for the respective client, and evaluate the resultant raw speech received from each of the at least two clients, where each buffer in the linked list of buffers of a client holds about 0.1 seconds or less of uncompressed audio speech.

The toolbox "hear it" feature may include: two or more clients, each client including the capability to receive audio speech from a user, store the audio speech in one or more buffers, each buffer including a portion of the received audio speech, encode a buffer of the received audio speech before all of the audio speech is received, package the encoded buffer to receive audio speech into one or more packets to be transmitted over the internet before all of the audio speech is received, and transmit a packet of encoded audio speech over the internet before all of the audio speech is received; and a server, the server including the capability to receive packets of encoded audio speech from at least two clients, decode each of the packets of audio speech and store the resultant raw speech into one or more buffers for the respective client, and a processing time used to evaluate the resultant raw speech will vary based on a value communicated to the server from each respective client.

The toolbox "hear it" feature may include: two or more clients, each client including the capability to receive audio speech from a user, store the audio speech in one or more buffers in a raw uncompressed audio format each buffer including a portion of the received audio speech encode a buffer of the received audio speech before all of the audio speech is received package the encoded buffer to receive audio speech into one or more packets to be transmitted over the Internet before all of the audio speech is received, and transmit a packet of encoded audio speech over the Internet before all of the audio speech is received; and a server, the server including the capability to receive packets of encoded audio speech from at least two clients decode each of the packets of audio speech and store the resultant raw speech into one or more buffers for the respective client and evaluate the resultant raw speech received from each of the at least two clients, where the server further comprises two or more stored text format files, and the server selects a stored text format file to transmit to a client of the two or more clients as a result of the server's evaluation of the resultant raw speech received from the client, and the server adjusts a processing time used to evaluate the resultant raw speech based on a value in a URL connection between the client and the server.

The toolbox "hear it" feature may include: two or more clients, each client including the capability to receive audio speech from a user, store the audio speech in one or more buffers organized as a linked list in a raw uncompressed audio format, each buffer including a portion of the received audio speech, encode a buffer of the received audio speech before all of the audio speech is received, package the encoded buffer to receive audio speech into one or more packets to be transmitted over a network before all of the audio speech is received, and transmit a packet of encoded audio speech over the network before all of the audio speech is received; and a server, the server including the capability to receive packets of encoded audio speech from at least two clients, decode each of the packets of audio speech and store the resultant raw speech into one or more buffers for the respective client, and evaluate the resultant raw speech received from each of the at least two clients, where a level of processing used in the evaluation of the resultant raw speech received from each of the at least two clients is alterable based on a value communicated between the clients and the server.

The toolbox "hear it" feature may include: two or more clients, each client including the capability to receive audio speech from a user, store the audio speech in one or more buffers in a raw uncompressed audio format, each buffer including a portion of the received audio speech, encode a buffer of the received audio speech before all of the audio speech is received, package the encoded buffer to receive audio speech into one or more packets to be transmitted over the internet before all of the audio speech is received, and transmit a packet of encoded audio speech over the internet before all of the audio speech is received; and a server, the server including the cap ability to receive packets of encoded audio speech from at least two clients, decode each of the packets of audio speech and store the resultant raw speech into one or more buffers for the respective client, and evaluate the resultant raw speech received from each of the at least two clients, where a user selects a user objective at a client, the client transmits the user objective to the server, and the server evaluates the resultant raw speech received from the client based on the user objective and a value communicated to the server by URL.

The toolbox "hear it" feature may include: two or more clients, each client including the capability to receive audio speech from a user, store the audio speech in one or more buffers in a raw uncompressed audio format, each buffer including a portion of the received audio speech, encode a buffer of the received audio speech before all of the audio speech is received package the encoded buffer to receive audio speech into one or more packets to be transmitted over the internet before all of the audio speech is received, and transmit a packet of encoded audio speech over the internet before all of the audio speech is received; and a server, the server including the capability to receive packets of encoded audio speech from at least two clients, decode each of the packets of audio speech and store the resultant raw speech into one or more buffers for the respective client and evaluate the resultant raw speech received from each of the at least two clients, where before the client receives audio speech from a user, the server transmits a file to a client, the client presents the file in at least one of an audio or visual format to the user, and the server evaluates the resultant raw speech received from the client in connection with the file transmitted from the server to the client and a processing time used to evaluate the resultant raw speech will vary based on a value communicated to the server from the client.

The toolbox "hear it" feature may include: two or more clients, each client including the capability to receive audio speech from a user, store the audio speech in one or more buffers in a raw uncompressed audio format, each buffer including a portion of the received audio speech, encode a buffer of the received audio speech before all of the audio speech is received package the encoded buffer to receive audio speech into one or more packets to be transmitted over the internet before all of the audio speech is received, and transmit a packet of encoded audio speech over the internet before all of the audio speech is received; and a server, the server including the capability to receive packets of encoded audio speech from at least two clients decode each of the packets of audio speech and store the resultant raw speech into one or more buffers for the respective client, and evaluate the resultant raw speech received from each of the at least two clients, where the server transmits a first file to a client, the client presents the first file in at least one of an audio or visual format to the user, after presenting the first file to the user, the client receives audio speech from the user, and the server evaluates the resultant raw speech received from the client in connection with the first file transmitted from the server to the client and a processing time used by the server to evaluate the resultant raw speech is alterable based on a value communicated from the client to the server.

Some specific features (discussed further below) of the invention facilitate developing of content collaboratively.

For example, features at EnglishCafe facilitate collaborative learning of English by community members.

Thus, FIG. 7B shows a Web page of a blog entry titled "Going Home." The Web page or blog entry was created by a first user 705 (e.g., "lmlau"). The Web page is displayed in a window of an application program such as a Web browser executing on the client. The Web page includes first and second columns 710 and 715.

The first column includes content 720. In this specific implementation, the content includes text. However, as previously discussed the content may instead or additionally include pictures, graphics, video, or combinations of these. In this specific implementation, the text has been created or authored by the first user and describes events that occurred during the first user's trip home.

The second column includes a blog archive 725. The blog archive includes links to previous blogs written or created by the first user.

FIGS. 8-12 show specific implementations of Web pages for submitting a suggestion regarding a specific portion of content on the Web page.

Figure 8:
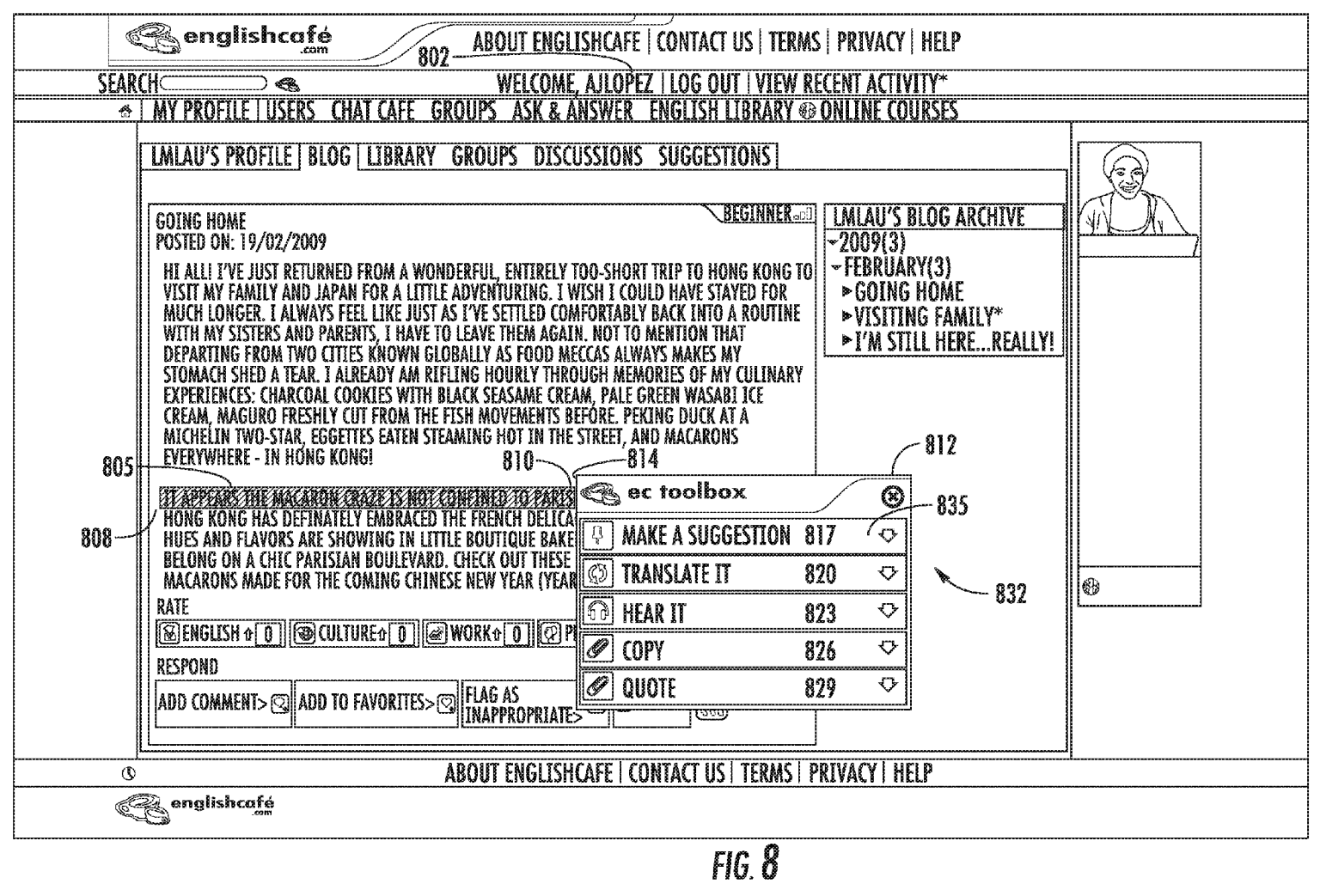

FIG. 8 shows an example of a user selecting a portion of the content from the first user's blog to offer a suggestion. In this specific example, a second user 802 (e.g., "ajlopez") has logged into the system and has navigated to another user's Web page, i.e., the first user's blog entry "Going Home."

After reading several passages of the blog, the second user has decided to make a suggestion (e.g., annotation or comment). A suggestion may be made, for example, to correct a grammar or punctuation mistake, to correct a word choice, to correct a stylistic convention, or other.

The system allows the user to select a specific portion of content to offer or make a suggestion. In a specific implementation, the user selects a portion 805 of the content by positioning the pointer, such as a mouse, at a start position 808 of the portion. The user then clicks a button on the mouse and drags the mouse over the selected portion. The system responds by highlighting the portion of the content as the user drags the mouse. When the user reaches an end position 810 of the portion the user releases the mouse button. The system detects the release of the mouse button and responds by displaying a toolbox window 812 (e.g., application window, graphical window, or dialog box). The toolbox overlays the window of the Web page. As shown in FIG. 8, the portion of the content or selected content remains highlighted.

In various other implementations, the toolbox dialog box pops-up when the user clicks the mouse button at the start position of text to be selected. The toolbox is a persistent window or toolbar displayed on the Web page. The user makes the selection by double clicking the mouse button on the desired content. For example, the user can double click a word to select the word. The user can double click the selected word to select the sentence. The user can double click the selected sentence to select the paragraph.

Any type of highlighting may be used to visually mark the selected content. In the example shown in FIG. 8, a type of highlighting includes displaying the background of the selected content in a color, different from the background color of the nonselected content. Other examples of highlighting types include underlining, double underlining, bold, italics, surrounding or encircling the selected content with a box, varying a font size, using upper case (or capital) letters and lower case letters, and so forth.

Generally, the position on the page in which the toolbox dialog box pops-up is dependent on the position of the selected content. In a specific implementation, the system detects a first position on the page of the selected content. The system displays the toolbox window at a second position on the page where the second position is based on the first position.

Figure 25:
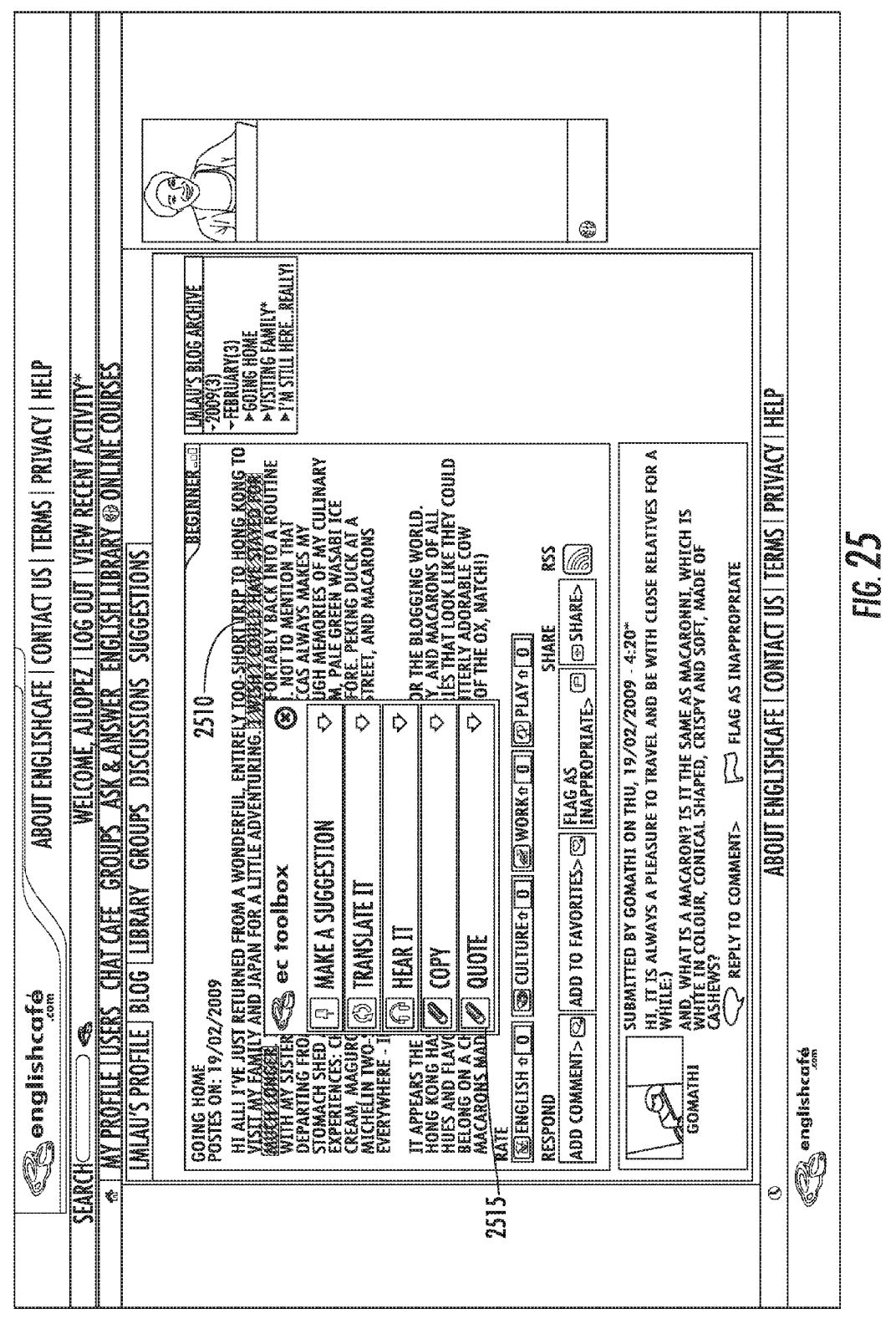

As an example, consider FIGS. 8 and 25. In FIG. 8 the selected text is at a first position on the page and the toolbox pops-up at a second position on the page based on the first position. In FIG. 25 the selected text is at a different position on the page as compared to FIG. 8. That is, in FIG. 25 the selected text is at a third position on the page, different from the first position. The toolbox then pops-up at a different position on the page as compared to FIG. 8. That is, the toolbox pops-up at a fourth position on the page, different from the second position.

The toolbox may be displayed near or adjacent to the selected text. For example, a distance between any point within the selected text and a point on a border of the toolbox may range from about one times the width of a character in the selected text to about ten times the width of the character. In various other implementations, if the selected text is located in a quadrant of the page the toolbox pops-up such that at least a portion of the toolbox lies within the quadrant. If the selected text is located in a first half of the page the toolbox pops-up such that at least a portion of the toolbox lies in the first half.

In a specific implementation, the toolbox is displayed at the end position of the selected text. In this specific implementation, an upper left corner 814 (FIG. 8) of the toolbox is positioned at the end position of the selected content.

However, it should be appreciated that the toolbox can be displayed at any position within the Web page. In various implementations, the toolbox is positioned anywhere on the Web page such that the toolbox does not overlap the selected content. In another implementation, the toolbox may at least partially overlap the selected content. An edge or corner of the toolbox is positioned near or at the end or start position of the selected content. The toolbox may be displayed in a nonoverlapping window of the screen such as a sidebar, task pane, or separate frame.

In a specific implementation, the position of the toolbox is locked. That is, the user is not able to drag the toolbox to another position on the page. In another implementation, the user is able to drag the toolbox to another position on the page.

In this specific implementation, the toolbox includes several tools (e.g., widgets or options) including a first tool 817 ("Make a Suggestion"), a second tool 820 ("Translate It"), a third tool 823 ("Hear It"), a fourth tool 826 ("Copy"), and fifth tool 829 ("Quote"). Each tool is displayed collapsed header sections 832 which each have banners displaying the name of the tool.

To make a suggestion to the selected content, the second user clicks a collapsed first header section 835.

Figure 9:
FIG. 9 shows an example of an expanded header section of the toolbox for inputting a suggestion.

As shown in FIG. 9, a title of the first banner changes from "Make a Suggestion" to "Make a Suggestion to Lmlau." Similarly, a background color of the first banner changes from a first color, e.g., (blue) to a second color, (e.g., white), different from the first color.

The system also expands and repositions the toolbox. Specifically, the system repositions the toolbox such that a left edge of the toolbox abuts a right edge of the first column. The toolbox has been repositioned from overlaying the first column to overlaying the second column. Since the toolbox is no longer overlaid over the first column, the user can more easily see the content in the first column and the context of the selected content. The selected content in the first column remains highlighted. In other implementations, the toolbox is not repositioned or is repositioned to another area of the page.

In a specific implementation, the user can drag the toolbox from the second column and reposition the toolbox to any position on the page. In another implementation, the toolbox is locked and the user will be unable to reposition the toolbox.

The system displays within the toolbox an expanded first header section 910. The expanded first header section includes a read-only box 913, a suggestion input box 916, an explanation input box 919, and a submit button 922.

The read-only box includes the selected content, (i.e., "It appears the macaron craze is not confined to Paris."). The selected content in the read-only box is displayed in a color (e.g., red) that is different from the color (e.g., black) used to display the selected content in the first column. In other implementations, the colors are the same.

The suggestion input box can include the selected content as shown or the suggestion input box may be blank. The selected content as shown in the suggestion input box can now be edited by the second user. That is, using the suggestion input box, the second user can input the suggestion to the selected content. In a specific implementation, the content of the suggestion includes text. However, the content of the suggestion can instead or additionally include pictures, graphics, video, and sound. For example, the second user can upload a video file from the client system as part of the suggestion, activate a microphone at the client system and vocalize a suggestion that is recorded by the system, or both.

The suggestion input box may be a required field as shown by the asterisks or it may be an optional field.

The explanation input box is blank and allows the second user to input an explanation (e.g., reason) for the suggestion or edit. The explanation input box may be an optional field as shown or it may be a required field.

Figure 10:
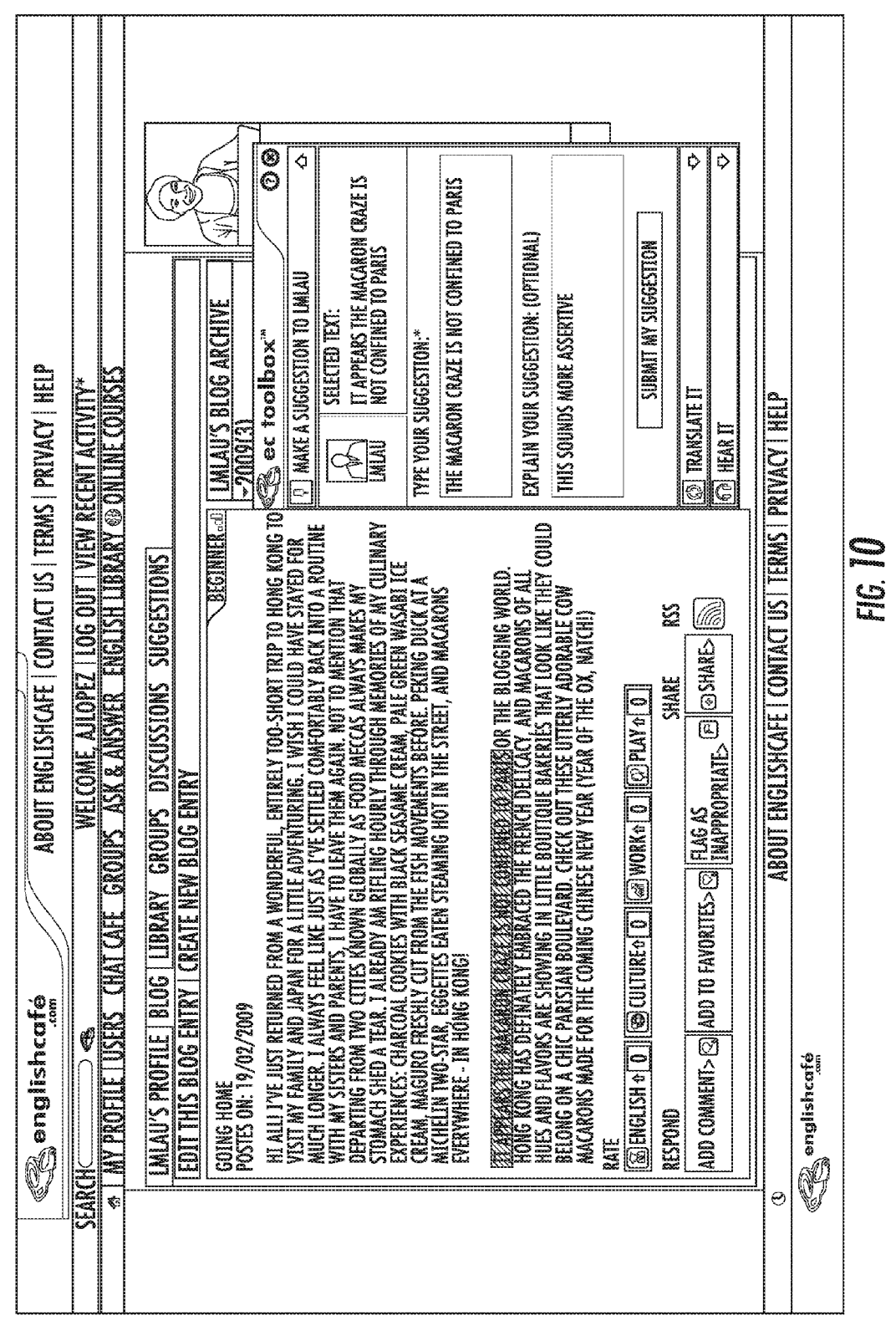

FIG. 10 shows an example where the second user has inputted the suggestion (i.e., "The macaron craze is not confined to Paris.") into the suggestion input box. The second user has also inputted an explanation for the suggestion (i.e., "This sounds more assertive.") in the explanation input box. The second user can then click the submit button.

Figure 11:
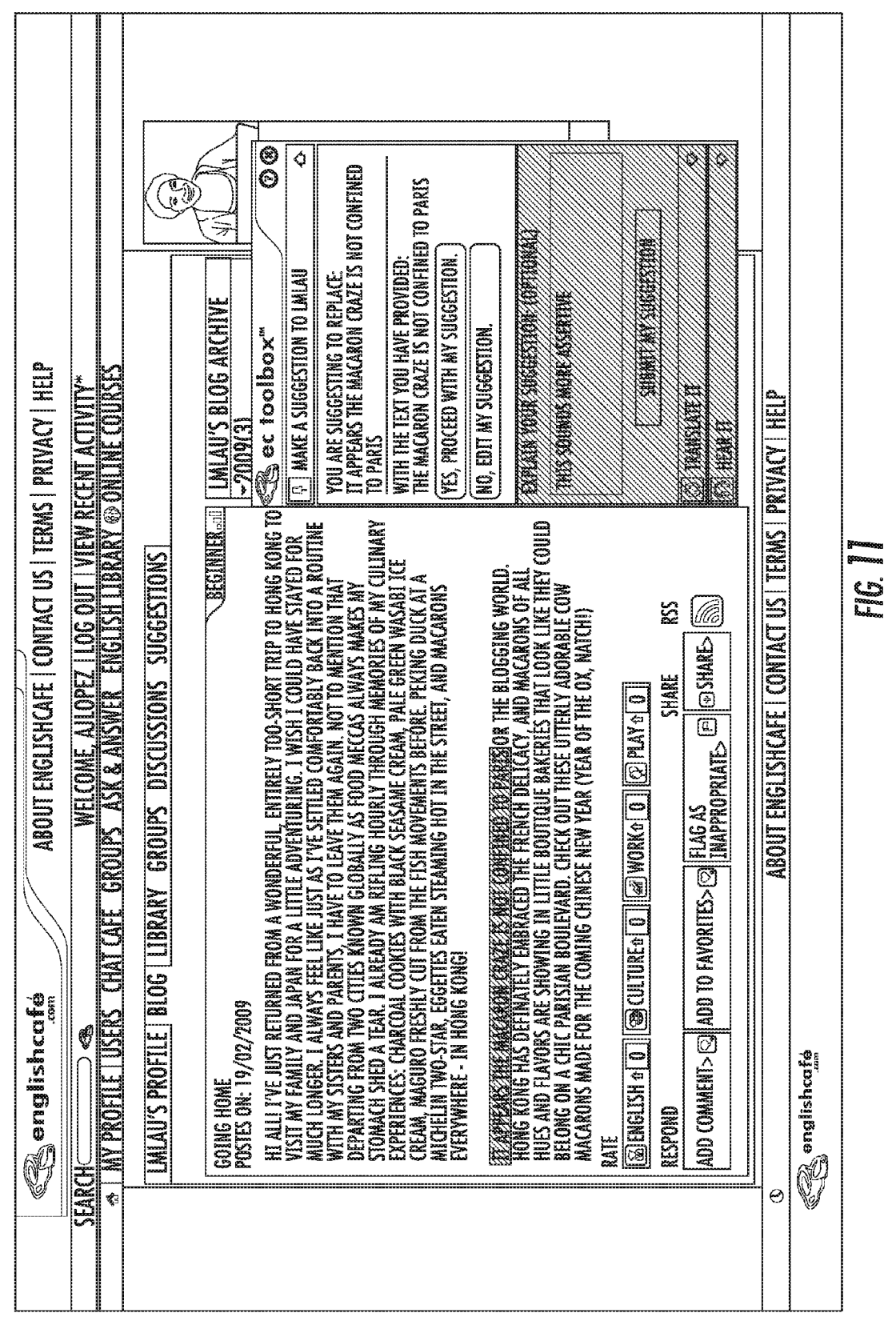

As shown in FIG. 11 the system prompts the second user for confirmation of the suggestion. A first region of the toolbox includes instructions to the second user, i.e., "You are suggesting to replace: 'It appears the macaron craze is not confined to Paris' With the text you have provided: 'The macaron craze is not confined to Paris.'" A second region of the toolbox, between the first region and a third region, includes a button to proceed with the suggestion and a button to edit the suggestion. The third region of the toolbox is partially shaded or grayed such that the content below the shading is still visible. The shading indicates that at this point in the suggestion process the tools and features beneath the shading are disabled.

If the second user chooses to edit the suggestion the system returns the user to the previous page as shown in FIG. 10. If the second user chooses to proceed with submitting the suggestion the system displays a confirmation message.

Figure 12:
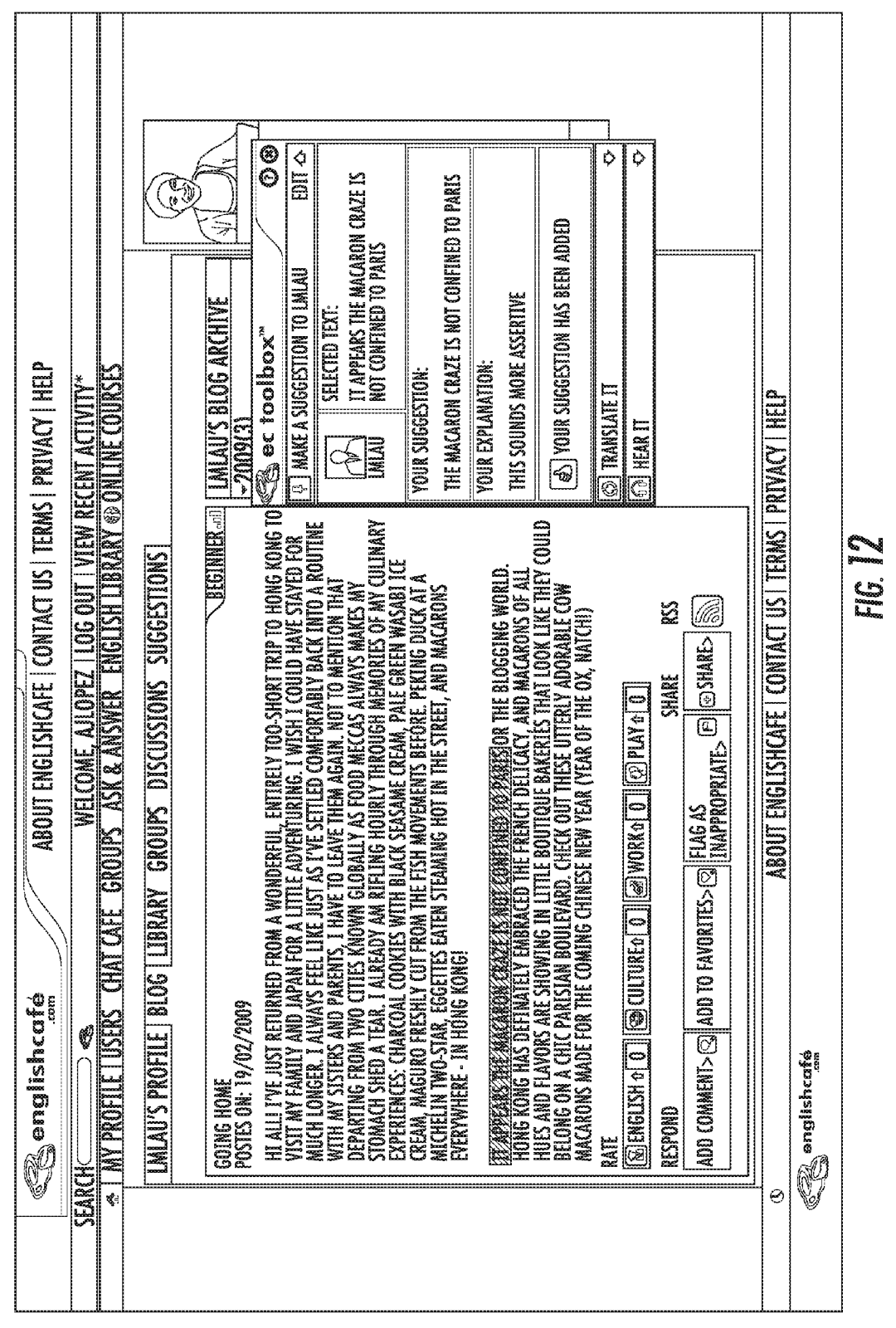

FIG. 12 shows an example of the confirmation message. The expanded first header section of the toolbox includes the selected content, the user's suggestion, the user's explanation, and a confirmation message that the suggestion has been added.

The number of characters for the selected content, suggestion, or explanation may be very lengthy. For example, the selected content may include several sentences or paragraphs. Displaying such a large amount of information in the toolbox may clutter the toolbox. Thus, in a specific implementation, if the number of characters exceeds a threshold number of characters the system displays a beginning portion of the selected content. An icon is displayed next to the beginning portion and may be clicked on to see a remaining portion of the selected content. The remaining portion of the selected content may be displayed in the toolbox or in new pop-up window. The threshold number can be any number (e.g., 100, 150, 250, or 500 characters).

Figure 13:
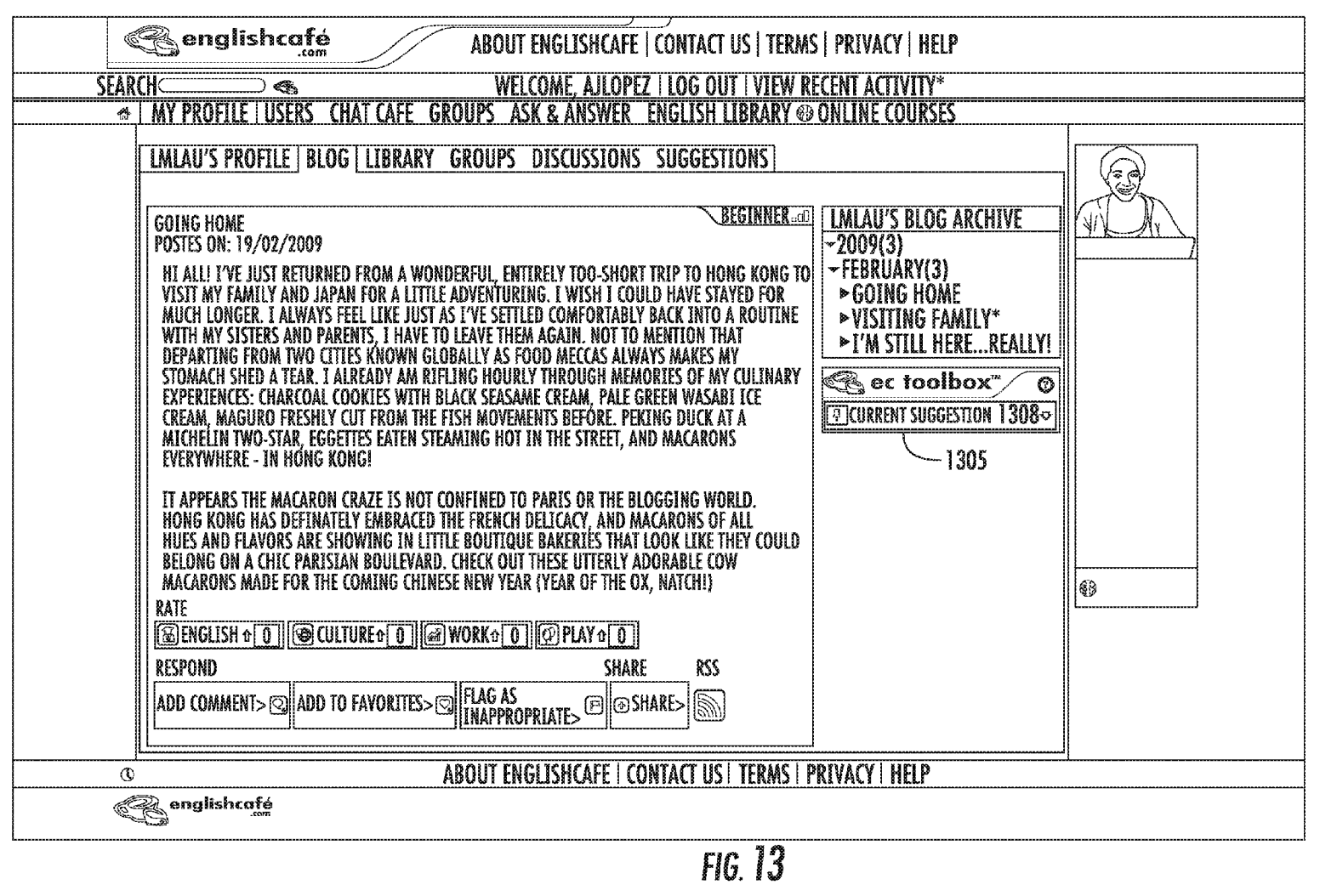
Figure 14:
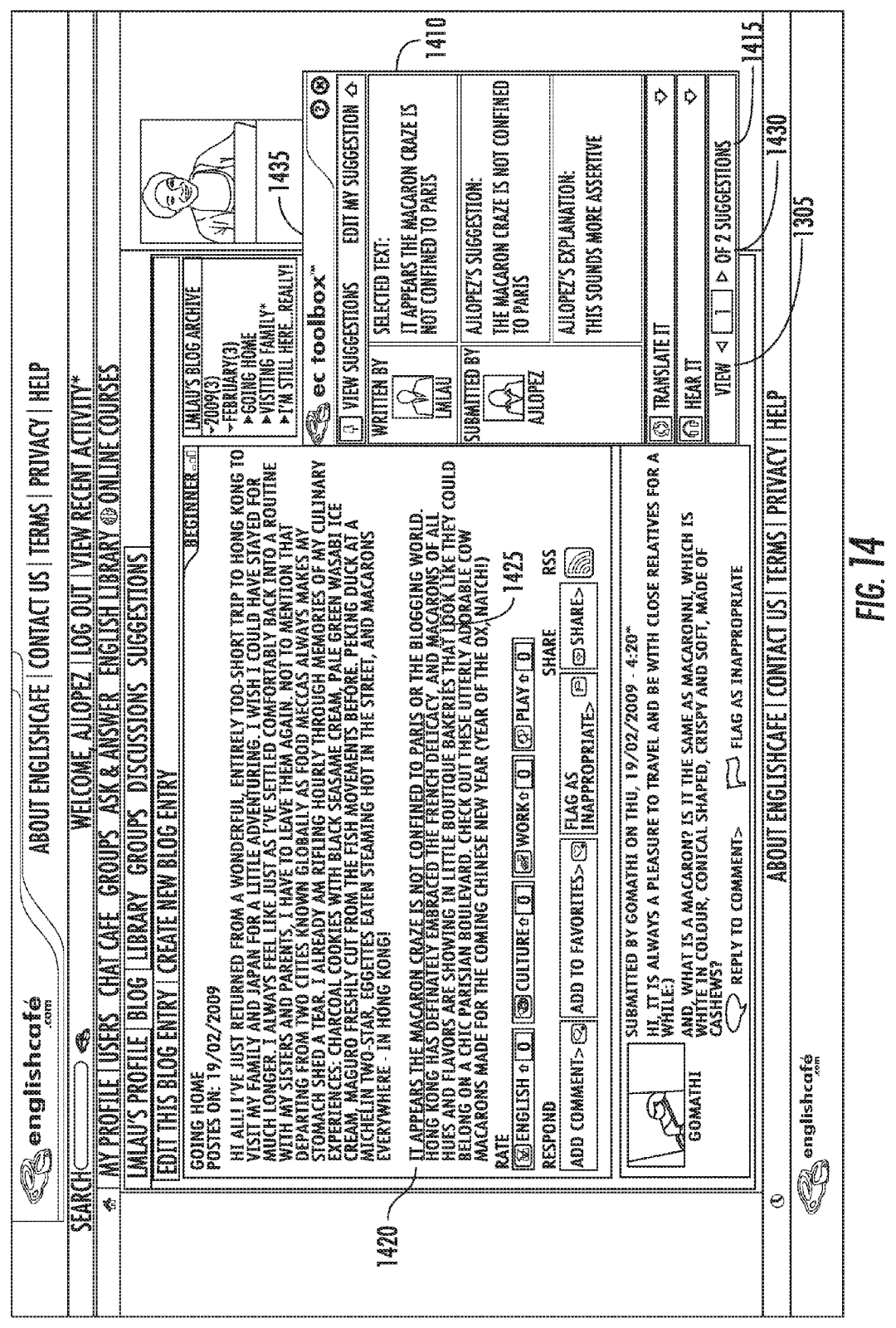
Figure 15:
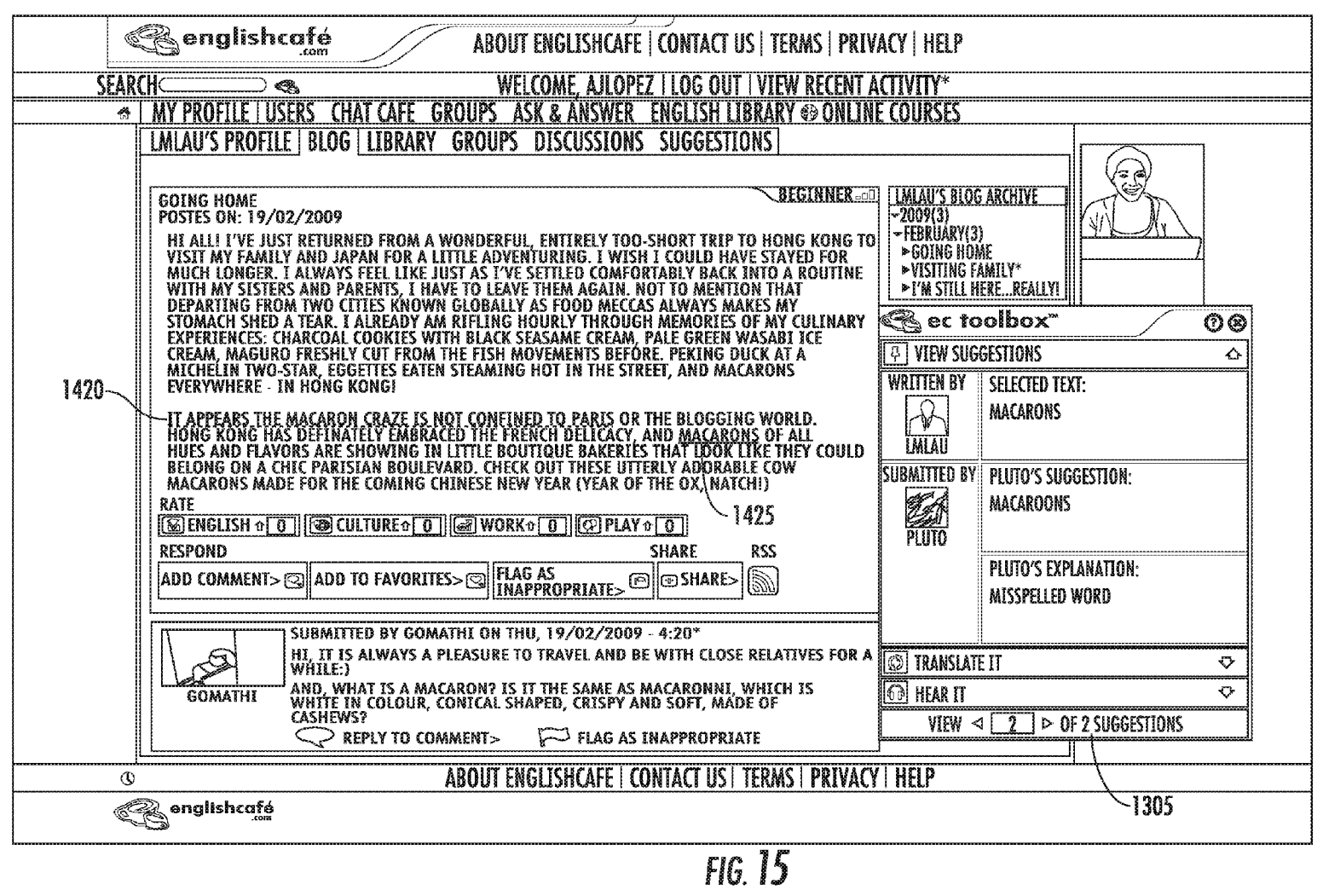
Figure 16:
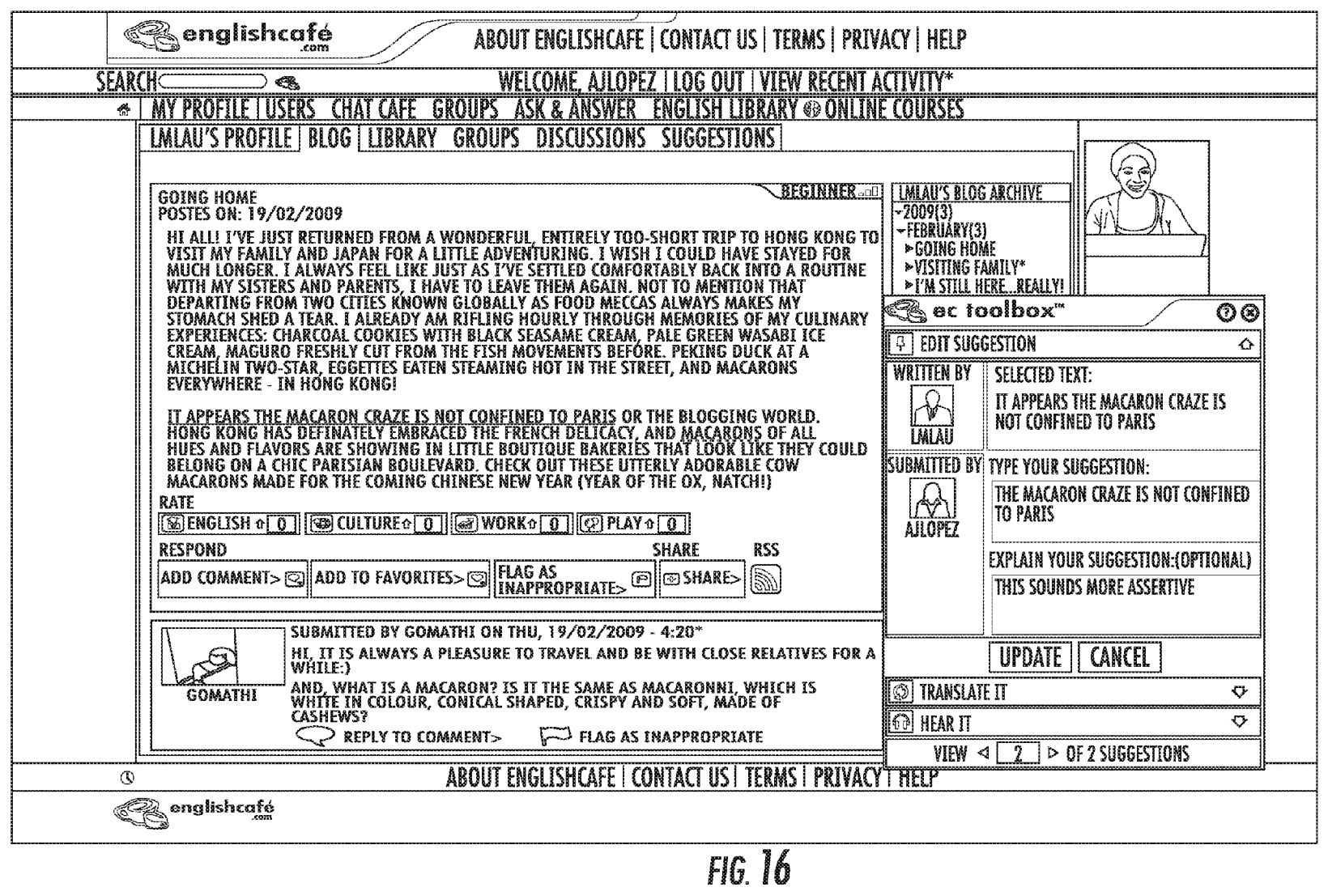

FIGS. 13-15 show specific implementations of Web pages for viewing suggestions regarding specific portions of content. FIG. 16 shows a specific implementation of a Web page for editing a suggestion.

FIG. 13 shows an example of a Web page that includes suggestions. A toolbox 1305 is displayed in the second column of the page. This toolbox includes a sixth tool 1308 displayed in a collapsed header section having a banner displaying the name of the tool ("Current Suggestion").

In a specific implementation, toolbox 1305 appears only if there are current suggestions for the content. Current suggestions may be defined as suggestions made to the content (e.g., body of text in the first column) which have not been accepted, reviewed, or both by the author of the content.

In this specific implementation, toolbox 1305 is omitted or is not displayed if there are no current suggestions. Thus, the user can quickly see whether or not there are any current suggestions simply by noting whether or not toolbox 1305 is displayed. However, in other implementations, toolbox 1305 is displayed if there are no current suggestions.

The user can click the collapsed header section to view the current suggestions.

FIG. 14 shows an example of toolbox 1305 after the user clicks the collapsed header section to view the current suggestions. The banner title changes from "Current Suggestion" (FIG. 13) to "View Suggestions" (FIG. 14) Similarly, a background color of the banner changes from a first color, e.g., blue to a second color (e.g., white), different from the first color.

Toolbox 1305 further includes an expanded header section 1410 and a footer 1415. Portions of the content displayed in the first column are highlighted. That is, a first portion 1420 of the content is highlighted in a first style. A second portion 1425 of the content is highlighted in a second style, different from the first style. The highlighting indicates that there are current suggestions for these portions.

The expanded header section includes the suggestion and information related to the suggestion. For example, the first region of the expanded header section includes the content for which a suggestion was made. The second region includes the suggestion. The third region includes the explanation for the suggestion.

In this specific example, there are two current suggestions for the content as indicated by the highlighted first and second portions 1420 and 1425, respectively. The footer includes information such as a total number of current suggestions (e.g., two) and which current suggestion is being displayed (e.g., first current suggestion).

The highlighting style used for the first and second portions of the content indicates which portion is the focus of the toolbox. In this example, the first portion of the content is the focus of the toolbox. Thus, the first highlighting style of the first portion of the content includes a solid underline. The second highlighting style of the second portion of the content includes a dotted or dashed underline. The solid underline under the first portion indicates that the focus of the toolbox is information related to the first portion such as the proposed suggestion for the first portion.

The footer includes controls such as next and previous buttons or arrows 1430. These controls allow the user to scroll forwards and backwards through the current suggestions. For example, the user can click the next arrow in the footer to advance to the next or second current suggestion.

In another implementation, the user may scroll forwards and backwards through the suggestions by clicking the highlighted portions of content. For example, the user may click on second portion 1425 so see the suggestion associated with that portion.

In a specific implementation, the toolbox in addition to displaying the total number of suggestions made, displays subtotals based other suggestion categories. Some examples of subtotals include number of suggestions made by a particular user, number of suggestions made by users having a rating exceeding a threshold rating, and number of suggestions made on a particular date, time, or range of dates, or range of times.

Furthermore, for each selected content the system may display subtotal of the number of suggestions received. For example, a first content portion may have received three suggestions. A second content portion may have received five suggestions. A mouseover or hover box may be used to display the number of suggestions associated with each content portion. When the user places the cursor over the first content portion and pauses, the system responds by displaying the number three in a graphical box near the first content portion. This indicates three suggestions were received. Likewise, when the user positions the cursor over the second content portion, the systems responds by displaying the number five in the graphical box. It should be appreciated that such subtotals may instead or additionally be included in the toolbox.

FIG. 15 shows an example of toolbox 1305 for the second current suggestion. Similar to FIG. 14, first and second portions 1420 and 1425 are highlighted to indicate that there are current suggestions for these portions of the content. However, the first portion is highlighted with a dotted underline while the second portion is highlighted with a solid underline. The solid underline indicates that now the second portion is the focus of toolbox 1305. Thus, the toolbox displays information related to the second portion.

For example, the word "macrons" of the second portion of the content was misspelled. Thus, the user "Pluto" has suggested that the spelling be changed to "macaroons."

Typically, the order of the current suggestions in the toolbox corresponds to the positions of the selected portions in the content. For example, in the content, first portion 1420 appears before second portion 1425. Thus, the order of the current suggestions in the toolbox includes the suggestion related to the first portion followed by the suggestion related to the second portion.

In various other implementations, the current suggestions are ordered based on the time that they were made. For example, the current suggestions may be ordered chronologically or reverse chronologically. The current suggestions may be ordered based on a user rating. For example, users who have high ratings may have their suggestions displayed before users who have low ratings. The order may be user-definable. For example, a user may select an option to scroll through the suggestions chronologically. Another user may select an option to scroll through the suggestions reverse chronologically.

In a specific implementation, the vertical position at which toolbox 1305 is displayed corresponds to or depends on the position of the selected portion that is the focus of the toolbox. For example, referring now to FIG. 14, the focus of toolbox 1305 is on first portion 1420 and the toolbox is displayed at a first vertical position within the second column. In FIG. 15, the focus of the toolbox is on the second portion 1425 and the toolbox is displayed at a second vertical position within the second column. The second vertical position is below the first vertical position because the second portion comes after or is below the first portion.

As was discussed, in a specific implementation, the current suggestions are viewable by any members of the community. However, typically, only the author of the current suggestion can make edits to the suggestion. A user who is not the author of the suggestion may be able to view the suggestion, but may not be able to make edits to the suggestion.

For example, referring now to FIG. 14, the second user ("ajlopez") is the author of the suggestion "The macaron erase is not confined to Paris." Thus, the second user can edit the suggestion. Specifically, the first banner of the toolbox includes an edit suggestion link 1435. In FIG. 15, the second user is not the author of the suggestion "macaroons." Instead, the author of this suggestion is another user. Thus, the second user cannot make any edits to the suggestion and the edit suggestion link is not displayed.

FIG. 16 shows an example of the toolbox after the second user clicks edit suggestion link 1435 (FIG. 14). The toolbox displays the original suggestion and explanation. The original suggestion, explanation, or both can then be edited by the second user.

The second user can cancel any edits by clicking a cancel button. This then returns the second user to the Web page as shown in FIG. 14. The second user can submit the edited suggestion, explanation, or both to the system by clicking an update button. This then returns the second user to a Web page similar to the one shown in FIG. 14, but including the updated (or edited) suggestion, explanation, or both.

In a specific implementation, the toolbox includes a tool to filter suggestions. The displayed content in the second column is then updated to reflect the filter selected from the toolbox. There can be any number and type of suggestion filters. Filters may be based on a user name, a user's rating, a user's network, a user's group, or other information contained in a user's profile (e.g., geographic location, native language, or preferred language), or combinations of these.

As an example, a user may decide to only to see suggestions made by user A. The system will then highlight only those portions of the content where user A made suggestions. A user can decide to only see suggestions made by users who have high ratings. The system will then highlight only those portions of the content where users with high ratings made suggestions. A user can decide to only see suggestions made by users who have specified a certain language as their native language (e.g., English or Spanish), who live in a certain geographic region, or belong to a certain group (e.g., American history group or Italian culture group).

FIGS. 17-22 show specific implementations of Web pages for discarding a suggestion and adopting (or approving) a suggestion.

Figure 17:
FIG. 17 shows an example of a Web page whose author has received one or more suggestions.
Figure 18:
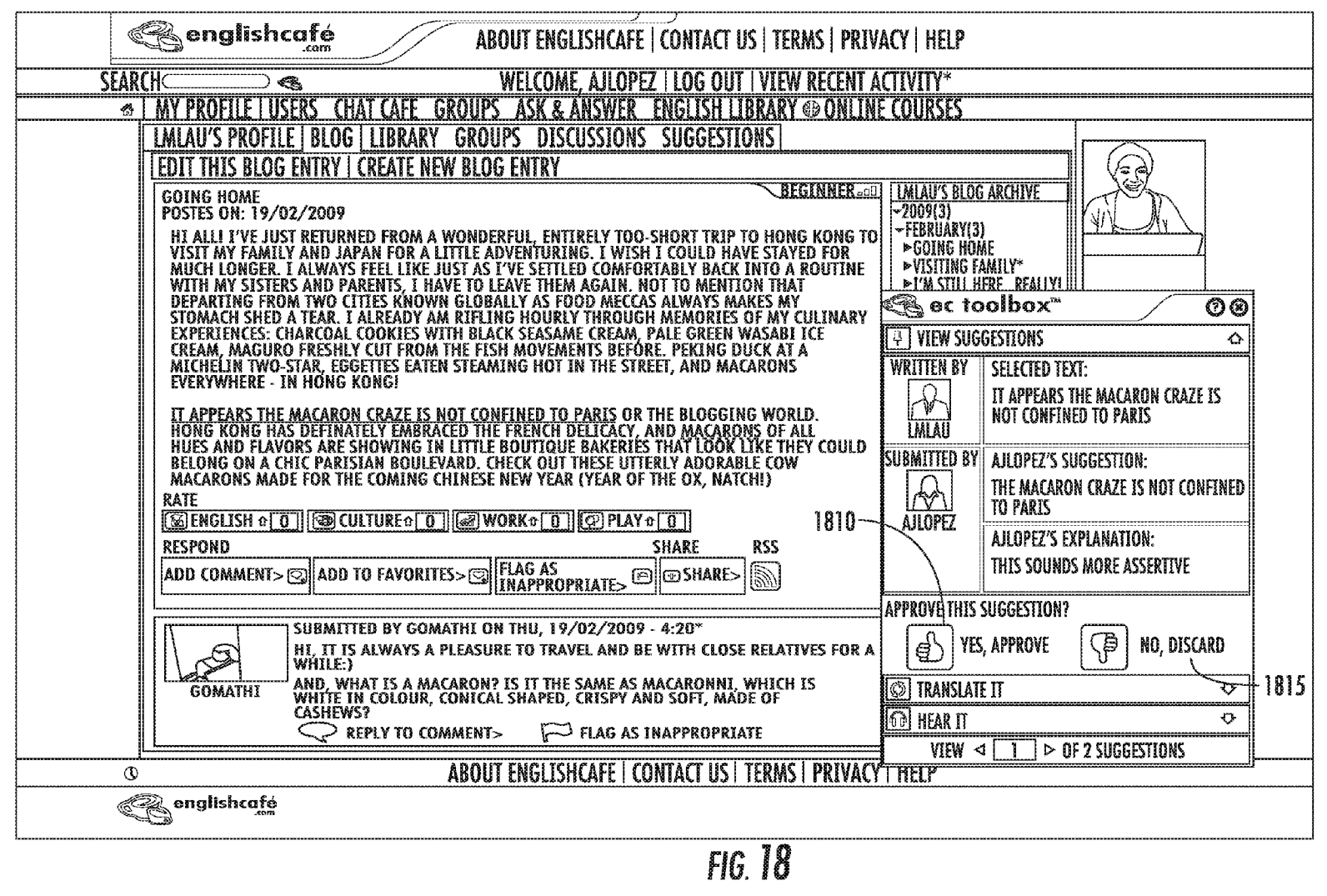

FIG. 17 shows an example of a Web page for the first user (i.e., "lmlau") that includes suggestions to the Web page content created by the first user. The Web page now includes a toolbox 1705 including a collapsed header section with a banner title "Current Suggestions." Clicking the collapsed header section reveals an expanded header section (FIG. 18). The expanded header section includes information similar to the information shown in FIG. 14. For example, the first user can scroll through the suggestions by clicking the next and previous arrows in the footer of the toolbox box.

However, this toolbox includes a button or link 1810 to approve the suggestion and a button 1815 to discard or reject the suggestion. In other words, the first user as the author of the content can accept or reject suggestions offered by other users. Accepting the suggestion replaces the corresponding portion of the content with the suggestion. Discarding the suggestion results in no changes to the corresponding portion of the content.

Other users who are not the author of the content may view the suggestions, but cannot approve or discard the suggestions. Thus, buttons 1810 and 1815 will not be displayed for these users.

If, for example, after reviewing the suggestion "The macaron craze is not confined to Paris" the first user decides to reject the suggestion, the first user can click button 1815.

Figure 19:
FIG. 19 shows an example of a prompt or dialog box to confirm discarding a suggestion.

As shown in FIG. 19 the system prompts the user for a confirmation of the decision to discard the suggestion. In this figure, the toolbox is shaded and a confirmation dialog box overlays the toolbox. The confirmation dialog box includes a button to proceed with the discarding of the suggestion (i.e., "Yes, I'm sure") and a button to cancel.

Figure 20:
FIG. 20 shows an example of using a feature of the toolbox to approve or discard a second suggestion.

Clicking the cancel button returns the user to the previous screen (FIG. 18). Clicking the "Yes, I'm sure" button discards the suggestion. The focus of the toolbox then advances to the next suggestion as shown in FIG. 20.

Once again, the system advances to the next portion of the content for which there is a suggestion, i.e., second portion 1425. The second portion is highlighted with a solid underline. The highlighting is removed or is not displayed for first portion 1420 because the user discarded the suggestion to the first portion.

Using the toolbox, the first user can review the suggestion, i.e., "macaroon" and explanation for the suggestion, i.e., "Misspelled word." The first user can accept the suggestion by clicking button 1810 (i.e., "Yes, Approve" button).

Figure 21:
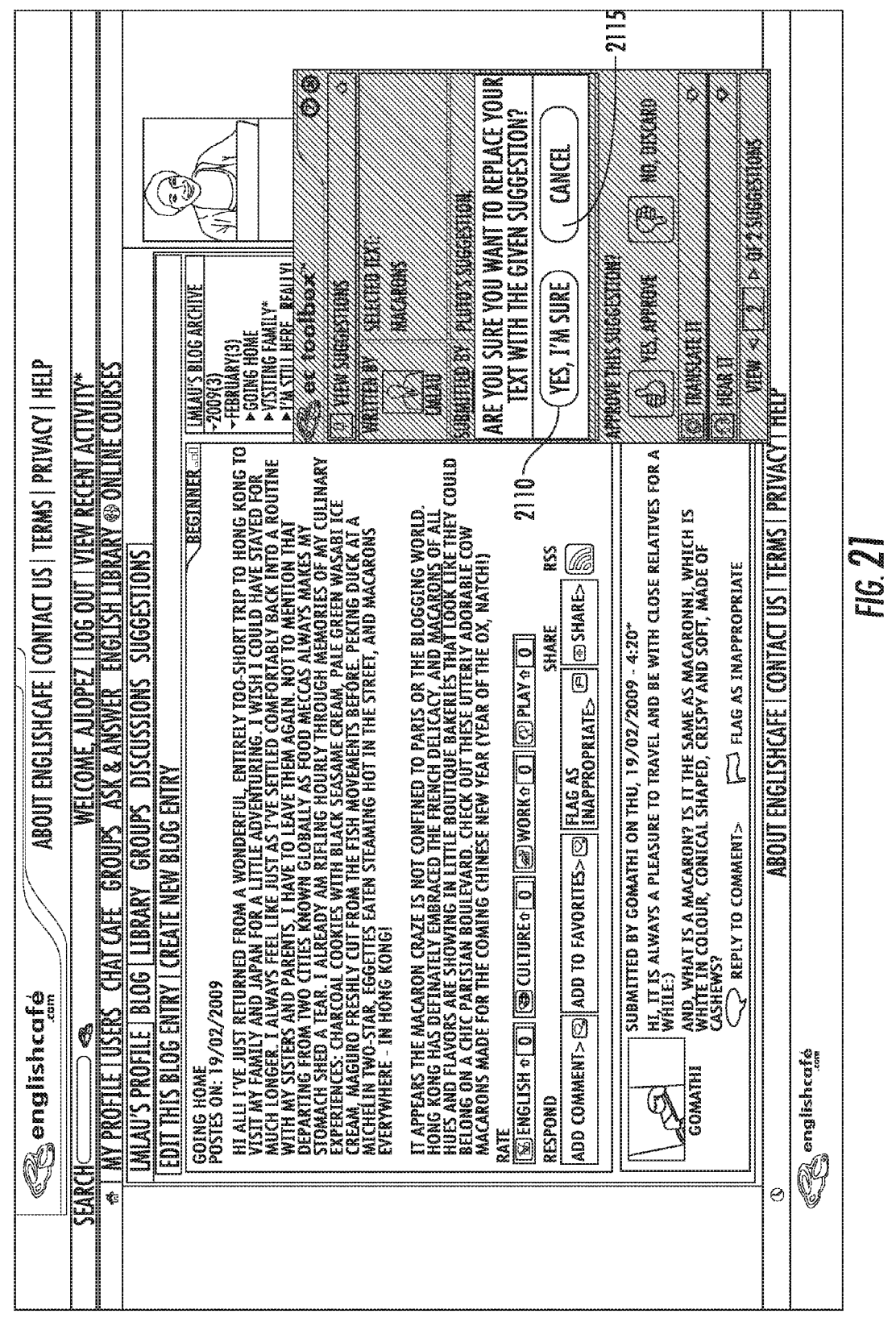

The system then displays a confirmation dialog box as shown in FIG. 21. The toolbox dialog box is shaded and the confirmation dialog box overlays the toolbox. The confirmation dialog box includes a button 2110 ("Yes, I'm sure) and a button 2115 ("Cancel"). The confirmation dialog box also provides instructions as to what will happen should the user proceed with accepting the suggestion. In this specific implementation, the instructions include "Are you sure you want to replace your Text with the given Suggestion?" Clicking cancel button 2115 returns the user to the previous page (FIG. 20).

Figure 22:
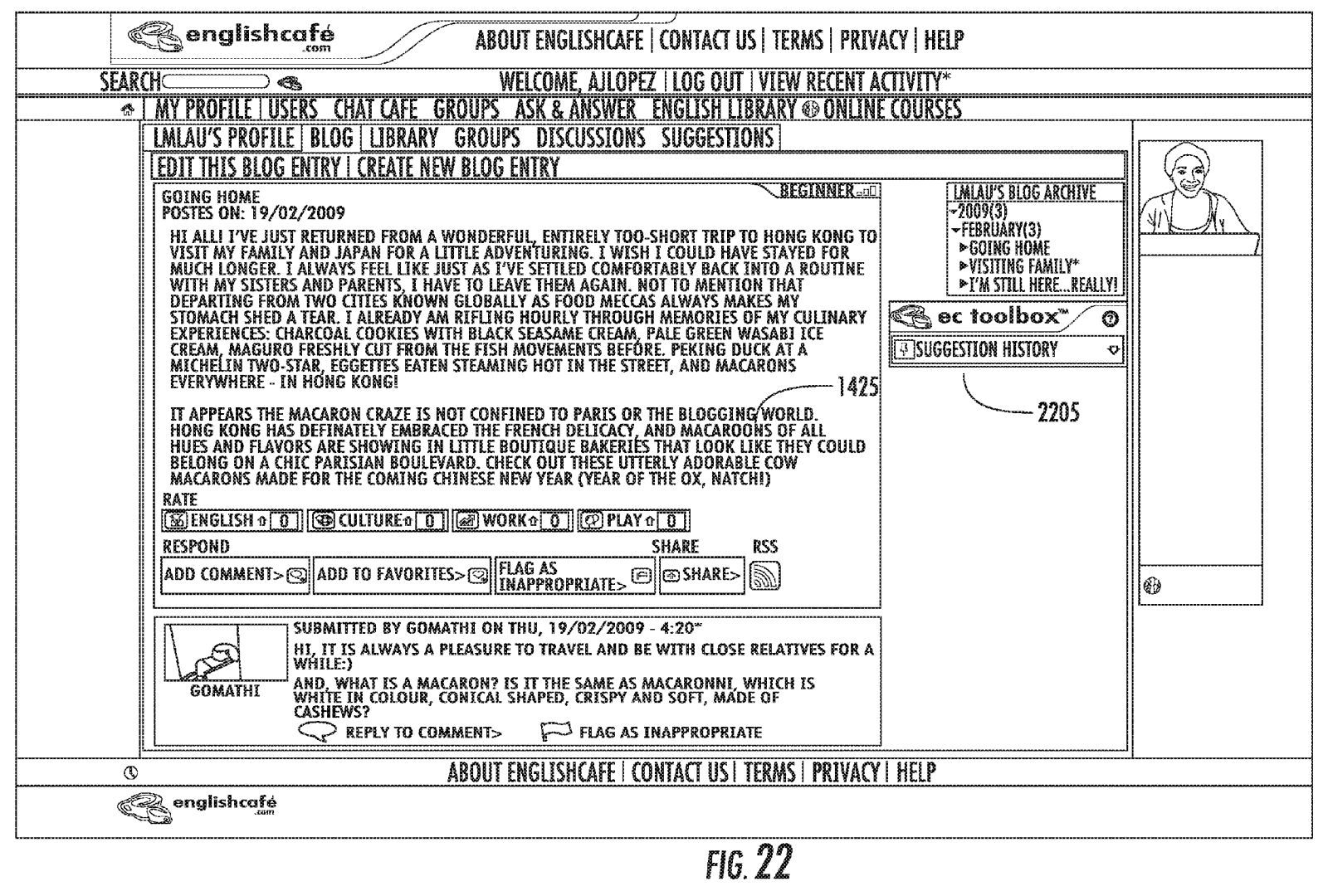

Clicking "yes, I'm sure" button 2110 replaces the second portion with the suggestion (FIG. 22). As shown in FIG. 22, second portion 1425 originally stated "macarons" (see FIG. 21). The first user by accepting the corrected spelling suggestion from the second user caused the system to replace second portion 1425 with the suggestion, i.e., the correct spelling for the word "macaroons."

It should be appreciated that the toolbox in addition to displaying the identity (e.g., user name and profile picture) of the user who submitted the suggestion can display other information related to the user. This includes, for example, as the user's rating, the date the user joined the community, the total number of suggestions the user has submitted, the total number of suggestions that were accepted, a percentage of the suggestions accepted, and combinations of these. This additional information can aid the author of the content in deciding whether or not to adopt the suggestion.

In a specific implementation, the toolbox includes a tool to undo the adopted suggestions. For example, a user after having adopted a suggestion may decide to revert to the original content. The user may, for example, click the undo tool in the toolbox, scroll through the accepted suggestions, and undo any number of accepted suggestions. The suggested content displayed in displayed in the first column will then be removed from the Web page and replaced with the original content.

Similarly, the user may retrieve discarded suggestions. For example, the user after having discarded a suggestion may decide to accept the suggestion. The user can click a retrieve discarded suggestion tool in the toolbox, scroll through the discarded suggestions, and select the discarded suggestion to retrieve. The retrieved suggestion can then be used to replace the portion of content that the retrieved suggestion corresponds to.

In this specific implementation, the adopted suggestions, the content they replaced, or both may be stored in a database or other storage location separate from the page or document itself. In another implementation, the adopted suggestion, the content they replaced, or both are stored with the page. The system can store or display prior versions of the Web page or document. Thus, the user can retrieve a version of the Web page before a specific suggestion was adopted.

FIGS. 22-24A show specific implementations of Web pages for reviewing past suggestions. In an implementation, the system stores past suggestions, explanations, and the selected content for which the suggestion was made. This information may be stored at the server and stored separately from the Web page.

In FIG. 22, a toolbox 2205 includes a collapsed header section having a banner with the title "Suggestion History." This allows the user to see noncurrent suggestions (e.g., old suggestions or past suggestions). Noncurrent suggestions may be defined as those suggestions that have been discarded or adopted.

Figure 23:
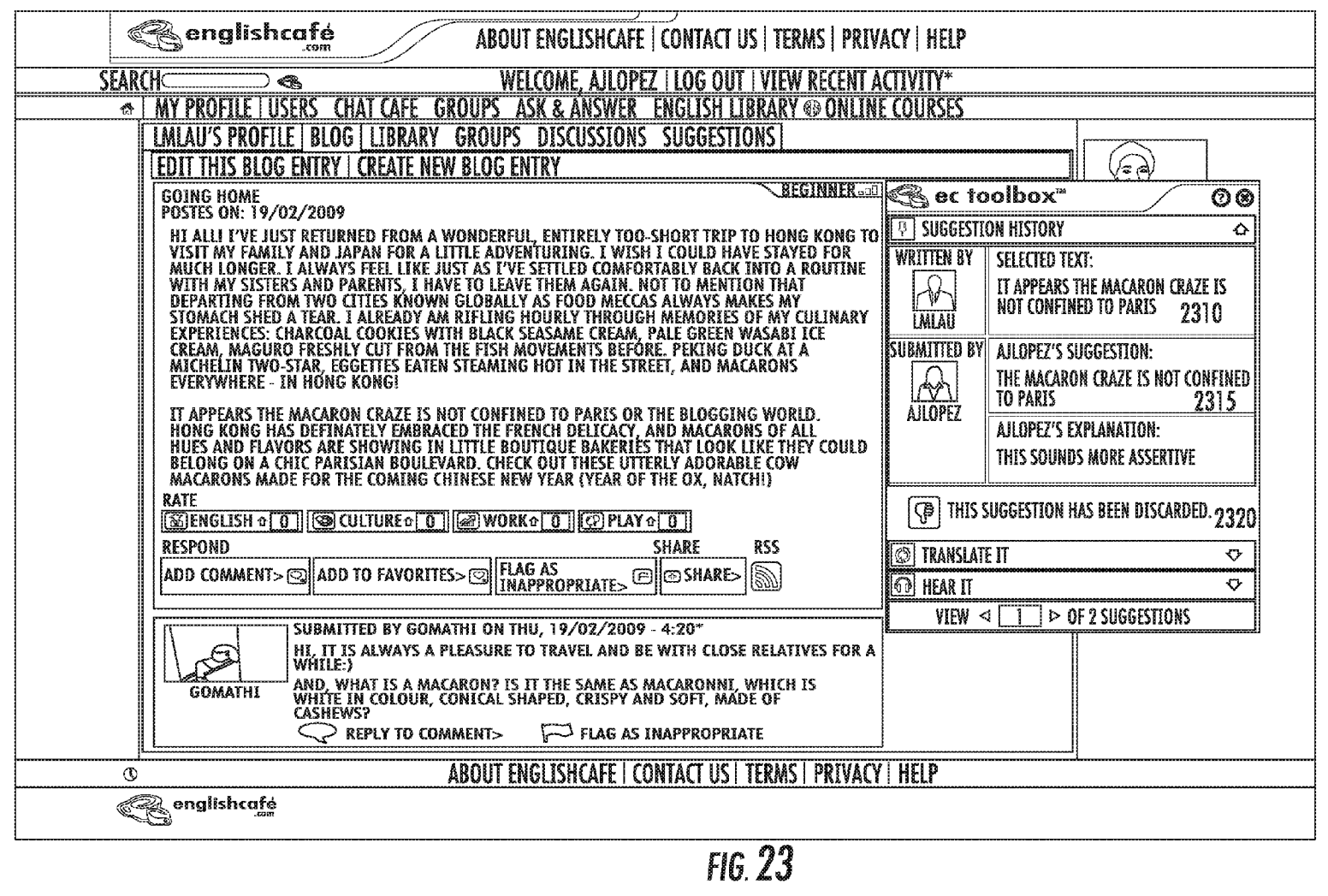

As shown in FIG. 23, clicking the collapsed header section reveals an expanded header section. The expanded header section includes first, second, and third regions 2310, 2315, and 2320, respectively.

The first region includes the original selected content (or previous text) for which a suggestion was made and the author of the selected content.

The second region includes the suggestion made to the previous text, the explanation for the suggestion, and the user who submitted the suggestion.

The third region indicates the status or decision made on the suggestion. In this example, the suggestion to replace "It appears the macaron craze is not confined to Paris" with "The macaron craze is not confined to Paris" was discarded.

The previous and next buttons in the footer of the toolbox allow the user to scroll through the history of suggestions. Clicking the next arrow advances to the next suggestion (FIG. 24A).

Figure 24A:
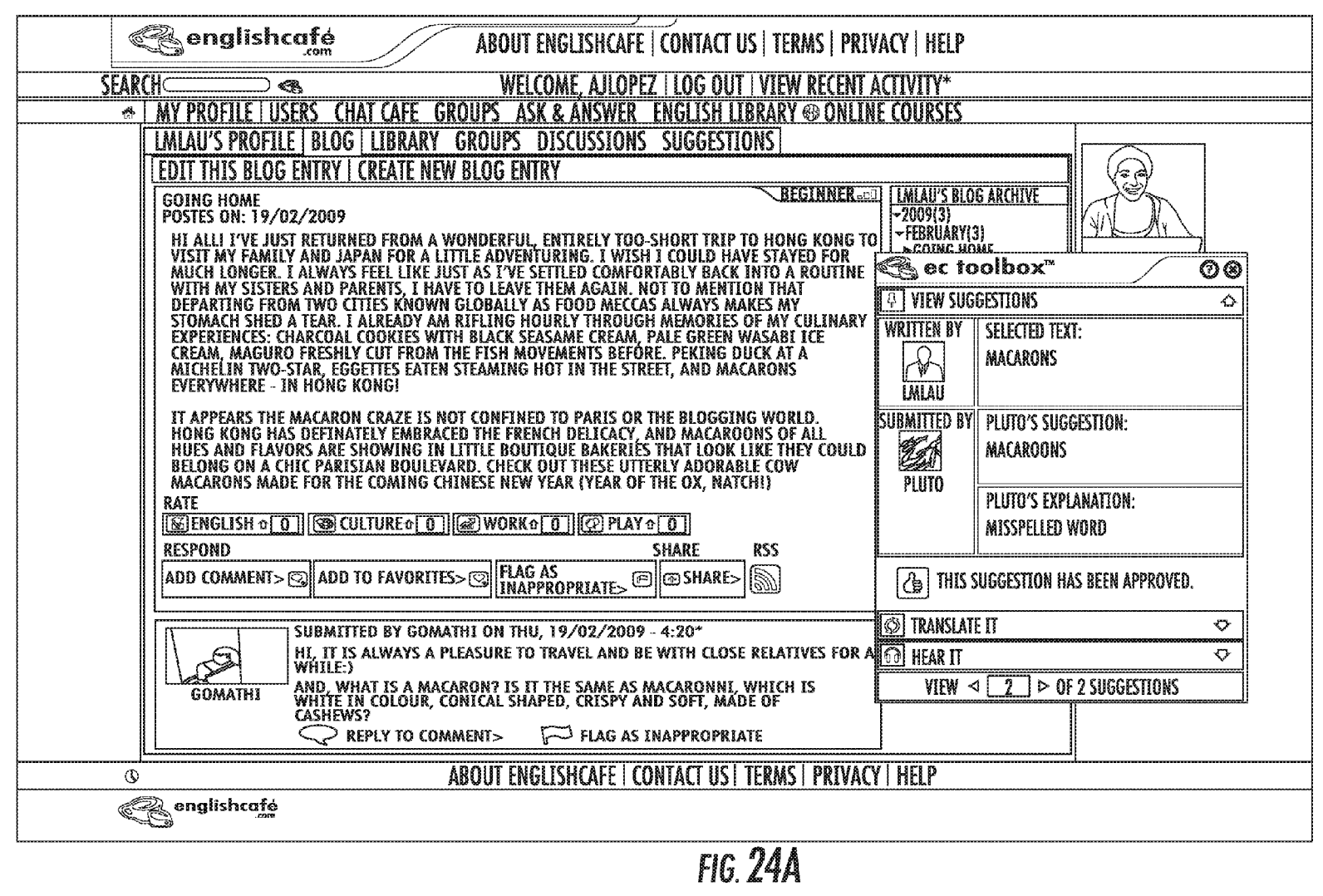

The toolbox shown in FIG. 24A is similar to the toolbox shown in FIG. 23. However, in this toolbox, the third region indicates that this particular suggestion, i.e., to replace the previous text, "macaron" with the suggestion "macaroon" was approved.

In a specific implementation as shown in the examples of FIGS. 23-24A, the content displayed in the first column is not highlighted as the user cycles through the suggestion history. However, in another implementation, the portion of the content corresponding to the particular suggestion in the toolbox is highlighted.

Figure 24B-2:
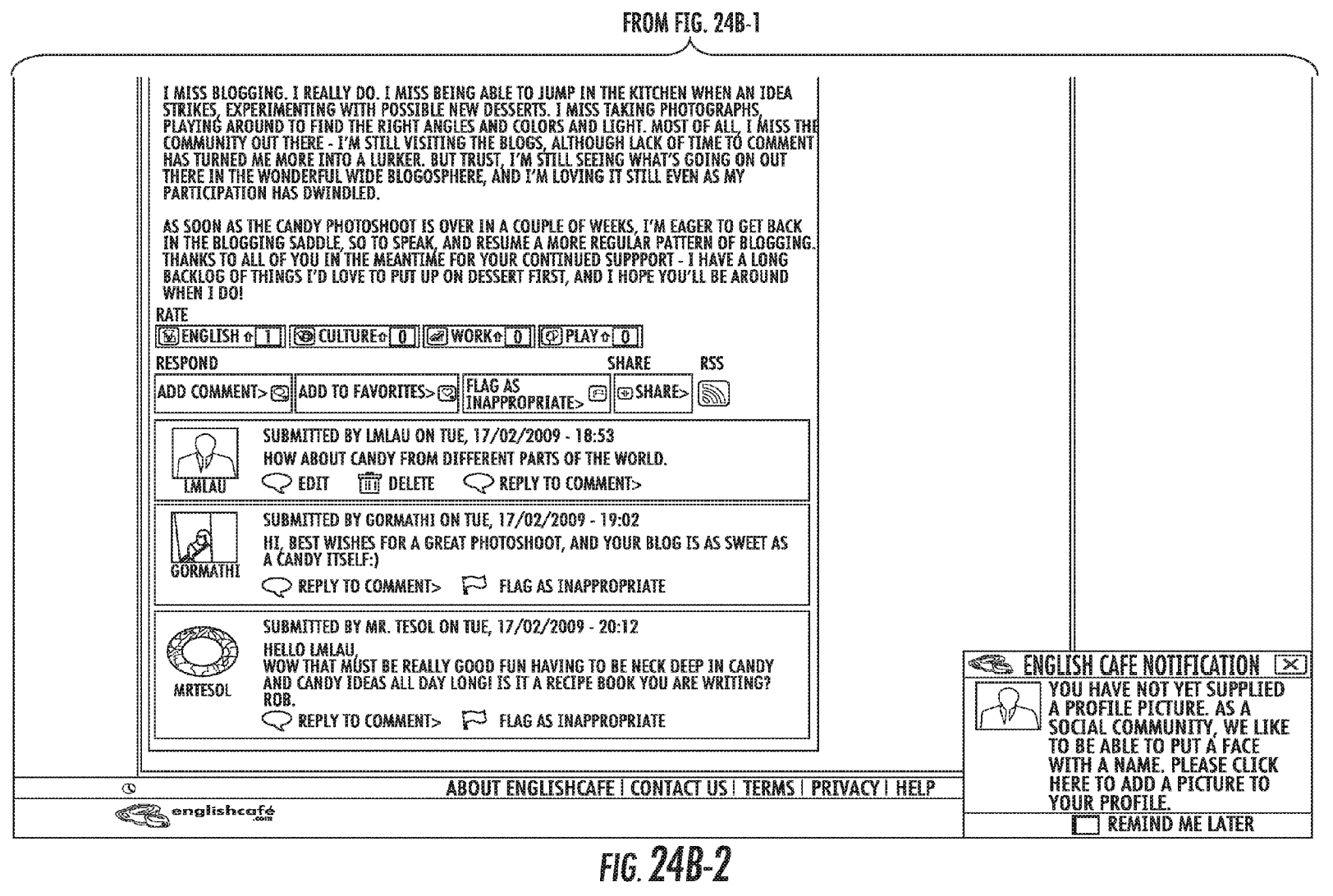

FIG. 24B shows an example of a Web page for which there are both current suggestions and noncurrent suggestions. A toolbox 2450 includes a collapsed header section 2452 having a banner title "Current Suggestions," and another collapsed header section 2454 having a banner title "Suggestion History."

Clicking collapsed header section 2454 reveals an expanded header section that allows the user to scroll through the various noncurrent suggestions. This process is described above and shown in FIGS. 23-24A.

Clicking collapsed header section 2452 reveals another expander header section that allows the user to scroll through the various current suggestions. If the user submitted the suggestion the user can edit the suggestion. See FIG. 16 and accompanying discussion. If the user is the author of the content the user can replace a portion of the content to which the suggestion relates with the suggestion or discard the suggestion. See FIGS. 17-22 and accompanying discussion.

FIG. 24C shows an example of a Web page summarizing the suggestions given or submitted by a particular user. In this example, the Web page is the suggestions given page for second user "ajlopez." The suggestions given page includes tables 2460 and 2465.

In a specific implementation, table 2460 includes a numerical total of the suggestions submitted or sent (e.g., 3), a numerical total of the suggestions approved (e.g., nil or 0), and an approval rate. The approval rate is a percentage based on the number of suggestions approved divided by the number of suggestions submitted.

Table 2465 includes entries showing additional detail on the suggestions given. This table has four columns. A first column of the table indicates the user who was sent the suggestion. The user may be indicated by displaying the user name, a user profile picture, or both. A second column displays the suggestion that was submitted. A third column indicates the elapsed time between the time that the suggestion was sent and the time that the suggestion was viewed. A fourth column displays a status identifier to indicate the status of the suggestion (e.g., discarded, approval pending, or approved).

Any of the cells of tables 2460 and 2465 can include links that when clicked on display another Web page or perform a specific function. For example, clicking on a link "Total Sent" in table 2460 can filter table 2465 to show each of the suggestions that were submitted or sent. Clicking on a link "Total Approved" 2460 can filter table 2465 to show the suggestions that were approved. The suggestions that were not approved may not be displayed. It should be noted that if no suggestions have been approved, as in this example shown, the link will be disabled.

Similarly, the information included in table 2465 may also include links Clicking on the user name link in the first column of table 2465 displays that user's profile page. Clicking on the suggestion in the second column of table 2465 displays the content associated with that suggestion as shown, for example, in FIG. 14. Similarly, clicking on the status identifier in the fourth column displays the content associated with that suggestion as shown, for example, in FIG. 14.

It should be appreciated that these tables are mere examples of the type of information that can be included in a suggestion summary table. For example, a summary table may instead or additionally include columns displaying the user's rating, other user profile data, the time and date that the suggestion was made, a portion of the suggestion, a portion of the original content, or other information.

Any of the columns in the tables may be sorted (e.g., alphabetically sorted or chronologically sorted). For example, clicking on the column title "To" may sort the table alphabetically by user (i.e., by user name).

Figure 24D:
FIG. 24D shows an example of a summary page of suggestions received.

FIG. 24D shows an example of a Web page summarizing the suggestions received from various users. In this example, the Web page is the suggestions received page for first user "lmlau." The suggestions received page includes tables 2470 and 2475.

In a specific implementation, table 2470 includes a numerical total of the suggestions received (e.g., 9), a numerical total of the suggestions approved (e.g., 3), and an approval rate (e.g., 33 percent). The number suggestions approved indicates the number of suggestions that the first user approved.

Similar to table 2465, table 2475 includes entries showing additional detail on the suggestions received. A first column of the table indicates the user who submitted the suggestion (e.g., user name and user profile picture). A second column displays the suggestion.

A third column indicates the elapsed time between when the suggestion was sent and when the suggestion was viewed by the recipient (i.e., first user). An indicator may be displayed to indicate whether or not the suggestion has been viewed by the recipient. For example, in this specific implementation the indicator includes an asterisk placed at the end of the suggestion. Thus, the suggestion in the fifth row second column of table 2474 includes an asterisk to indicate that the suggestion has yet to be viewed. It should be appreciated that such an indicator may similarly be used with table 2465 (FIG. 24C).

A fourth column displays a status identifier. The status identifier may be similar to the status identifier shown in table 2465 (FIG. 24C) and discussed above.

As was discussed for tables 2460 and 2465 (FIG. 24C), the cells of tables 2470, 2475, or both may include links that when clicked on display another Web page or perform a specific function. For example, clicking on a link "Total Received" in table 2470 filters table 2475 to display the all the suggestions received. Clicking on a link "Total Approved" in table 2470 filters table 2475 to display the suggestions approved. The suggestions that have not been approved may not be displayed.

Figure 26:
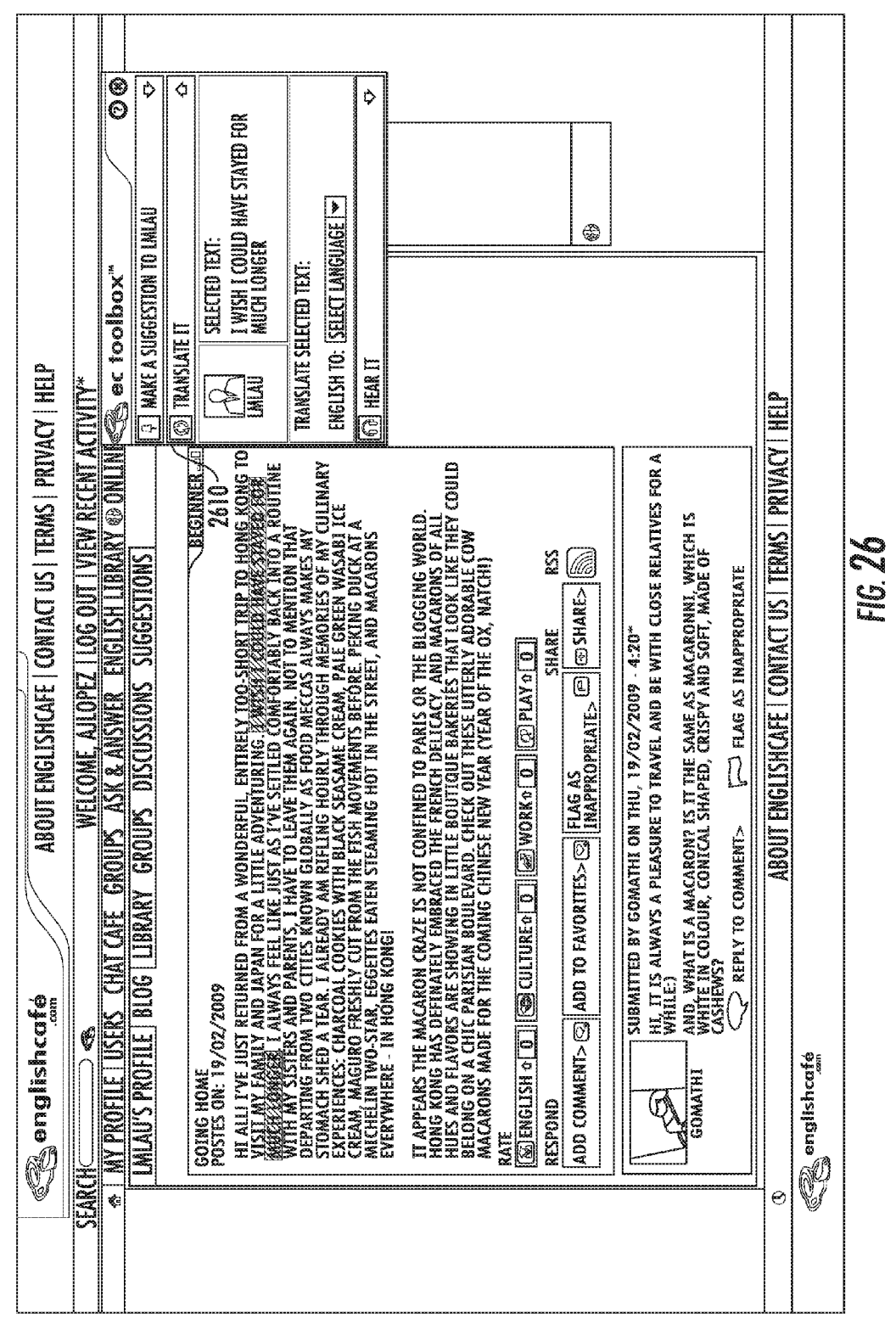
Figure 27:
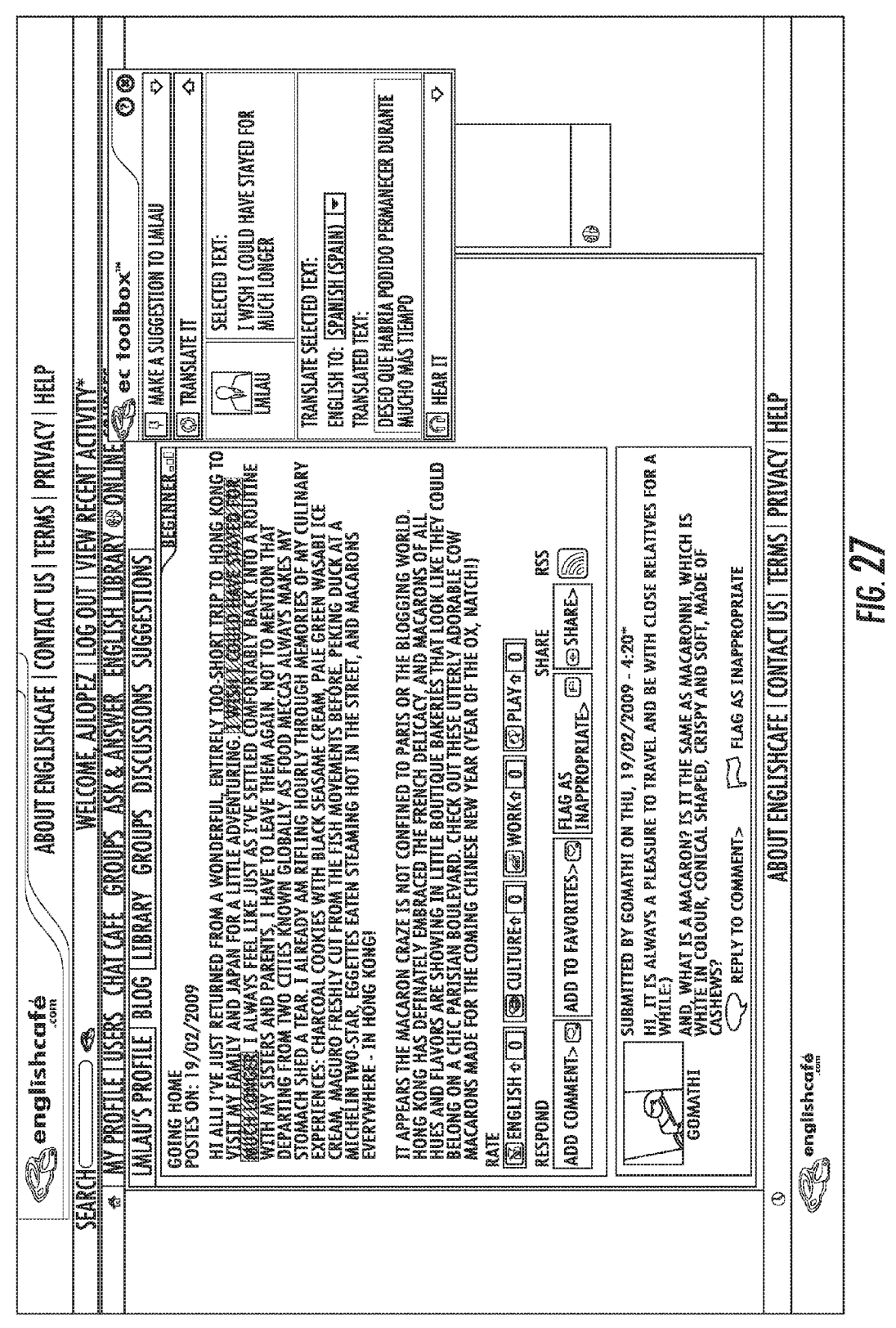

FIGS. 25-27 show specific implementations of Web pages for the flow diagram shown in FIG. 5 for translating content on a Web page. FIG. 25 shows an example of a Web page where the user has selected a portion 2510 of the content. A toolbox dialog box 2515 pops up and is displayed adjacent to the selected portion. The user can translate the selected portion by clicking the second tool ("Translate It").

As shown in FIG. 26, the collapsed second header section then expands to reveal an expanded second header section 2610.

In FIG. 26, the toolbox is repositioned in the second column In other words, the toolbox is repositioned so that it does not overlap with the content in the first column. The expanded second header section includes a first and second region. The first region includes the user who authored the content including the user name and a profile picture. The first region further includes the selected content, i.e., "I wish I could have stayed for much longer."

The second region includes a menu (e.g., drop-down list) that allows the user to choose the language for the translation. The user can select any language for the translation (e.g., German, Spanish, Portuguese, French, Italian, Japanese, Chinese, Korean, Russian, or Polish—just to name a few examples.

Once the user has selected the language for translation, the system displays a translation of the selected content as shown in FIG. 27.

In FIG. 27 the toolbox now includes a third region in the expanded second header section which includes the translation of the selected content.

Figure 28:
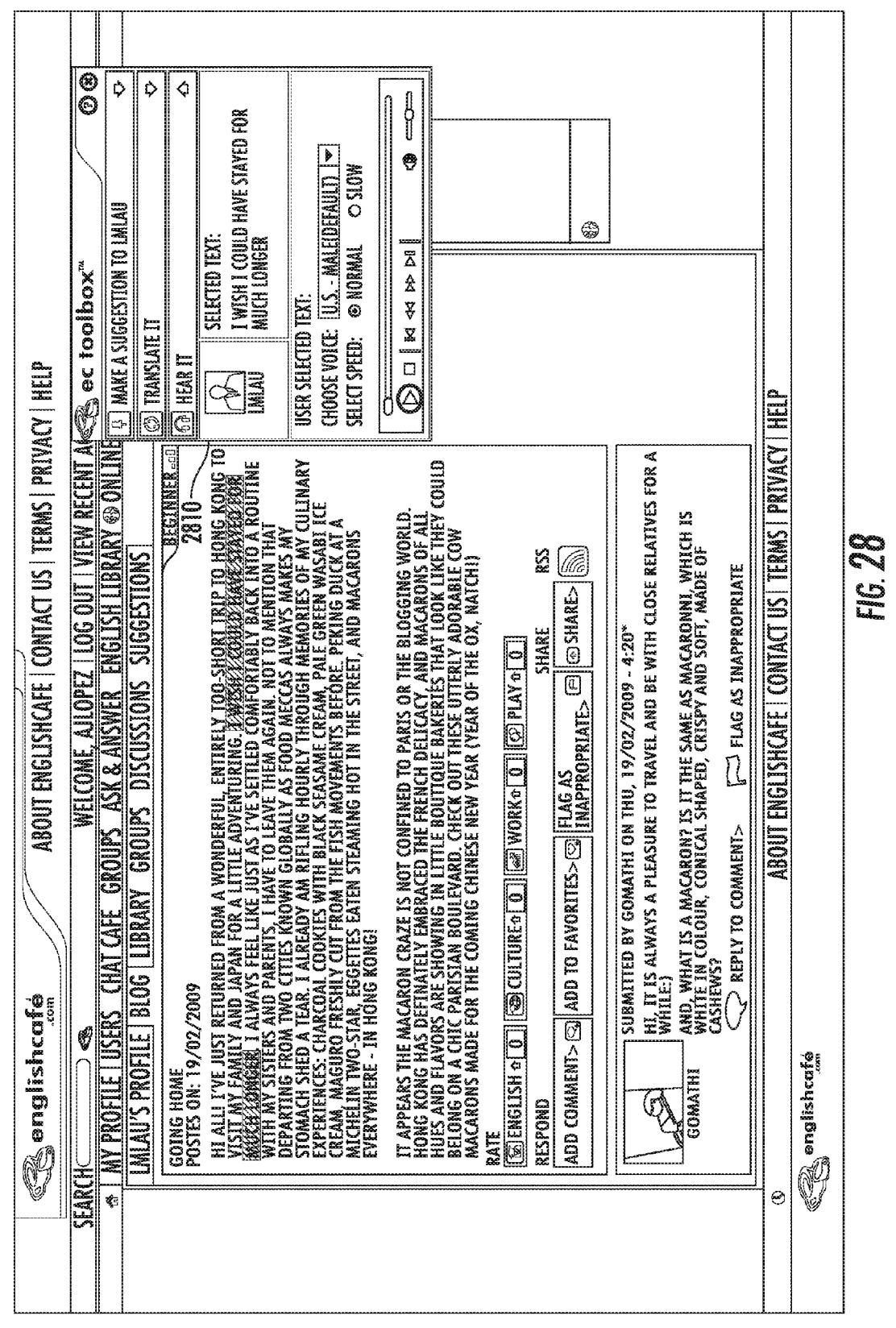

FIG. 28 shows a specific implementation of a Web page for the flow diagram shown in FIG. 6 for vocalizing the selected content. Referring now to FIG. 25, the user has selected portion 2510 of the content to vocalize and toolbox 2515 pops up near the selected portion. The user can hear a vocalization of the selected content by clicking the third tool ("Hear It") in the toolbox.

As shown in FIG. 28, the toolbox is repositioned to the second column and the collapsed third header section expands to reveal an expanded third header section 2810. The expanded third header section includes a first, second, third, and fourth region.

The first region includes information as discussed above (e.g., user who authored the content and the selected content).

The second region includes a menu (e.g., drop-down list) that allows the user to choose the voice (e.g., accent, dialect, or language) in which to hear the selected content.

The third region includes a menu (e.g., radio buttons) that allows the user to choose the speed at which to hear the selected content (e.g., "normal" or "slow").

The fourth region includes audio player controls such as a play button, fast forward and rewind buttons, next and previous buttons, and a volume control. Thus, after the user clicks the play button, the system vocalizes the selected content using the voice selected by the user and at the speed selected by the user. The vocalization is played through the speaker at the client system.

Figure 29:
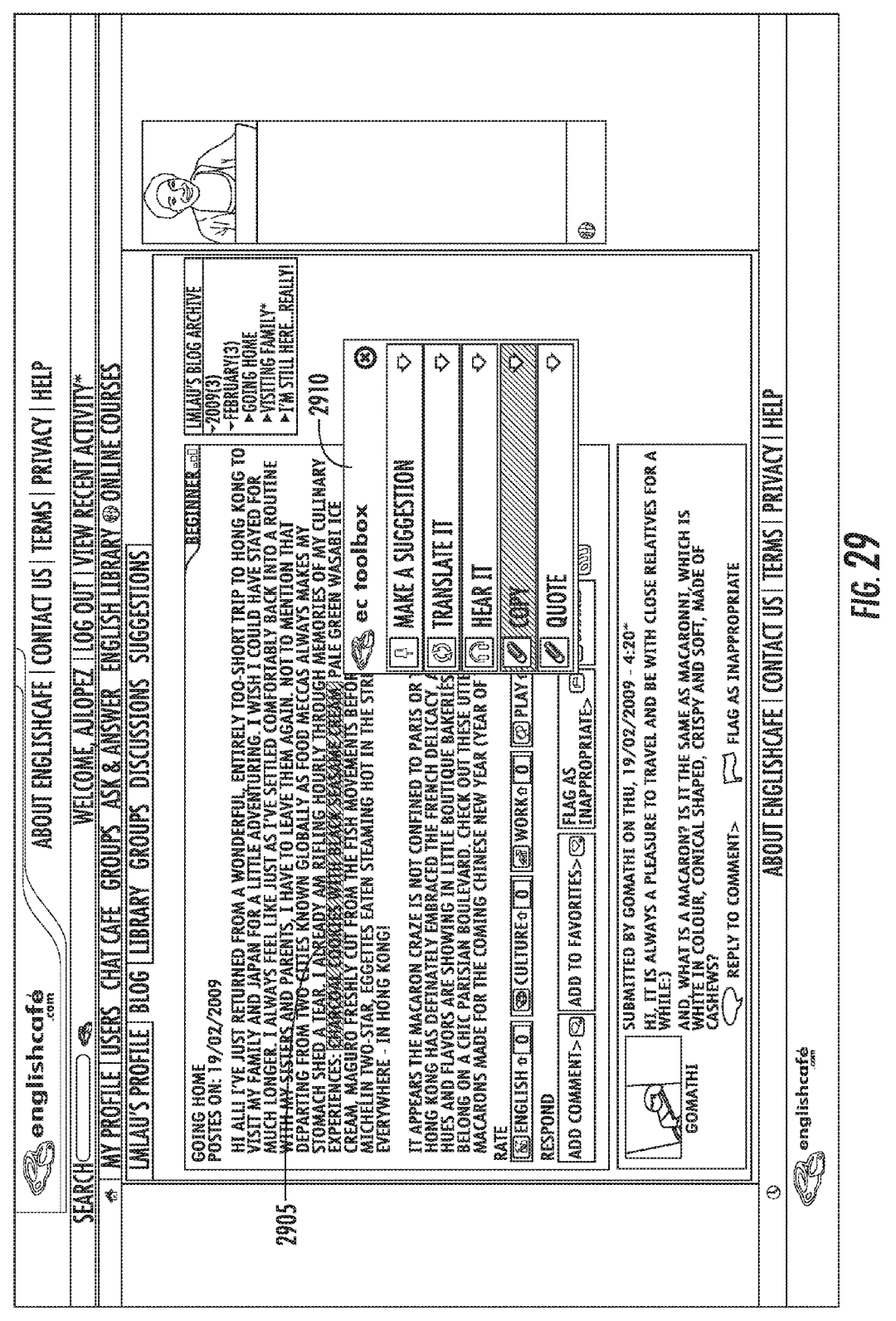
Figure 30:
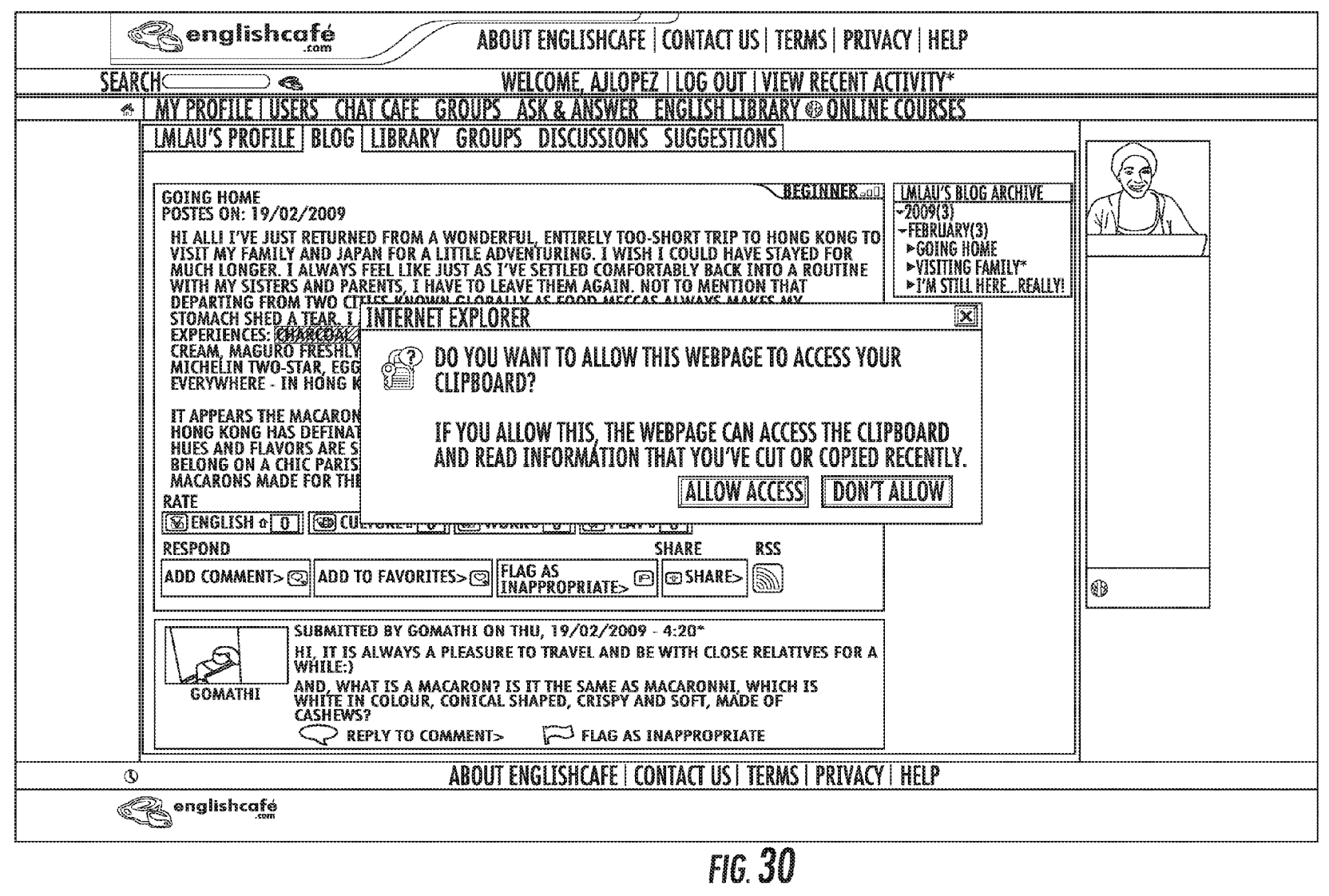

FIG. 29 shows a specific implementation of the copy feature of the toolbox. In FIG. 29 the user has highlighted a portion 2905 of the content and toolbox 2910 pops up adjacent to the selected content. The user can copy the selected portion to a clipboard of the client system by clicking the fourth tool ("Copy"). After clicking "Copy" a prompt appears seeking authorization from the user to allow the Web page to access the user's clipboard (FIG. 30). If the user allows the copy the selected content is copied to the user's clipboard. The user can then, for example, paste the selected content into a document of another application (e.g., word processor). If the user does not allow the selected content to be copied the selected content is not copied and the user is returned to the previous page (FIG. 29).

FIG. 31 shows a specific implementation of the quote feature of the toolbox. In FIG. 31 the user has highlighted a portion 3005 of the content and toolbox 3010 pops up adjacent to the selected content. The user can use the quote tool to include the selected content in a comment to the content.

Figure 32A:
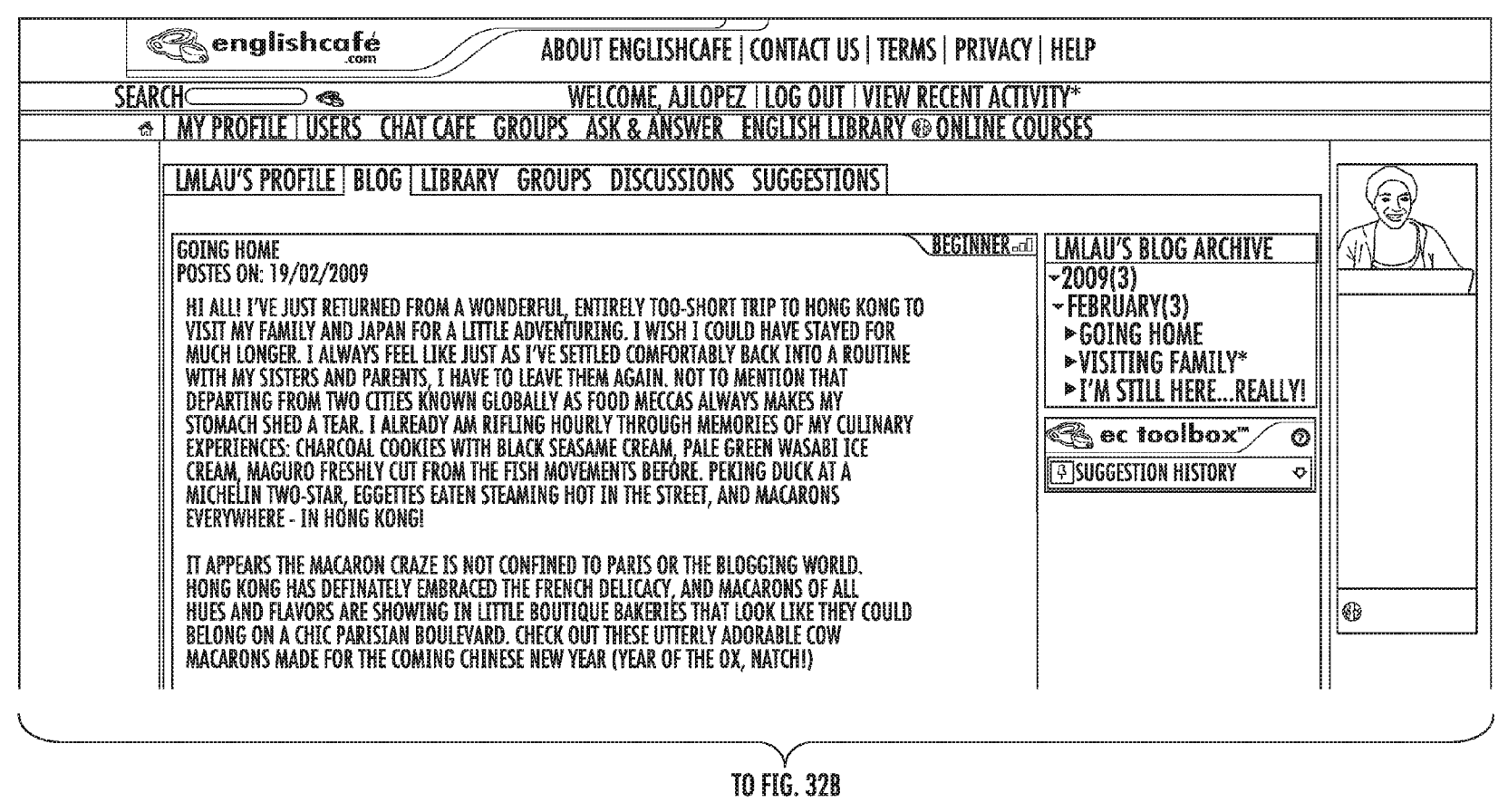

As shown in FIG. 32, upon clicking the quote tool a bottom region of the first column displays an input box. The input box includes selected content, i.e., "Peking duck." The user can then input a comment (i.e., "That is my favorite dish.") to associate with the selected content.

Figure 33A:
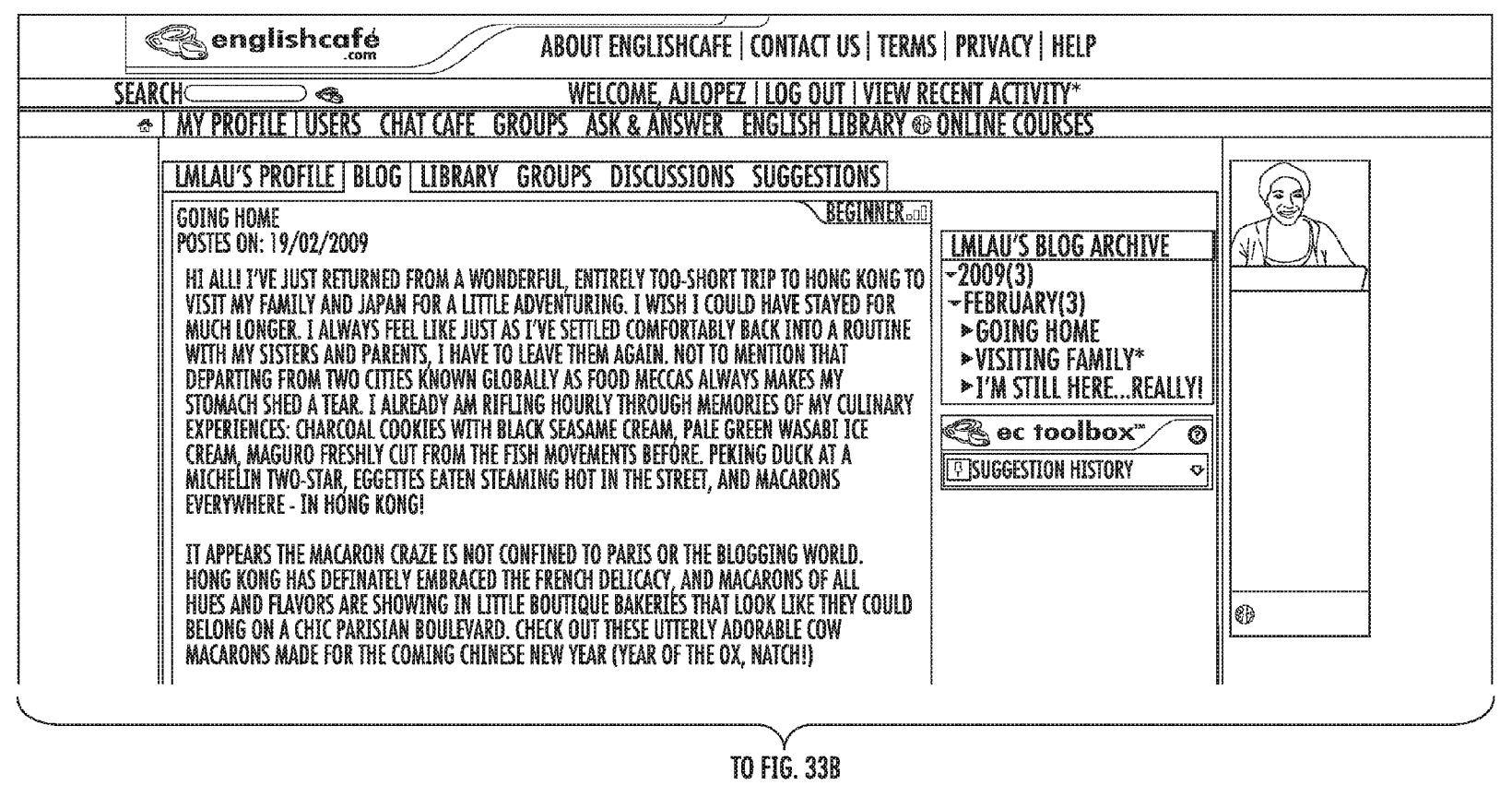
Figure 33B:
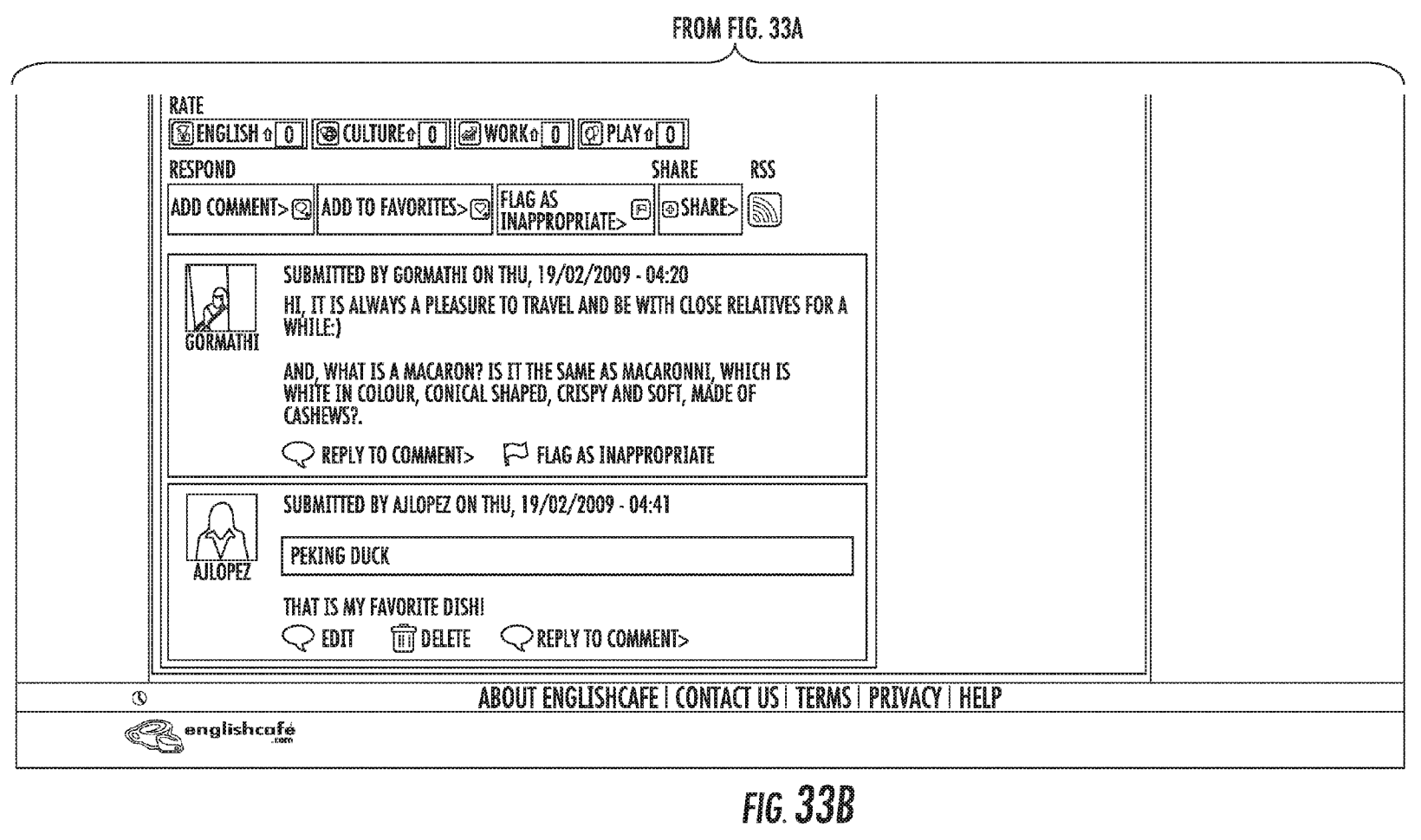

Clicking a button labeled "Post Comment" then posts or appends the comment along with the selected content to the bottom of the page (FIG. 33).

Figure 34A:
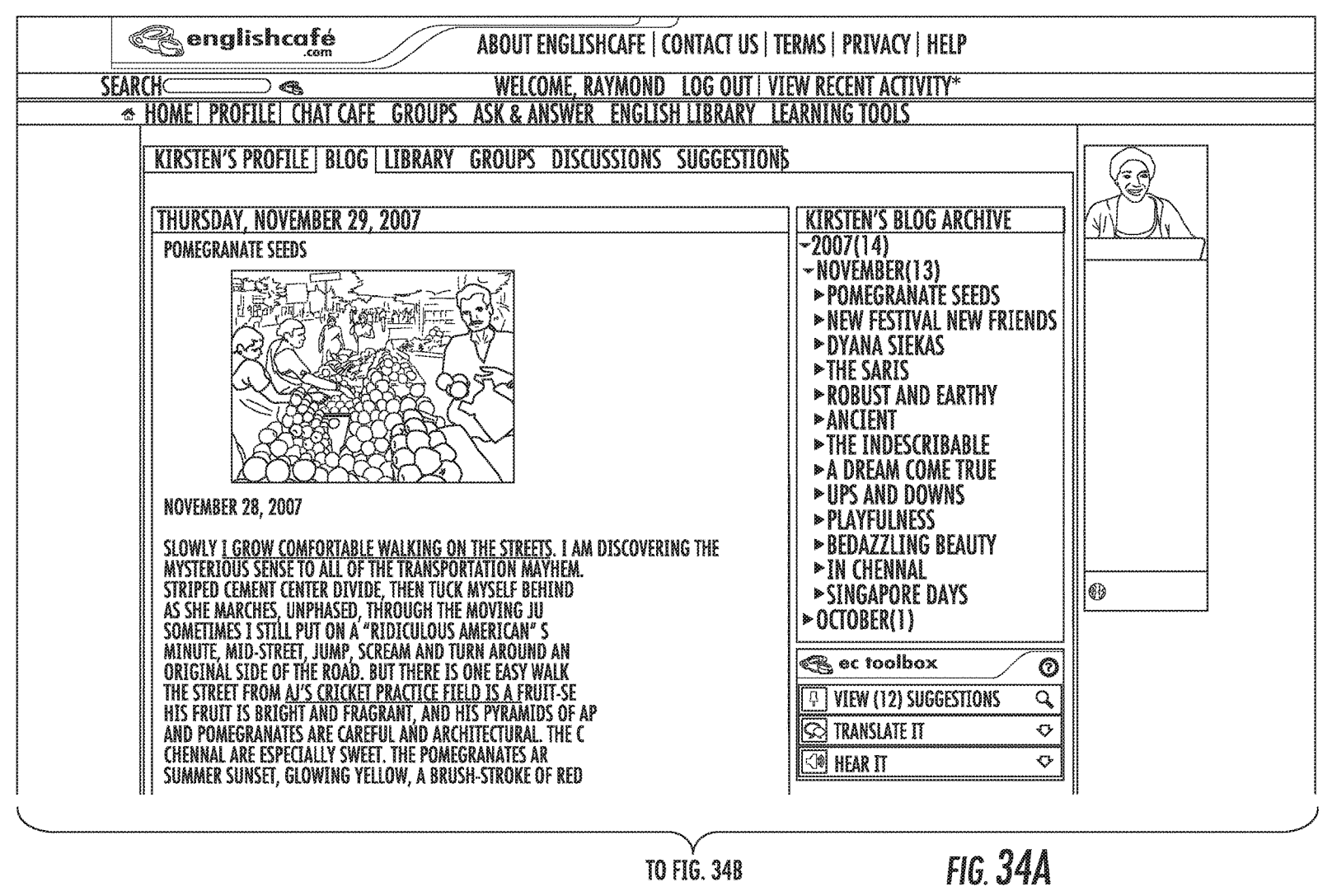
Figure 34B:
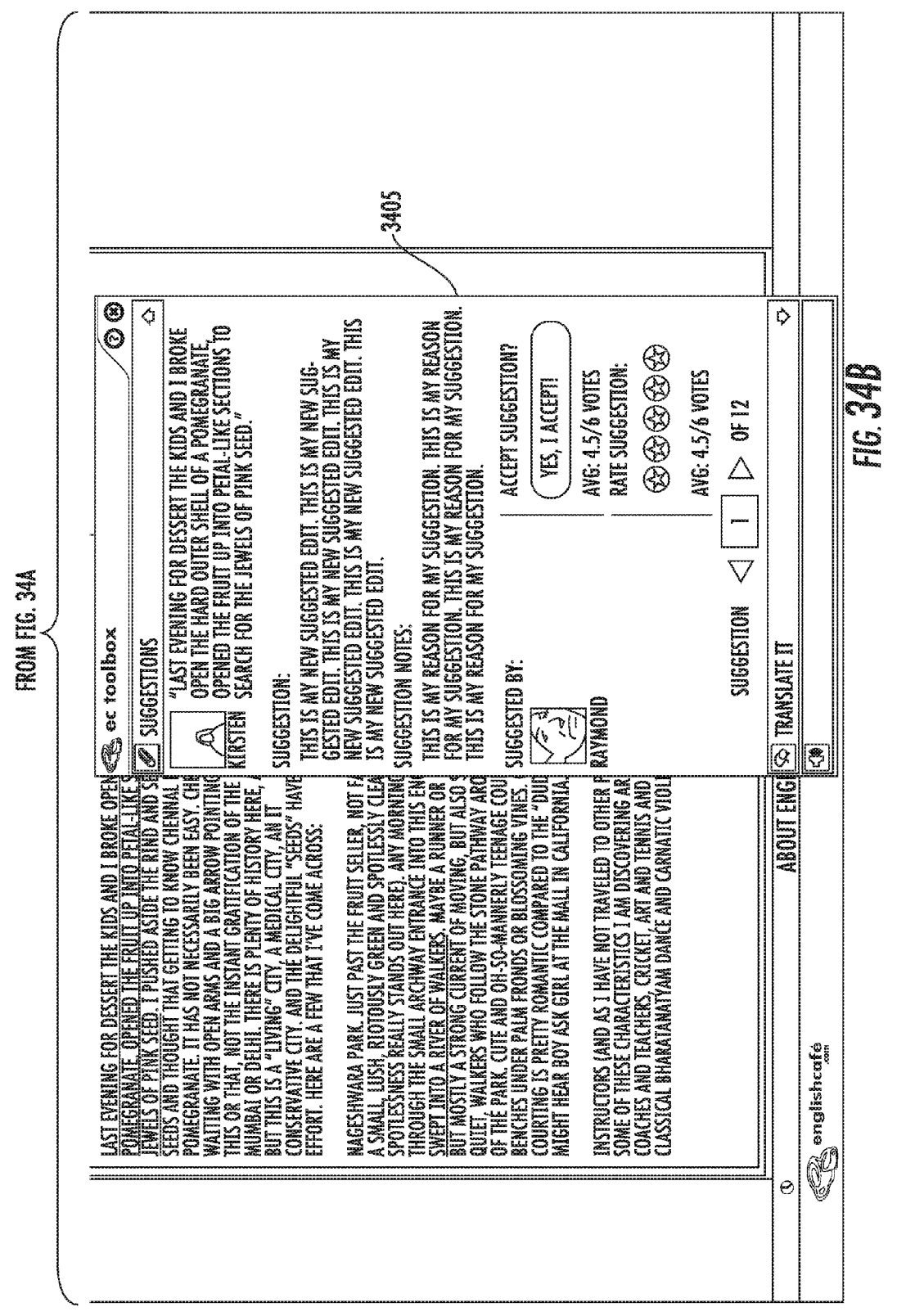

FIG. 34 shows a specific implementation of a toolbox 3405 that includes a rating tool to rate the suggestion. In an implementation, the system employs a community-based rating system for suggestions. Users may rate each other's suggestions. The rating mechanism helps to build trust and loyalty in the community and promotes quality suggestions. This in turn results in more users sharing more documents on the system. In an implementation, the system relies on a user's natural desire to cultivate for themselves a good reputation among the community. In other implementations, the system may provide additional incentives to encourage quality suggestions. This may include special designations for the user (e.g., animated user name or bigger profile picture) or monetary incentives (e.g., gift certificates, cash rewards, or merchandise).

In an implementation, a suggestion may have multiple categories that users can rate. Categories may be based on, for example, grammatical correctness, factual accuracy, proper spelling, sentence construction and organization, adherence to standard conventions, style, fluency, punctuation, word choice, depth of thought, originality, clarity, readability, or coherency, or combinations of these.

The system stores the ratings each user received. In an implementation, users can retrieve a list of all the suggestions made by another user and the ratings the suggestions received.

The rating format can vary. In an implementation, the rating format is a series of stars. More stars indicate a higher rating. In other implementations, the rating format may be in any convention such as thumbs up or thumbs down or useful or not useful. In yet another implementation, the rating format includes a numerical scale, such as from 1 to 5, or a series of grades, such as A, B, C, D, or F. The system may offer guidelines on the various ratings that can be assigned to a suggestion. For example, a guideline may explain that an "A" rating should be given to suggestions with no spelling mistakes. A "B" rating should be given to suggestions having one to three spelling mistakes, and so forth. This helps to ensure consistent ratings among the users.

In an implementation, the rating may also be based on the number of times that a user's suggestion was accepted or a ratio of the number of times the user's suggestion was accepted to the number of times the user made a suggestion.

In an implementation, users with low ratings may be prevented from making suggestions. A user may also block another user from making a suggestion. This helps to prevent abuse of the system.

The system can employ any number of algorithms in determining a particular user's rating. Ratings may be mapped to points to be included in rating calculations. The calculations may include averages of a user's positive and negative ratings or averages after removing the highest and lowest rating. In an implementation, weighted average calculations may be used. For example, ratings given by certain users, such as users who frequently contribute on the system, may be given more weight than users who infrequently contribute.

In an implementation, the system may also factor the number of accepted suggestions from unique users. This helps to prevent two users from potentially abusing the system by artificially inflating each others' ratings. It also prevents one user from negatively affecting the rating of another user by repeatedly giving negative ratings. In yet another implementation, the system uses Bayesian average calculations. A Bayesian average calculation may be used, for example, to prevent skewing of a user's rating when the user has received relatively few ratings.

In an implementation, users are given different distinctions based on their ratings. These distinctions may change over time. For example, as a user's rating improves, they may progress from having a bronze star displayed next to their profile to a silver star, and then a gold star.

In another implementation, the system allows the author to create a poll. The author can then allow other users to cast a vote for the various suggestions. The system totals the votes each suggestion received. Thus, each suggestion may also have a number of votes associated with it.

In a specific implementation, the system allows the user to filter the suggestions based on a user's rating. For example, a user may want to see only those suggestions by users who have high ratings. The system will then respond accordingly to show suggestions from those users with high ratings and not show suggestions from users with low ratings.

Furthermore, in various other implementations of the toolbox a translation feature of the toolbox provides a translation of the suggestion, explanation, or both from a first language to a second language, different from the first language. A vocalization feature of the toolbox provides a vocalization of the suggestion, explanation, or both from a first voice (e.g., dialect) to a second dialect, different from the first dialect.

FIGS. 35-40 highlight the various features of the toolbox. In a specific implementation, no additional application besides a browser application needs to be installed on the client in order for a user to use the features of the toolbox. For example, no browser plug-in needs to be installed on the client. The toolbox may not need to be installed on the client system, but available by a user simply being able to view the Web site. This is especially important in cases where a user does not have administrative privileges to install software on the client machine. In a specific implementation, executable code for toolbox application is not stored on a hard drive (e.g., also no Windows registry entries), but rather code is portable and can be obtained via the network and Web site; there is no need to reboot the machine to make the code effective. The same code that is associated with a Web site is platform independent, so it can be run by a IBM compatible PC or a Apple Macintosh computer as long as an appropriate Web browser is used.

In various other implementations, the toolbox may be part of the browser or a plug-in to the browser. The toolbox may be a Sun Java™ applet, ActiveX control, or other Web-based executable program. In another implementation, the toolbox may be a separate application from the browser and may run even if the browser is closed. The toolbox may be purchased as an application separate from the browser and may permanently occupy memory on the client system.

One or more features of the toolbox may be used with documents such as e-mails, letters, reports, research papers, essays, or editorials.

Figure 35:
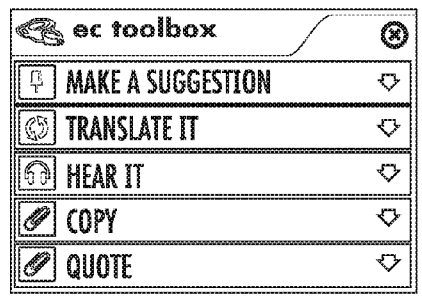
FIGS. 35-40 show a specific implementation of features of a toolbox.

FIG. 35 shows the toolbox with all the header sections collapsed. Each of the header sections includes a banner including a graphic (e.g., pin, counterclockwise arrows, headphones, and paper clips), a title of the tool, and an arrow icon. The title of the tool is between the graphic and the arrow icon. When the header sections are collapsed the arrow icon points down to indicate a collapsed header section.

Although the toolbox shows five tools it should be appreciated that there the tool can have any one or combination of the tools described, and may include additional tools not shown. Depending, for example, on factors such as the user's role (e.g., content author or suggestion author), whether any content has been selected, whether there are any current suggestions, and whether there are any past suggestions, the toolbox may display some tools and hide the other tools that may not be relevant. For example, the toolbox of FIG. 22 displays the suggestion history tool and no other tools. The toolbox of FIG. 24B displays the current suggestion and suggestion history tool and no other tools.

In a specific implementation, the toolbox includes a download tool. The download tool may enable the user to download the Web page or document to the client system. Different versions of the document may be downloaded. The original document may be downloaded. The current version or a prior version of the document may be downloaded. The suggestions, explanations, or both can be downloaded.

It should also be appreciated the tools may be displayed in the toolbox in any order.

Figure 36:
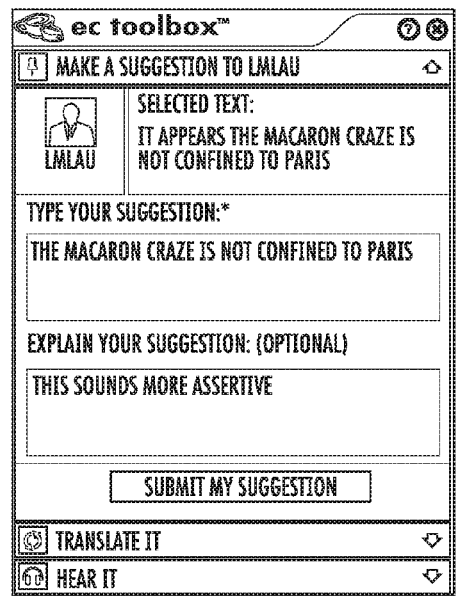

FIG. 36 shows the submit suggestion feature of the toolbox. The first header section expanded. The arrow icon for the first header section now points up to indicate that the first header section is expanded. A title bar of the toolbox includes a question mark icon. The question mark icon may be clicked on to pop open a help window. The help window may include instructions on how to use the various tools or features of the toolbox. In a specific implementation, the instructions in the help window are context-sensitive. For example, the particular instructions in the help window may depend upon which tool the user is trying to use. Thus, clicking on the question mark of FIG. 36 may display instructions related to submitting a suggestion. Clicking on the question mark of FIG. 37 may display instructions related to viewing suggestions. Clicking on the question mark of FIG. 38 may display instructions related to approving suggestions, and so forth.

Figure 37:
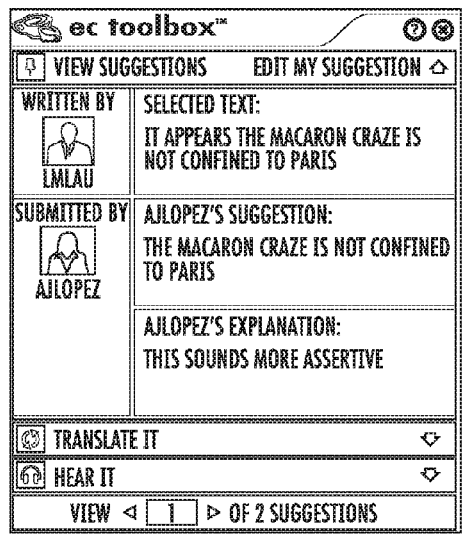
Figure 38:
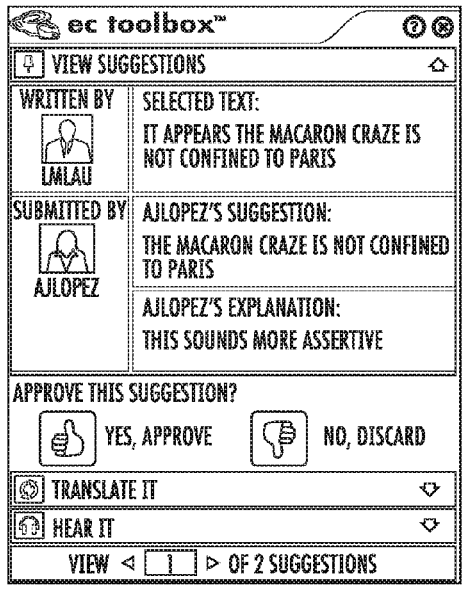

FIG. 37 shows the view suggestion feature of the toolbox. FIG. 38 shows the adopt suggestion feature of the toolbox.

Figure 39:
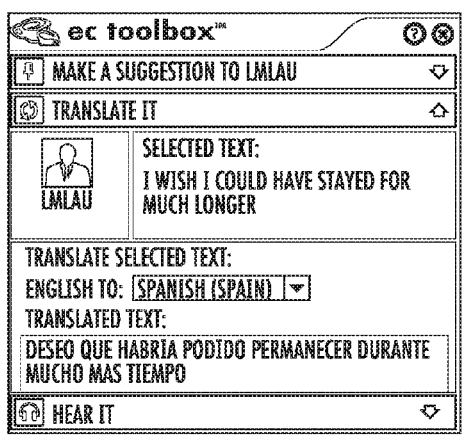

FIG. 39 shows the translation feature of the toolbox. In an implementation, this feature is available to all users. In other implementations, it is only available to certain users, such as users who have paid to access the system. The user may select any content for translation by the system. This includes, for example, any text, the text for which a suggestion has been made, the suggestion, or the explanation for the suggestion.

In an implementation, the system translates the selected content into a language specified in the user's profile. For example, a Spanish speaking user may have in their profile that they would like translations to be in Latin American Spanish. The translation button label is then dynamically updated for this particular user to display the label "English to Latin American Spanish." Upon clicking the button, the system responds with a translation of the selected content from English to Latin American Spanish.

In other implementations, the user may select a different language to translate the content into. For example, the user may want to see instead a Russian translation. The system provides the user with options to select other languages. The options may be displayed in a drop down box or as a series of radio buttons. A series of checkboxes may also be used where, for example, the user desires a translation in different languages. Thus, the system may display concurrently two or more translations in the toolbox.

Figure 40:
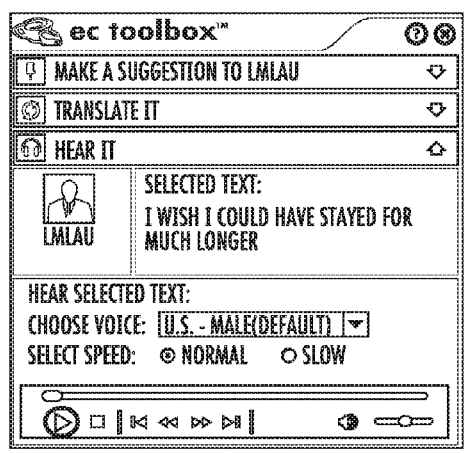

FIG. 40 shows the hear it or vocalization feature of the toolbox. In an implementation, this feature is available to all users. In other implementations, it may only be available to certain users, such as users who have paid to access the system. The user may select any content to hear an audio recording. This includes, for example, any text, the text for which a suggestion has been made, the suggestion, or the explanation for the suggestion.

In an implementation, the system coverts the content into a speech that is specified in the user's profile. For example, a user interested in learning United Kingdom accents may have in their profile that they would like to hear United Kingdom male accents. The speech button label is then dynamically updated for this particular user to display the label "U.K. Male Accent." Upon clicking the button, the system responds with a voice recording of the selected content using a United Kingdom male accent.

The system may provide a recording, audio representation, or vocalization of the speech in any language, including, for example, Spanish, French, German, Japanese, Korean, Chinese, Russian, Portuguese, Greek, Hebrew, Swahili, or others. Furthermore, the speech may be in any dialect or accent, including for example, UK accents, Southern accents, Latin American dialects, or others.

The system also provides an option for the user to vary the speed of the recording. In a specific implementation, the options may be displayed as set of radio buttons for fast or slow. In other implementations a slider bar may be used. This allows a user who is learning, for example, a new accent to clearly hear the subtle changes in tone.

Figure 41A:
FIG. 41A shows an example of a home page of the system.
Figure 42:
FIG. 42 shows an example of a user's library page.

FIG. 41A shows an example of a home page of the system. Typically, the home page is the first or opening page of the system. It is typically the page that the user will see when logging into the system. The page may describe site's purpose—e.g., a social networking site for users who are interested in learning and teaching others about different languages and cultures. The page may provide an input box for registered users to enter their user name and password to log into the system. The page may explain to new users how to register. A section on the page may list popular search terms using tag clouds.

There are links at the top of the page including: About EnglishCafe, Contact Us, Terms, Privacy, Help. These links provide general information about system. For example, the "About EnglishCafe" page may describe the system's management team, engineering team, and investors.

The "Contact Us" page provides a listing of contact information such mailing addresses, phone numbers, and e-mail addresses. It may also include a map showing the physical location of various offices. There may be contact information to different corporate departments such as technical support.

The "Terms" page may inform users of various terms that users are agreeing to when using the system. The terms may cover, for example, agreements not to (i) post false, inaccurate, misleading, defamatory, offensive, or libelous content; (ii) violate any laws or third party rights; (iii) take action to undermine the Web site's rating feature; (iv) distribute or post spam; (v) distribute viruses; or (vi) collect information about users, including e-mail addresses, without their consent.

The "Privacy" page describes the system's privacy policy. It may inform users on how their personal information is collected, handled, used, and stored. It may describe the conditions under which such information may be disclosed, the system's policy on the use of cookies, and the security measures the system employs to keep a user's personal information safe.

The "Help" page provides users with technical assistance. It may describe, for example, how a user can get started using the system and various features such as ratings and translations. Information on the help page may be arranged by topic. It may include an index. There may also be a live chat window for a user to connect with a customer service representative.

The system also provides a search feature. Searches include key word searches, searches based on subject, searches based on user name, or combinations of these. Users may also execute advanced searches using, for example, logical and Boolean operators such as or, and, not, or other operators. Operations may be performed using regular expressions. Search results may be narrowed, for example, by language, a user name, a user's rating, or other criteria, and combinations. Users can use the search feature to search for the blogs of other users.

In an implementation, the system provides customized welcoming messages when a user logs in, such as the small greeting at the top shown in the figure. The user can log out of the system at anytime by clicking the "Log Out" link.

A "My Profile" link takes the user to their account or user profile page. Account information includes, for example, the user's e-mail address, location, birthday, password, user name, security question (in case the user forgets their password), educational background, preferred language, and other personal information.

FIG. 41B shows an example of a user profile page. In a specific implementation, the system updates the profile of the user who made the suggestion. For each user, the system may record a rating, the number of suggestions the user made, the number of times the user's suggestion was accepted, the time of the suggestion, the suggestion content, or other information, and combinations of these. The system notifies the user who made the accepted suggestion. The notification may be through e-mail, instant message, short message service (SMS) messages, electronic messaging, telephone call, or other.

The profile page may further include a number of user-specific information (e.g., contact information, native language, learning interests, or educational background) that the user chooses to share with others. This allows users to seek out other users with similar interests. The profile page may contain a picture that the user has uploaded, recent postings to the system, their network friends, news feeds, or other information, and combination of these.

A feature of the invention may serve a user's need for learning multiple languages, simply by the user making a selection of which language the user wants to learn or be associated with. Users can select one language from a number of available languages. A user may choose to learn two or more languages. A user may choose to learn one language and then change their mind; the user would then change the user's selection (such as through the user's profile) to a different language.

A "Blog" tab links the user to their blog. The blog can be where the user provides their own commentary or news on a particular subject. A blog may also function as a personal on-line journal where a user records their various experiences. Previous blog entries may be arranged and categorized chronologically, such as by year, month, and day. Thus, the system also archives previous blog entries. These entries are accessible using the links on the right side of the page. A counter next to the time periods displays the number of entries for that time period. For example, a counter next to the year indicates the number of blog entries for that year. A counter next to a month indicates the number of blog entries for that month. In other implementations, the blog entries may be indexed by subject or other criteria.

The links or tabs labeled Library, Groups, Discussion, and Suggestions may be user-specific. In an implementation, these tabs may also be accessible by other users. This allows users to interact, socialize, and share information about themselves. For example the user's library may contain a list of written works that the user has recently read or would like to read. The user's library may also include reviews for various books, or the user's list of favorite books and authors. Other users may also see groups that the user belongs to and discussions that the user has participated in.

Figure 47:
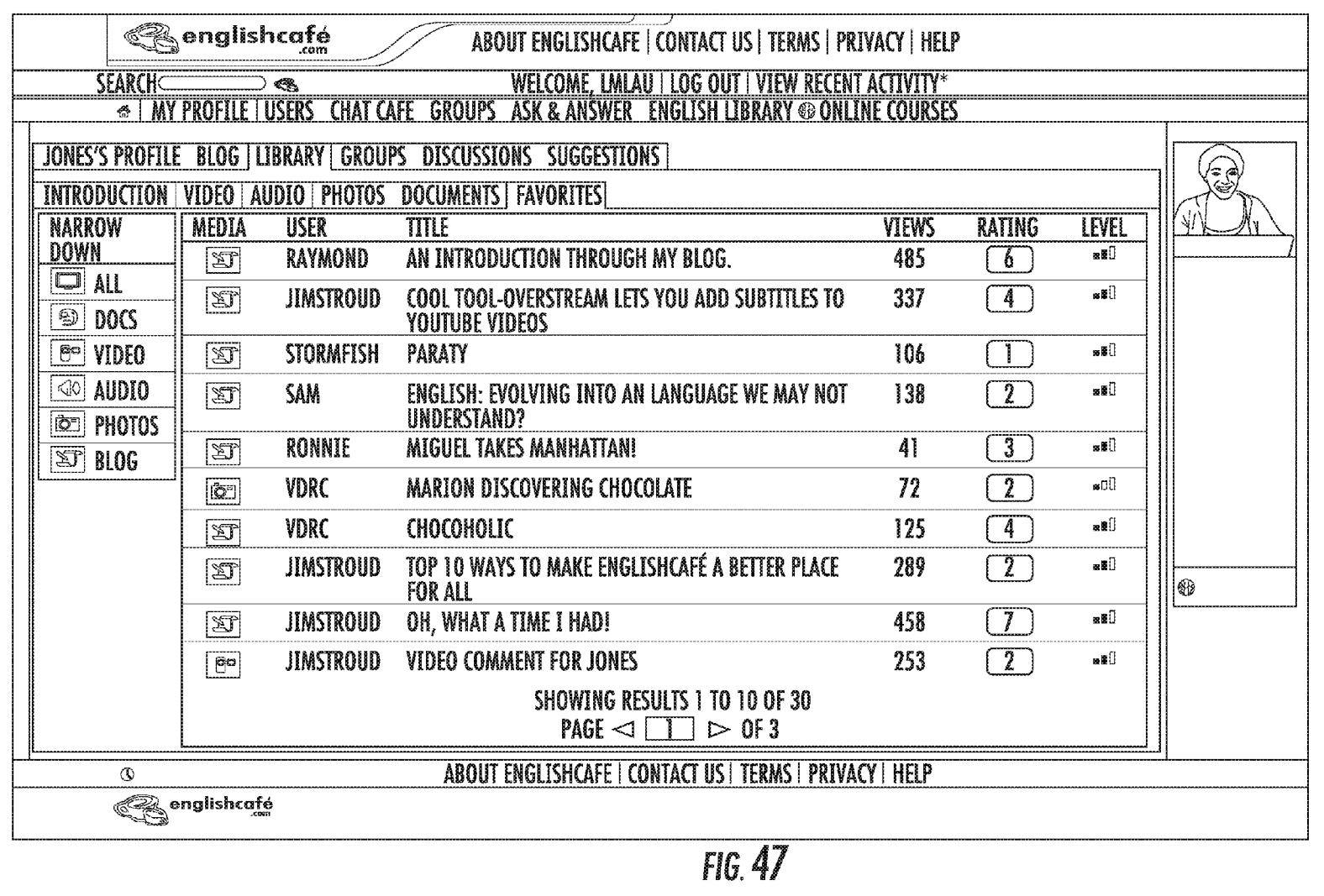

FIGS. 42-47 show various exemplary pages in a user's library page, including a user's library page (FIG. 42), video library page (FIG. 43), audio library page (FIG. 44), photo library page (FIG. 45), document library page (FIG. 46), and favorites library page (FIG. 47).

Figure 48:
FIG. 48 shows an example of a user home page.

FIG. 48 shows an example of a user home page. In a specific implementation, the page includes the profiles of other users. This listing of profiles may be grouped into various categories. The categories may include, for example, users who recently posted to the system, users who frequently post, users with exemplary ratings, users who recently registered, a random sampling of profiles, or other categories, and combinations of these. There may also be categories which include user profiles from various parts of the world (e.g., Italy, France, Germany, Japan, China, or Saudi Arabia). This encourages users to explore learning opportunities with people who live in other places. The page may also include the profiles of the user's friends.

Figure 49A:
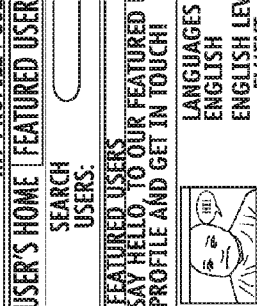
FIG. 49A shows an example of a featured users page.

FIG. 49A shows an example of a featured users page. In an implementation, the system allows users to subscribe to changes made by other users. For example, if a user makes a new entry in the system, such as a new blog entry, then the system will notify other users who have subscribed to that user. Any notification technique may be used (e.g., e-mail and text messaging).

Figure 49B:
FIG. 49B shows an example of a pop-up menu for a featured user.

FIG. 49B shows an example of a pop-up menu for a featured user.

Figure 50A:
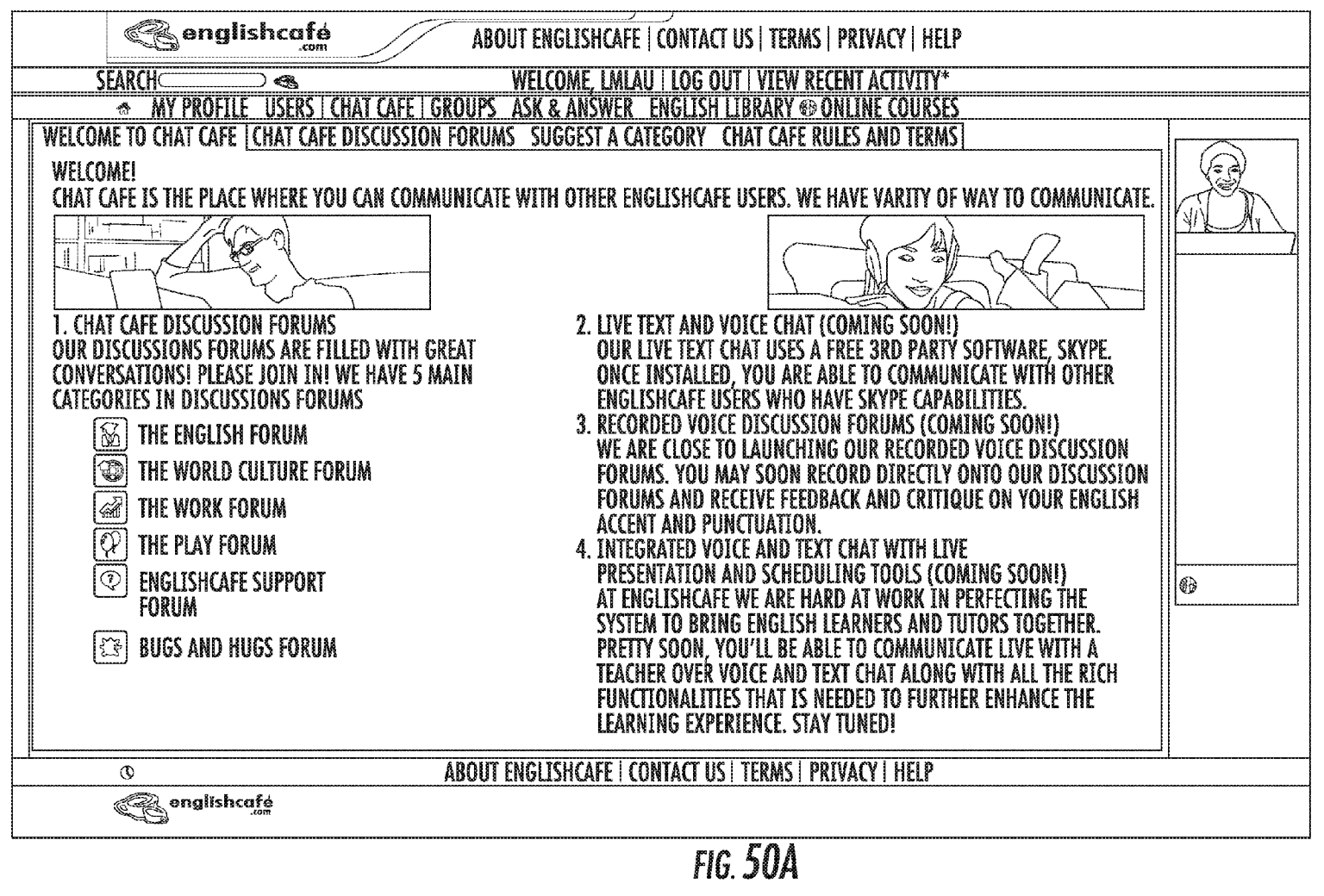

FIG. 50A shows an example of a chat cafe page. In a specific implementation, the system provides real-time instant messaging (i.e., chat). This feature may accessed by clicking the link "Chat Cafe" at the top of the page. There may be different chat topics available for discussion. This includes for example, politics, religion, culture, business, travel, animals, entertainment, health, crafts, science, sports, or others, and combinations of these.

In an implementation, a real-time translation tool allows users who speak different languages to communicate with each other in their preferred or native language. The system accepts an input from a user in a first language. The system then performs a real-time translation of the first language into a second language, different from the first language, for another user.

For example, a Spanish speaking user may have a chat with an English speaking user. When the Spanish speaking user enters their instant message in Spanish, the system will automatically translate the instant message into English for the English speaking user. Conversely, when the English speaking user enters their reply in English, the system will automatically translate the reply into Spanish for the Spanish speaking user.

A user may designate a preferred language in a user profile. During the chat session, a user may also switch back and forth from one language to another. The system will respond accordingly with a translation. This helps a user to learn multiple languages.

Figure 50B:
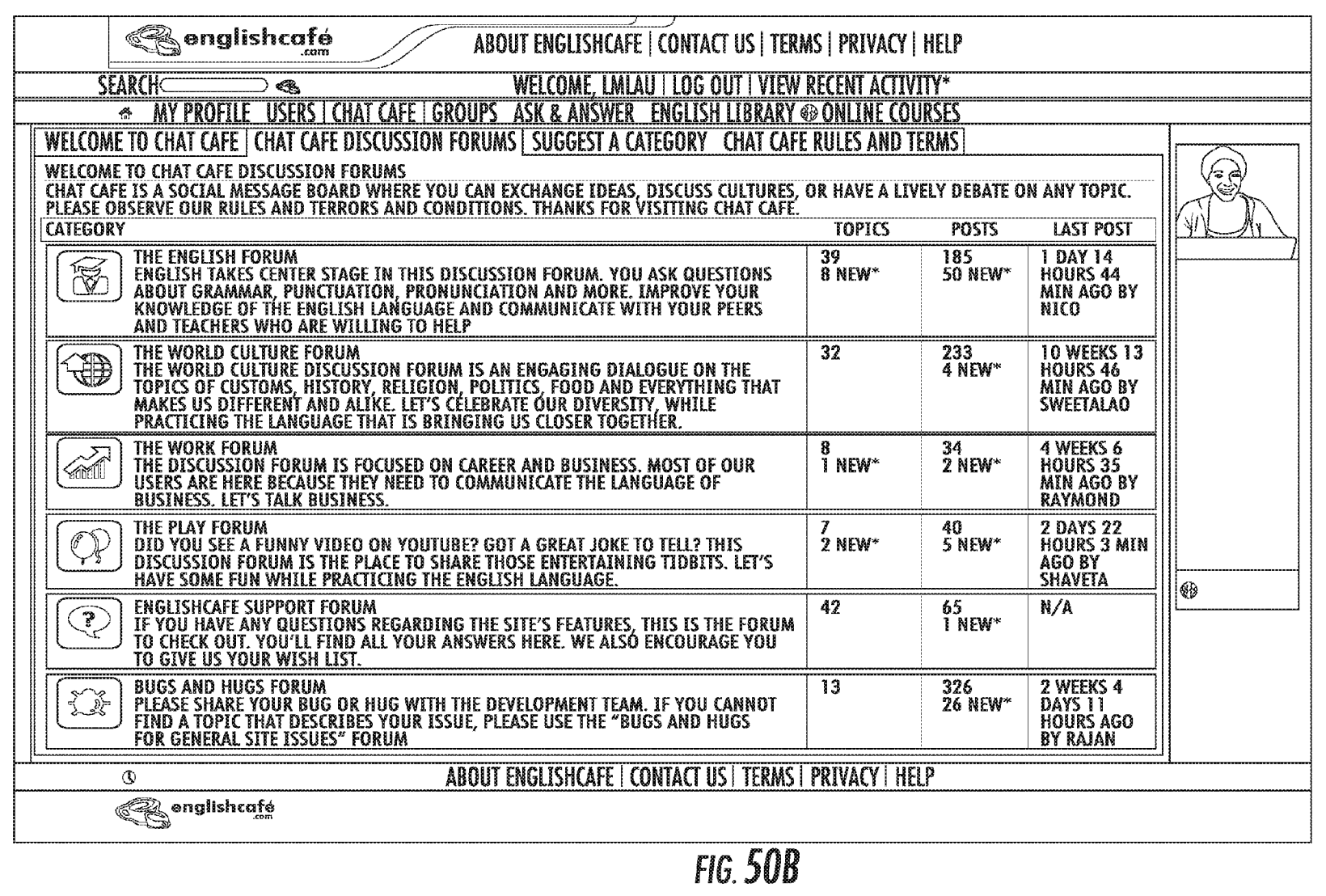
Figure 50C:
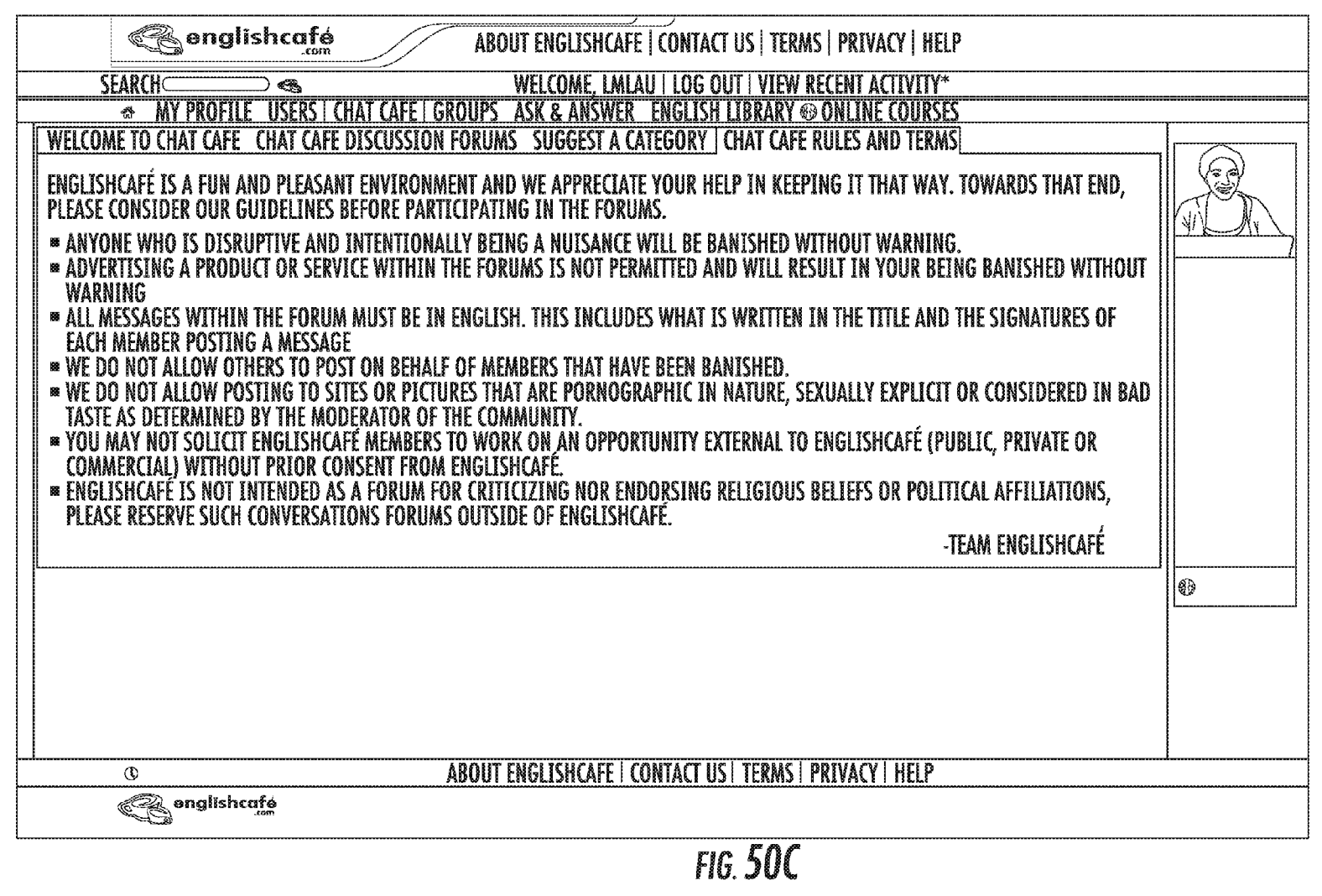

FIG. 50B shows an example of a chat cafe discussion forums page. FIG. 50C shows an example of a chat cafe rules page.

Figure 51:
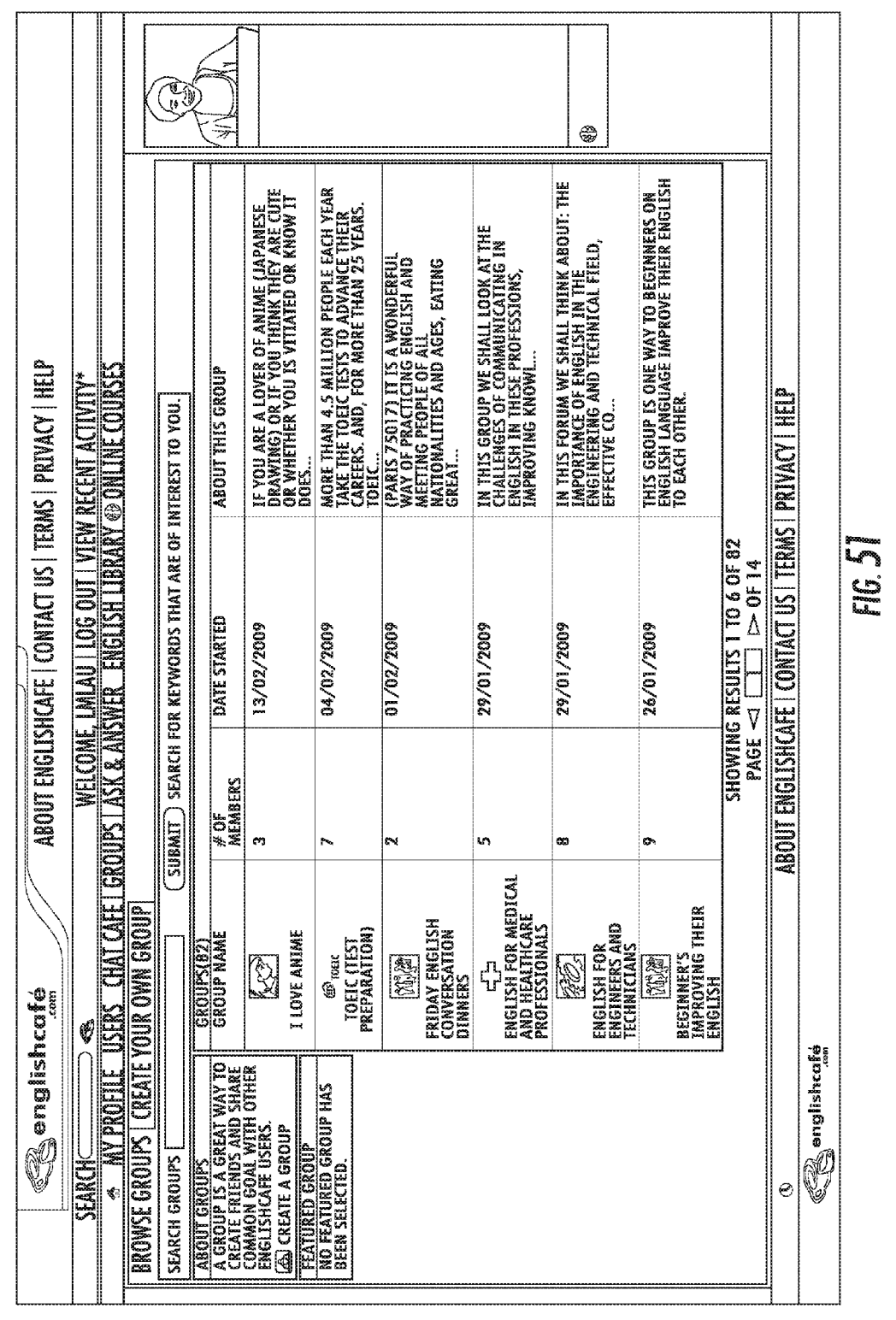

FIG. 51 shows an example of a browse groups page. In an implementation, a group feature allows users with common interests to meet, share ideas, and receive updates. For example, there may be groups related to politics, religion, culture, business, travel, animals, entertainment, health, crafts, science, sports, or others, and combinations of these.

In a specific implementation, users in the group may post their comments in their preferred language. The system then automatically translates the messages for a group user based on that user's preferred language. Users may subscribe to different groups to be notified of updates such as new postings. Any notification technique may be used. The notification may be through e-mail, instant message, short message service (SMS) messages, multimedia messaging service (MMS) messages, electronic messaging, telephone call, or other.

Figure 52:
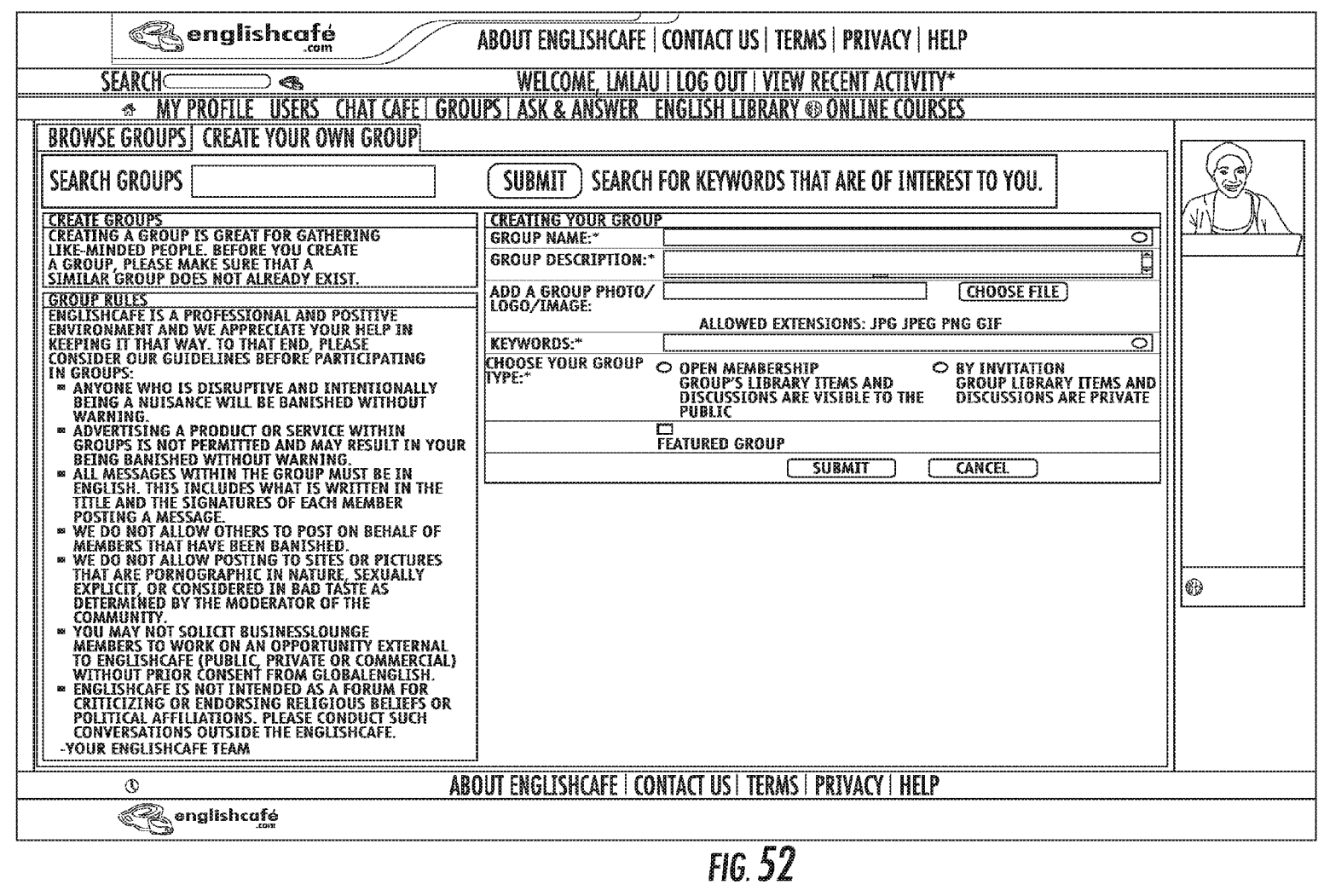

FIG. 52 shows an example of a create groups page. In a specific implementation, the system allows the author of the document to specify which users to receive suggestions from. The users may include any user on the system's network or users within the author's network. The author may also create private groups of users to receive suggestions from or designate certain users not to receive suggestions from. The author may also select individual users to receive suggestions from. The system may send notifications to users to inform them that a document is available to comment on. Any notification technique may be used.

Figure 53A:
FIG. 53A shows an example of an answer question page.
Figure 53B:
FIG. 53B shows an example of an ask question page.

FIG. 53A shows an example of an answer question page. FIG. 53B shows an example of an ask question page. The "Ask & Answer" link at the top of the page allows users to post questions and receive answers. The question may concern different languages or cultures that the user is interested in learning. In a specific implementation, only certain users may provide answers. For example, the system may only permit senior users to provide answers. The system may determine a user's seniority based on when the user became a member of the system, the number of posts the user has made, the user's background as specified in the user's profile, whether the user has passed a certification exam given by the system, the quality of the user's prior posts, or other criteria, and combinations of these.

In another implementation, only certified teachers and educators may provide answers. For example, the system may store in a user profile whether the user is a certified teacher or educator. The system may verify this information by cross-referencing the data provided by the user with databases that store teacher and educator license data, such as government databases. The system may then provide these teachers and educators with special designations to indicate to their status to other users. For example, a user who is a teacher or educator may have a chalkboard and chalk icon placed next to their user name. Thus, whenever this user makes a suggestion, posts a comment, or replies to a question, this icon will be displayed along with their user name.

The system provides a method for users who ask questions to rate the answers provided. The system then rewards users who consistently receive high ratings for their answers. For example, the reward may be displaying a special animated icon or avatar next to the user's user name, such as a spinning star. The rewards may be monetary, such as gift certificates.

These incentives encourage users to post thoughtful answers. In turn, thoughtful answers encourage more questions. This results in increased traffic to the site.

Figure 54:
FIG. 54 shows an example of an English library page.

FIG. 54 shows an example of an English library page. The page may provide users with resources to exemplary written English. This may include, for example, classical literature, works by Pulitzer Prize winning authors, works by best-selling authors, or other works that have received recognition. The system may then redirect the user to affiliated networks where the user may purchase these works.

Figure 55A:
FIG. 55A shows an example of a read content request page.
Figure 55B:
FIG. 55B shows an example of a submit request page.
Figure 56:
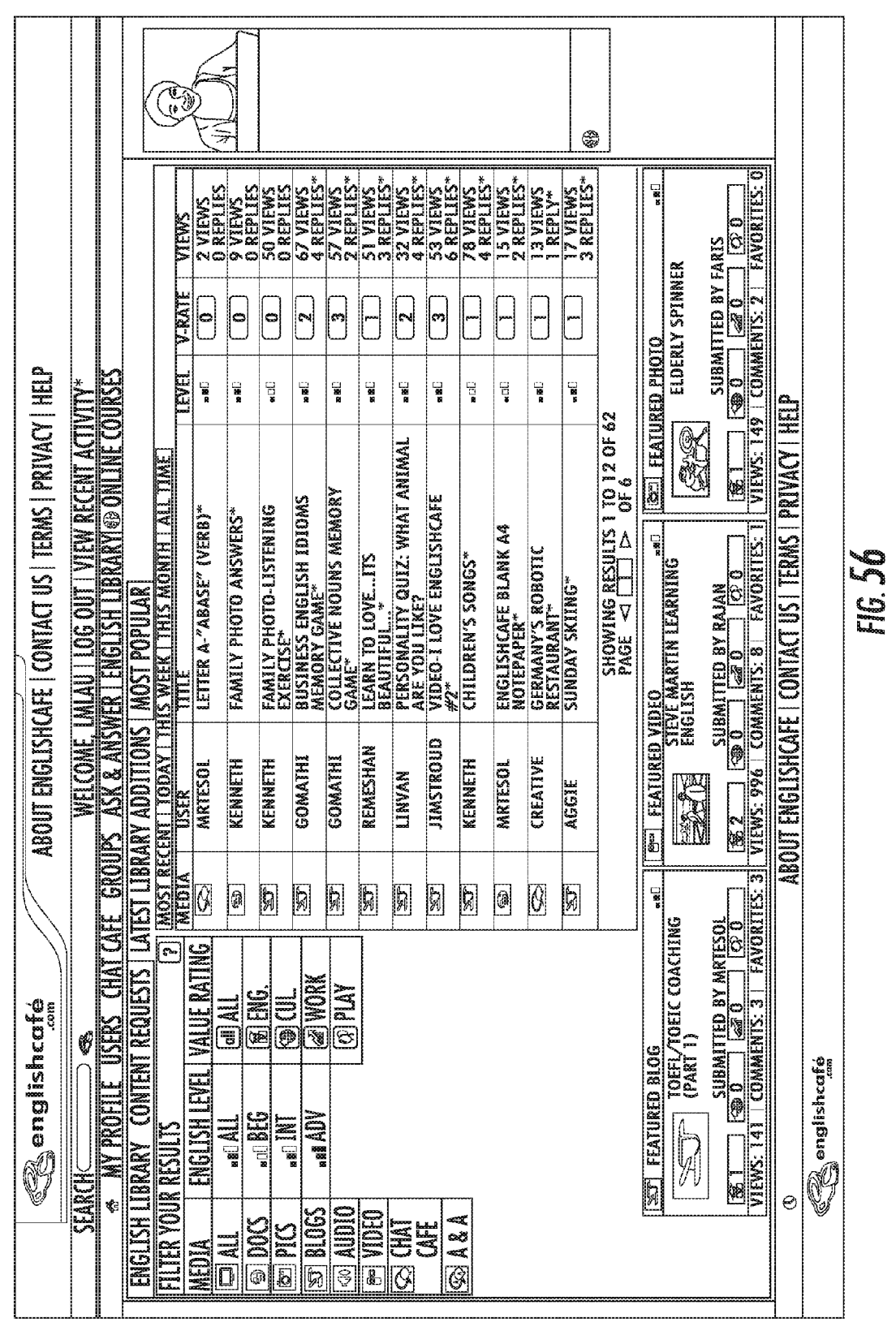
Figure 57:
FIG. 57 shows an example of a most popular library items page.

FIG. 55A shows an example of a read content request page. FIG. 55B shows an example of a submit request page. FIG. 56 shows an example of a latest library additions page. FIG. 57 shows an example of a most popular library items page.

Figure 58:
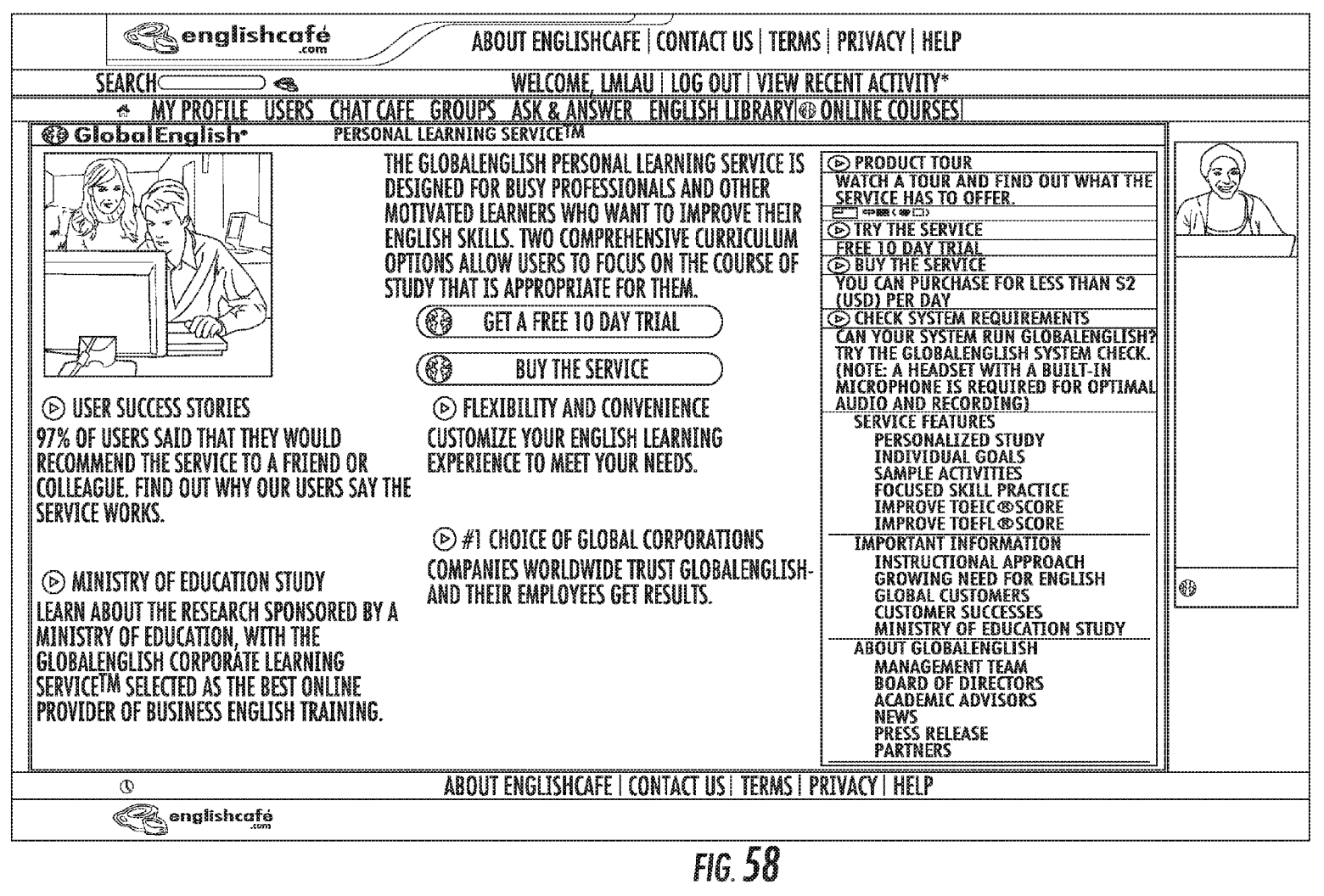

FIG. 58 shows an example of an on-line courses page. This page may include links to on-line language courses. The page include interactive activities for learning, different subjects, or languages such as English. This may include, for example, vocabulary games, multiple-choice and fill-in-the blank quizzes, presentations, activities, crossword puzzles, or on-line language courses. In a specific implementation, the system integrates with the electronic learning system developed by GlobalEnglish Corporation.

The system, by leveraging the features provided by GlobalEnglish or other e-learning companion site, may evaluate the user's postings and suggestions. In an implementation, the user is first asked by the system whether they would like to have their postings evaluated. If the user agrees then a user's posting such as their blog postings may be evaluated according to grammar rules (e.g., verb tense, active voice, or passive voice). If the system determines that the user's writing falls below a certain threshold, then the system may invite the user to register with GlobalEnglish.

In an implementation, features of an e-learning site (such as GlobalEnglish) and an e-learning community site (such as EnglishCafe) are integrated into a single site, where features of the sites are available to users without needing to access an external site.

Figure 59:
FIG. 59 shows an example of a recent activities page.

FIG. 59 shows an example of a recent activities page.

This description of the invention has been presented for the purposes of illustration and description. It is not intended to be exhaustive or to limit the invention to the precise form described, and many modifications and variations are possible in light of the teaching above. The embodiments were chosen and described in order to best explain the principles of the invention and its practical applications. This description will enable others skilled in the art to best utilize and practice the invention in various embodiments and with various modifications as are suited to a particular use. The scope of the invention is defined by the following claims.

The invention claimed is:

1. A system comprising a server hardware computing device coupled to a network and comprising at least one processor executing instructions within a memory that, when executed, cause the system to:
    decode, from a client hardware computing device coupled to the network, a user selection input selecting a content within an electronic document;
    responsive to receiving the user selection input, generate a first graphical user interface (GUI):
    highlighting the content within the electronic document; and displaying a control panel including:
    a first GUI control receiving an electronic comment associated with the user selection inputs;
    a second GUI control for generating an audio representation of the content, wherein, responsive to a user activating the second GUI, the specific computer-executable instructions cause the system to generate an audio representation of the content and transmit the audio representation to the client hardware computing device;
a third GUI control receiving from the user a selection of a voice for an audio representation;
a fourth GUI control receiving from the user a selection of a dialect for the voice for the audio representation; and
a fifth GUI control receiving from the user a selection of a speed for the audio representation;

transmit the GUI to the client hardware computing device for display; decode a transmission received from the client hardware computing device and including an electronic comment input by a user;

execute a database query saving, in association within a database coupled to the network, the user selection input, an identifier of the user, and the electronic comment received from the GUI control.

2. The system of claim 1, wherein the instructions cause the server hardware computing device to decode the electronic document from a second GUI receiving an electronic user content input from an author of the electronic document.

3. The system of claim 2, wherein the instructions cause the server hardware computing device to, responsive to decoding the transmission including the electronic comment input by the user, encode a notification of the electronic comment within the control panel operated by the author.

4. The system of claim 3, wherein the instructions cause the server hardware computing device to encode a first GUI control receiving input from the author approving the electronic comment and a second GUI control receiving input from the author discarding the electronic comment.

5. The system of claim 4, wherein the instructions cause the server hardware computing device to, responsive to decoding input from the first GUI control:
replace, within the electronic document, the user selection input with the electronic comment; and
remove the highlighting of the content within the electronic document.

6. The system of claim 5, wherein the instructions cause the server hardware computing device to encode, on the control panel further a GUI control receiving input from the author editing the electronic suggestion.

7. The system of claim 5, wherein the instructions cause the server hardware computing device to, responsive to receiving input from the first GUI control or the second GUI control, encode on the control panel of the user, a notification that the author has approved or discarded the electronic suggestion.

8. The system of claim 1, wherein the instructions cause the server hardware computing device to encode on the control panel a GUI control receiving input from the user explaining the electronic comment.

9. The system of claim 1, wherein the instructions cause the server hardware computing device to encode, within the control panel, a suggestion history comprising at least one electronic suggestion stored in the database in association with the electronic document, and a status indicating that the at least one electronic suggestion is approved or discarded.

10. The system of claim 9, wherein the instructions cause the server hardware computing device to encode within the control panel, at least one GUI control for filtering the at least one electronic suggestion displayed on the control panel.

11. The system of claim 1, wherein the author and the user are associated in the database as members of a group.

12. The system of claim 1, wherein the instructions further cause the system to:
responsive to receiving the user selection input:
display, within the control panel, an electronic translation of the content into a second language selected by the user.

13. The system of claim 12, wherein the instructions further cause the system to generate, for display on the control panel:
a first additional GUI control receiving from the user a selection of the second language; and
a second additional GUI control including a translation of the user selection input into the second language selected within the first additional GUI control.

14. The system of claim 1, wherein the instructions further cause the system to:
responsive to receiving the user selection input, generate a second GUI:
highlighting the content within the electronic document; and
displaying, within the control panel, a first additional GUI control for generating an audio representation of the content;
transmit the second GUI to the client hardware computing device for display;
responsive to receiving a user input activating the first additional GUI control, generate the audio representation of the content; and
transmit the audio representation of the content to the client hardware computing device.

15. The system of claim 14, wherein the instructions further cause the system to generate, for display on the control panel:
a second additional GUI control receiving from the user a selection of a voice for the audio representation;
a third additional GUI control receiving from the user a selection of a dialect for the voice for the audio representation; and
a fourth additional GUI control receiving from the user a selection of a speed for the audio representation.

* * * * *

UNITED STATES PATENT AND TRADEMARK OFFICE
CERTIFICATE OF CORRECTION

PATENT NO. : 10,503,835 B2
APPLICATION NO. : 15/454519
DATED : December 10, 2019
INVENTOR(S) : Sam Neff, Raymond Galang and Sundararajan Parasuraman It is certified that error appears in the above-identified patent and that said Letters Patent is hereby corrected as shown below:

In the Claims

Column 42, Line 61:
"a first graphical user" should be --a graphical user--

Signed and Sealed this
Eighteenth Day of February, 2020

Andrei Iancu
*Director of the United States Patent and Trademark Office*